(12) United States Patent
Fukuhara et al.

(10) Patent No.: US 8,260,068 B2
(45) Date of Patent: Sep. 4, 2012

(54) ENCODING AND DECODING DEVICE AND ASSOCIATED METHODOLOGY FOR OBTAINING A DECODED IMAGE WITH LOW DELAY

(75) Inventors: Takahiro Fukuhara, Kanagawa (JP); Katsutoshi Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 723 days.

(21) Appl. No.: 12/514,810

(22) PCT Filed: May 16, 2008

(86) PCT No.: PCT/JP2008/059001
§ 371 (c)(1),
(2), (4) Date: May 14, 2009

(87) PCT Pub. No.: WO2008/143156
PCT Pub. Date: Nov. 27, 2008

(65) Prior Publication Data
US 2010/0061643 A1   Mar. 11, 2010

(30) Foreign Application Priority Data

May 17, 2007   (JP) ................................. 2007-132156

(51) Int. Cl.
*G06K 9/36* (2006.01)
*G06K 9/40* (2006.01)
*G06K 9/46* (2006.01)
(52) U.S. Cl. ........................ 382/232; 382/260
(58) Field of Classification Search .................. 382/232, 382/233, 254, 260–264; 375/240.01, 240.02, 375/240.12, 240.24, 240.25, E07.003, E07.026; 341/51, 106; 704/10
See application file for complete search history.

(56) References Cited

U.S. PATENT DOCUMENTS

| | | | | |
|---|---|---|---|---|
| 5,229,936 A | * | 7/1993 | Decker et al. | .................. 704/10 |
| 5,389,922 A | * | 2/1995 | Seroussi et al. | .................. 341/51 |
| 6,101,284 A | | 8/2000 | Matsubara et al. | |
| 6,917,384 B1 | | 7/2005 | Fukushima | |
| 7,970,049 B2 | * | 6/2011 | Smith | ....................... 375/240.01 |

(Continued)

FOREIGN PATENT DOCUMENTS

JP   9 130800   5/1997

(Continued)

OTHER PUBLICATIONS

Office Action issued May 19, 2011, in Japanese Patent Application No. 2008-289345.

(Continued)

*Primary Examiner* — Amir Alavi
(74) *Attorney, Agent, or Firm* — Oblon, Spivak, McClelland, Maier & Neustadt, L.L.P.

(57) ABSTRACT

An identifying information generating unit that generates shared-process identifying information that identifies by which encoding processing and decoding processing a process shared between the encoding processing of image data and the decoding processing of an encoded stream is to be performed, or generates program identifying information that identifies which decoding program is to be selected from among a plurality of decoding programs that differ from each other in an assignment pattern in which a plurality of processes that constitute the decoding processing are assigned to a plurality of processing units or in an arrangement pattern of memories used by the plurality of processes. A transmitting unit that transmits the shared-process identifying information or the program selection information generated by the identifying information generating unit.

15 Claims, 49 Drawing Sheets

U.S. PATENT DOCUMENTS

| | | | |
|---|---|---|---|
| 8,121,197 B2 * | 2/2012 | Rosenzweig et al. | 375/240.25 |
| 2007/0206675 A1 * | 9/2007 | Tanaka | 375/240.12 |
| 2008/0126278 A1 * | 5/2008 | Bronstein et al. | 706/17 |
| 2008/0285873 A1 | 11/2008 | Ando et al. | |
| 2008/0288953 A1 | 11/2008 | Ando et al. | |
| 2010/0061643 A1 * | 3/2010 | Fukuhara et al. | 382/232 |
| 2010/0086024 A1 * | 4/2010 | Zhang et al. | 375/240.02 |
| 2010/0226428 A1 * | 9/2010 | Thevathasan et al. | 375/240.02 |

FOREIGN PATENT DOCUMENTS

| | | |
|---|---|---|
| JP | 2000 358183 | 12/2000 |
| JP | 2001-275112 | 10/2001 |
| JP | 2003-101791 | 4/2003 |
| JP | 2003-116133 | 4/2003 |
| JP | 2003-274185 | 9/2003 |
| JP | 2004 166096 | 6/2004 |
| JP | 2005-142673 | 6/2005 |
| JP | 2005-303854 | 10/2005 |
| WO | 2007 058294 | 5/2007 |
| WO | 2007 058296 | 5/2007 |

OTHER PUBLICATIONS

Office Action issued May 12, 2011, in Japanese Patent Application No. 2008-289346.

* cited by examiner

FIG. 5
A
SPLITTING LEVEL = 1
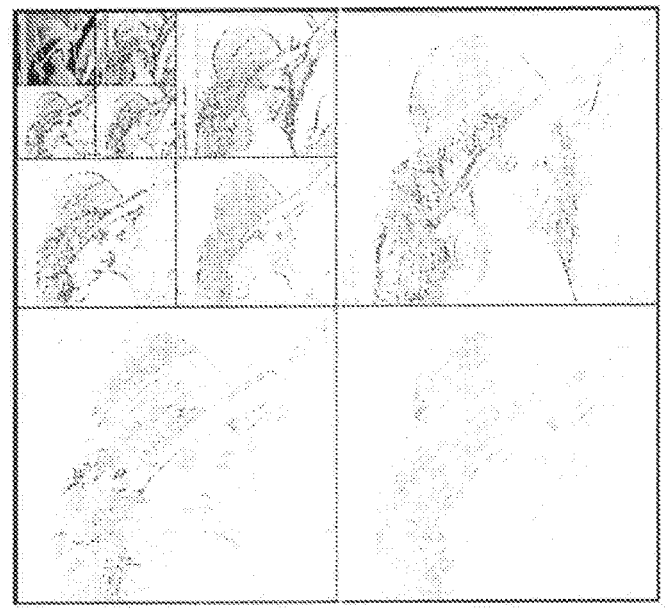
B
SPLITTING LEVEL = 3

| NUMBER OF DECOMPOSITIONS | 5×3 FILTER | 9×7 FILTER |
|---|---|---|
| 1 | 4 | 6 |
| 2 | 6 | 9 |
| 3 | 7 | 10.5 |
| 4 | 7.5 | 11.25 |
| 5 | 7.55 | 11.325 |

| NUMBER OF DECOMPOSITIONS | 5×3 FILTER | 9×7 FILTER |
|---|---|---|
| 1 | 2 | 2 |
| 2 | 7 | 13 |
| 3 | 18.5 | 39.5 |
| 4 | 42.25 | 94.75 |
| 5 | 90.125 | 206.375 |

ENCODING AND DECODING DEVICE AND ASSOCIATED METHODOLOGY FOR OBTAINING A DECODED IMAGE WITH LOW DELAY

This application is a 371 of PCT/JP2008/059001 filed on May 16, 2008.

TECHNICAL FIELD

The present invention relates to an encoding device and an encoding method, and a decoding device and a decoding method, in particular, an encoding device and an encoding method, and a decoding device and a decoding method which make it possible to obtain a decoded image with low delay upon transferring an encoded image.

BACKGROUND ART

Conventionally, as a representative image compression scheme, there is a JPEG (Joint Photographic Experts Group) scheme standardized by the ISO (International Organization for Standardization). In this JPEG scheme, an image is split into blocks, a DCT (Discrete Cosine Transform) is applied to each of the blocks to acquire DCT coefficients, the DCT coefficients are quantized, and further entropy encoding is performed, thereby realizing image compression with high quality and high compression ratio.

In recent years, active studies have been made on encoding schemes that split an image into a plurality of bands by filters called a filter bank using a combination of a high-pass filter and a low-pass filter, and perform encoding on a band-by-band basis. Among those, wavelet transform encoding is free from a drawback of DCT that block distortion becomes conspicuous at high compression, and is thus regarded as a new promising technique to supersede DCT.

For example, the JPEG 2000, of which international standardization was completed in January 2001, adopts a compression encoding scheme that combines this wavelet transform with high-efficiency entropy encoding based on bit modeling on a bitplane-by-bitplane basis and arithmetic encoding. With this JPEG 2000 scheme, a significant improvement in encoding efficiency is achieved over the JPEG scheme. Patent Document 1 describes a wavelet transform method in which encoding efficiency is further enhanced.

Patent Document 1: Japanese Unexamined Patent Application Publication No. 9-130800

DISCLOSURE OF INVENTION

Problems to be Solved by the Invention

By the way, upon transferring an image encoded in such an encoding scheme described above, predetermined processing for obtaining an image decoded with low delay needs to be performed in either one of an encoding device or a decoding device. For example, in a case where the predetermined processing is executed in the encoding device, it is necessary to provide notification from the encoding device to the decoding device of the fact that there is no need to execute the predetermined processing in the decoding unit. On the other hand, in a case where the predetermined processing is not executed in the encoding device, it is necessary to provide notification from the encoding device to the decoding device of the fact that there is a need to execute the predetermined processing in the decoding unit.

Unless information such as whether or not to execute predetermined processing can be appropriately notified in this way from the encoding device to the decoding device, it has been difficult to obtain a decoded image with low delay upon transferring an encoded image.

The present invention has been made in view of the above circumstances, and makes it possible to obtain a decoded image with low delay upon transferring an encoded image.

Means for Solving the Problems

An encoding device according to a first aspect of the present invention is an encoding device that performs encoding processing of image data to generate an encoded stream, including: identifying information generating means for generating shared-process identifying information that identifies by which of the encoding processing and decoding processing a process shared between the encoding processing of the image data and the decoding processing of the encoded stream is to be performed, or program identifying information that identifies which decoding program is to be selected from among a plurality of decoding programs that differ from each other in an assignment pattern in which a plurality of processes that constitute the decoding processing are assigned to a plurality of processing units or in an arrangement pattern of memories used by the plurality of processes; encoding means for performing the encoding processing of the image data to generate the encoded stream; and transmitting means for transmitting the shared-process identifying information or the program selection information generated by the identifying information generating means, together with the encoded stream generated by the encoding means.

An encoding method according to the first aspect of the present invention is an encoding method of performing encoding processing of image data to generate an encoded stream, including the steps of: generating shared-process identifying information that identifies by which of the encoding processing and decoding processing a process shared between the encoding processing of the image data and the decoding processing of the encoded stream is to be performed, or program identifying information that identifies which decoding program is to be selected from among a plurality of decoding programs that differ from each other in an assignment pattern in which a plurality of processes that constitute the decoding processing are assigned to a plurality of processing units or in an arrangement pattern of memories used by the plurality of processes; performing the encoding processing of the image data to generate the encoded stream; and transmitting the shared-process identifying information or the program selection information together with the encoded stream.

In the first aspect of the present invention, shared-process identifying information that identifies by which of the encoding processing and decoding processing a process shared between the encoding processing of the image data and the decoding processing of the encoded stream is to be performed, or program identifying information that identifies which decoding program is to be selected from among a plurality of decoding programs that differ from each other in an assignment pattern in which a plurality of processes that constitute the decoding processing are assigned to a plurality of processing units or in an arrangement pattern of memories used by the plurality of processes, are generated. Then, the encoding processing is performed on the image data to generate the encoded stream, and the shared-process identifying information or the program selection information is transmitted together with the encoded stream.

A decoding device according to a second aspect of the present invention is a decoding device that performs decoding processing of an encoded stream obtained by performing encoding processing of image data, including: acquiring means for acquiring, together with the encoded stream, shared-process identifying information that identifies by which of the encoding processing and decoding processing a process shared between the encoding processing of the image data and the decoding processing of the encoded stream is to be performed, or program identifying information that identifies which decoding program is to be selected from among a plurality of decoding programs that differ from each other in an assignment pattern in which a plurality of processes that constitute the decoding processing are assigned to a plurality of processing units or in an arrangement pattern of memories used by the plurality of processes; decoding means for performing decoding processing of the encoded stream acquired by the acquiring means; and control means for controlling the decoding means so as to perform the decoding processing in accordance with a processing scheme indicated by the shared-process identifying information or the program identifying information acquired by the acquiring means.

A decoding method according to a second aspect of the present invention is a decoding method of performing decoding processing of an encoded stream obtained by performing encoding processing of image data, including the steps of: acquiring, together with the encoded stream, shared-process identifying information that identifies by which of the encoding processing and decoding processing a process shared between the encoding processing of the image data and the decoding processing of the encoded stream is to be performed, or program identifying information that identifies which decoding program is to be selected from among a plurality of decoding programs that differ from each other in an assignment pattern in which a plurality of processes that constitute the decoding processing are assigned to a plurality of processing units or in an arrangement pattern of memories used by the plurality of processes; performing decoding processing of the encoded stream; and performing a control that causes the decoding processing to be performed in accordance with a processing scheme indicated by the shared-process identifying information or the program identifying information.

In the second aspect of the present invention, shared-process identifying information that identifies by which of the encoding processing and decoding processing a process shared between the encoding processing of the image data and the decoding processing of the encoded stream is to be performed, or program identifying information that identifies which decoding program is to be selected from among a plurality of decoding programs that differ from each other in an assignment pattern in which a plurality of processes that constitute the decoding processing are assigned to a plurality of processing units or in an arrangement pattern of memories used by the plurality of processes, are acquired together with the encoded stream. Then, decoding processing is performed on the encoded stream, and a control is performed such that the decoding processing is performed in accordance with a processing scheme indicated by the shared-process identifying information or the program identifying information.

Advantageous Effects

According to the first and second aspects of the present invention, a decoded image can be obtained with low delay, upon transferring an encoded image data.

BRIEF DESCRIPTION OF DRAWINGS

FIG. 5 is a simplified diagram for schematically illustrating a wavelet transform.

FIG. 39 is a diagram showing a configuration example of a wavelet-transform relationship table.

FIG. 40 is a diagram showing a configuration example of a coefficient-rearranging relationship table.

Figure 1:
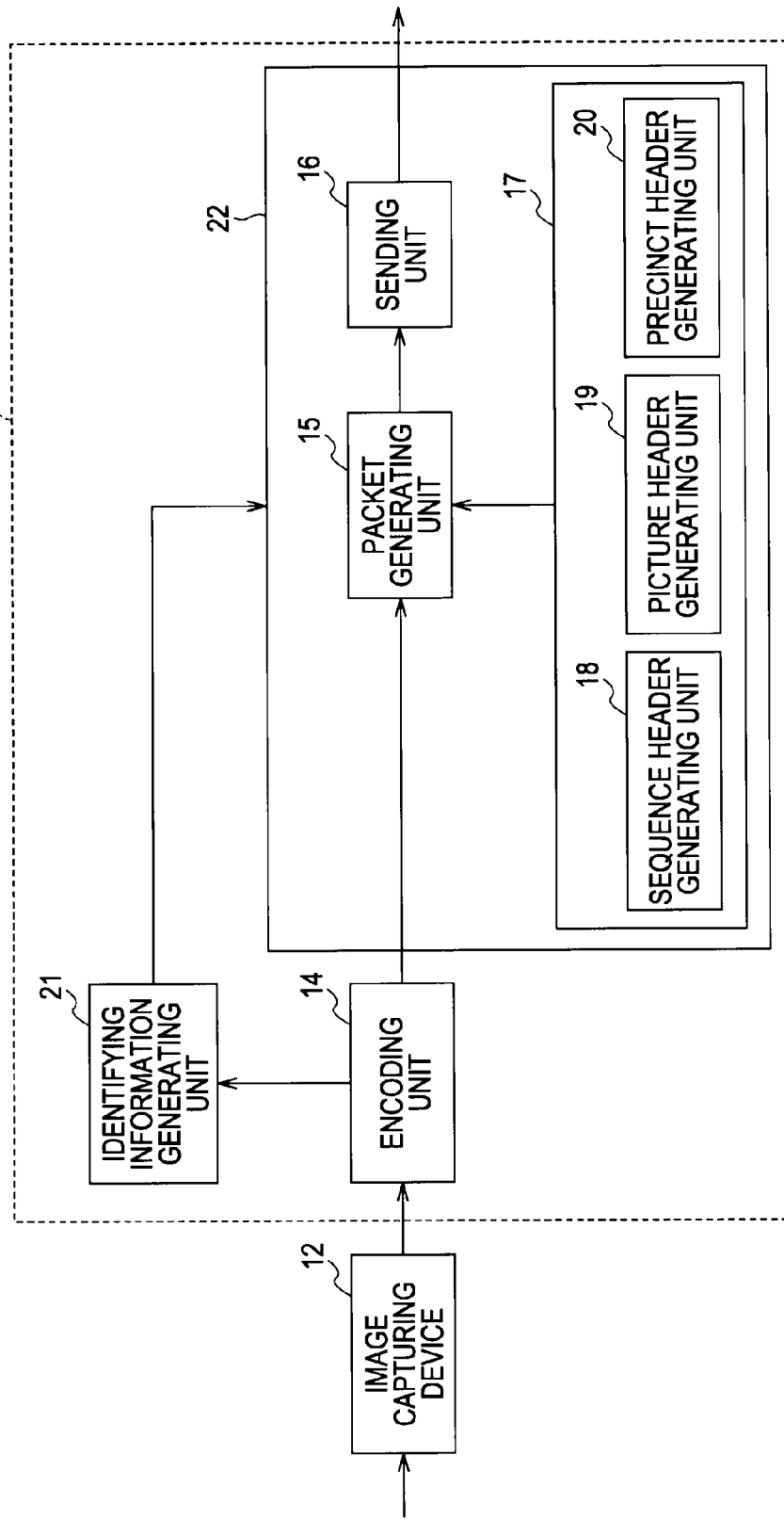
FIG. 1 is a block diagram showing a configuration example of an embodiment of an encoding device to which the present invention is applied.

EXPLANATION OF REFERENCE NUMERALS 12 image capturing device, 13 encoding device, 14 encoding unit, 15 packet generating unit, 16 sending unit, 17 header generating unit, 18 sequence header generating unit, 19 picture header generating unit, 20 precinct header generating unit, 21 transmitting unit, 22 identifying information generating unit, 32 decoding device, 33 display device, 34 receiving unit, 35 packet decrypting unit, 36 decoding unit, 37 output unit, 38 header decrypting unit, 39 sequence header decrypting unit, 40 picture header decrypting unit, 41 precinct header decrypting unit, 42 identifying information acquiring unit, 43 decoding control unit 43, 44 encoded-code-stream acquiring unit, 51 wavelet transform unit, 52 intermediate calculation buffer unit, 53 coefficient rearranging buffer unit, 54 coefficient rearranging unit, 55 entropy encoding unit, 61 entropy decoding unit, 62 coefficient buffer unit, 63 inverse wavelet transform unit, 100 personal computer, 101 CPU, 103 RAM, 111 cache memory, 300 information processing system, 403 XDR-RAM, 441 main CPU core, 442 sub-CPU core, 451 LS, 502 encoding selection control unit, 503 decoding selection control unit, 504 cache, 516 encoding scheme selecting unit, 517 assigning unit, 524 decoding scheme selecting unit, 525 assigning unit

BEST MODES FOR CARRYING OUT THE INVENTION

Specific embodiments to which the present invention is applied will be described below in detail with reference to the drawings.

FIG. 1 is a block diagram showing a configuration example of an embodiment of an encoding device to which the present invention is applied.

In FIG. 1, an image capturing device 12 is connected to an encoding device 13. The encoding device 13 encodes an image captured by the image capturing device 12.

The image capturing device 12 has an image capturing element using a CCD (Charge Coupled Device), a CMOS (Complementary Metal Oxide Semiconductor), or the like, and captures the image of a subject. That is, the image capturing device 12 receives light from the subject, and generates a captured image formed by an electrical signal according to a received amount of the light. Then, the image capturing device 12 converts the captured image into image data that is digital data, and supplies the image data to the encoding device 13.

The encoding device 13 is configured by an encoding unit 14, an identifying information generating unit 21, and a transmitting unit 22.

Image data is supplied to the encoding unit 14 from the image capturing device 12. The encoding unit 14 encodes the image data by a predetermined method, and supplies encoded data obtained by the encoding to a packet generating unit 15.

The identifying information generating unit 21 generates information related to encoding processing performed in the encoding unit 14, and supplies the information to the transmitting unit 22. As information related to encoding processing, there is, for example, information (shared-process identifying information) identifying which of the encoding unit 14 and a decoding unit 36 (shown in FIG. 2 described later) of a decoding device 32 performs a process shared between encoding processing of the encoding unit 14 and decoding processing of the decoding unit 36, information (program identifying information) identifying which decoding program is to be selected from among a plurality of decoding programs that differ from each other in the assignment pattern in which a plurality of processes that constitute the decoding unit 36 are assigned to a plurality of processing units, or in the arrangement pattern of memories used by the plurality of processes, or the like.

The transmitting unit 22 converts the information generated by the identifying information generating unit 21 into a stream format to generate an encoded code stream, and enter description in a header (specifically, user data area in the MPEG (Moving Picture Experts Group) standard) of the encoded code stream as appropriate.

Furthermore, in order to record an encoded code stream (including information contained in a header) onto a recording medium mounted in a drive (not shown), the transmitting unit 22 can send out the encoded code stream to the drive.

That is, the transmitting unit 22 is configured by the packet generating unit 15, a sending unit 16, and a header generating unit 17.

To the packet generating unit 15, encoded data is supplied from the encoding unit 14, and a header including information related to encoded data is supplied from the header generating unit 17. The packet generating unit 15 packetizes encoded data. That is, the packet generating unit 15 generates packets by splitting encoded data into predetermined data sizes, and adding a header from the header generating unit 17, a synchronization code for synchronizing transmission and reception timings of data, and the like. The packet generating unit 15 supplies the packets to the sending unit 16.

The sending unit 16 sends (sends out) an encoded code stream formed by the packets supplied from the packet generating unit 15, by a predetermined communication method via a channel including a wire or wireless line, or wire and wireless lines, in accordance with the timing of the synchronization signal of an image. Further, a channel for transmitting packets may be a dedicated or general-purpose transmission cable, may include, for example, one or a plurality of communication networks such as the LAN (Local Area Network) or Internet, or may include some communication relay device.

The header generating unit 17 is configured by a sequence header generating unit 18, a picture header generating unit 19, and a precinct header generating unit 20, and supplies information (such as program identifying information or program identifying information) supplied from the identifying information generating unit 21 to the sequence header generating unit 18, the picture header generating unit 19, and the precinct header generating unit 20.

Figure 6:
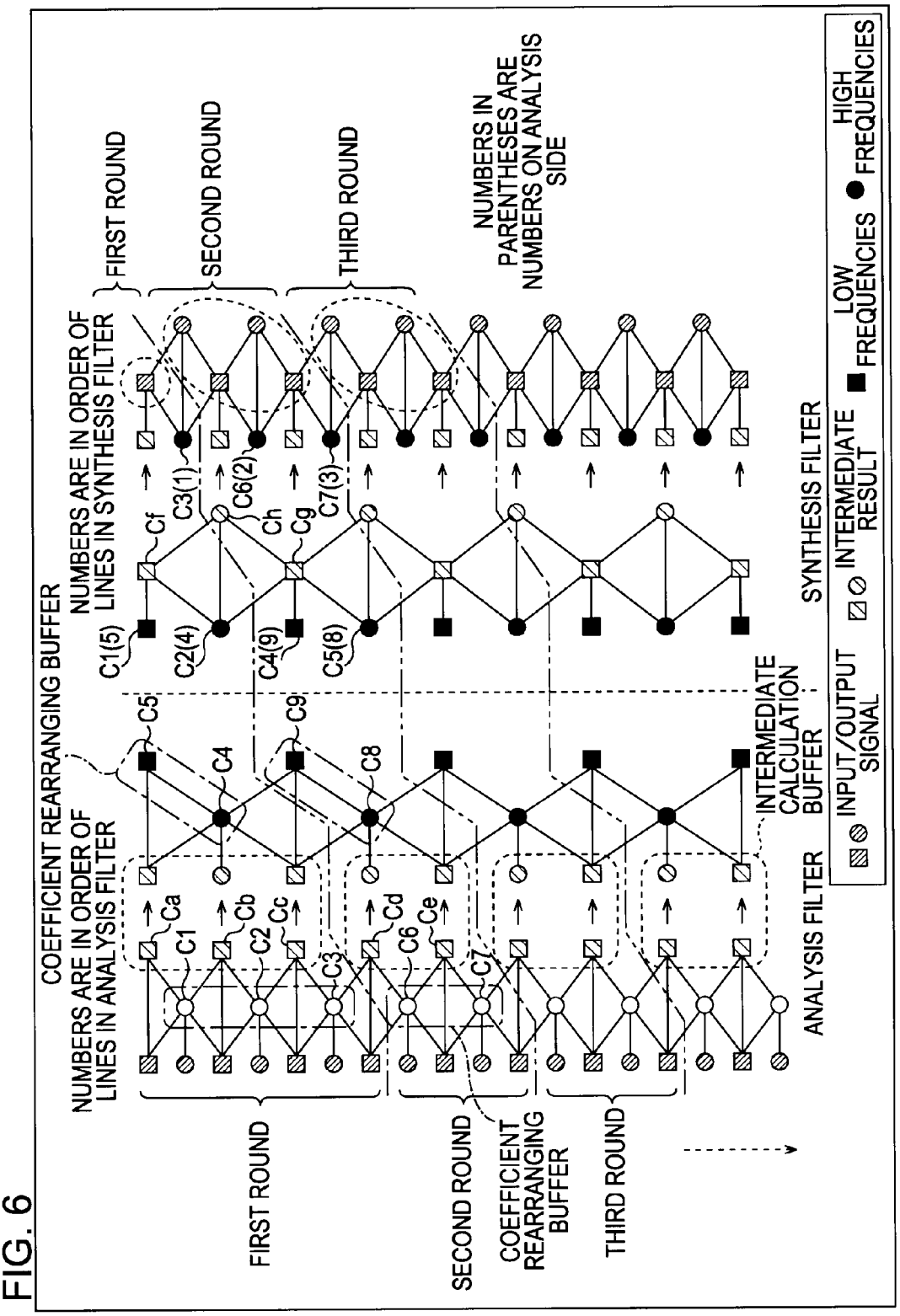
FIG. 6 is a simplified diagram showing an example in which filtering by lifting with a 5×3 filter is executed up to decomposition level=2.

Here, a series of images sent from the encoding device 13 are referred to as sequence as a whole, and each one image among a plurality of images that constitute a sequence is referred to as picture. Further, among a plurality of lines that constitute a picture, a number of lines serving as a unit of processing for a wavelet transform described later with reference to FIG. 6 are referred to as collective precinct. That is, a picture is constituted by a plurality of precincts.

When the encoding device 13 starts sending of a series of images, the sequence header generating unit 18 generates a sequence header including information that is common to all of the series of images, and supplies the sequence header to the packet generating unit 15. Information contained in the sequence header will be described later with reference to FIG. 9.

Every time a picture is supplied from the encoding unit 14 to the packet generating unit 15, the picture header generating unit 19 generates a picture header including information related to each picture, and supplies the picture header to the packet generating unit 15. Information contained in the picture header will be described later with reference to FIG. 10.

Every time a precinct is supplied from the encoding unit 14 to the packet generating unit 15, the precinct generating unit 20 generates a precinct header including information related to each precinct, and supplies the precinct header to the packet generating unit 15. Information contained in the precinct header will be described later with reference to FIG. 11.

Figure 2:
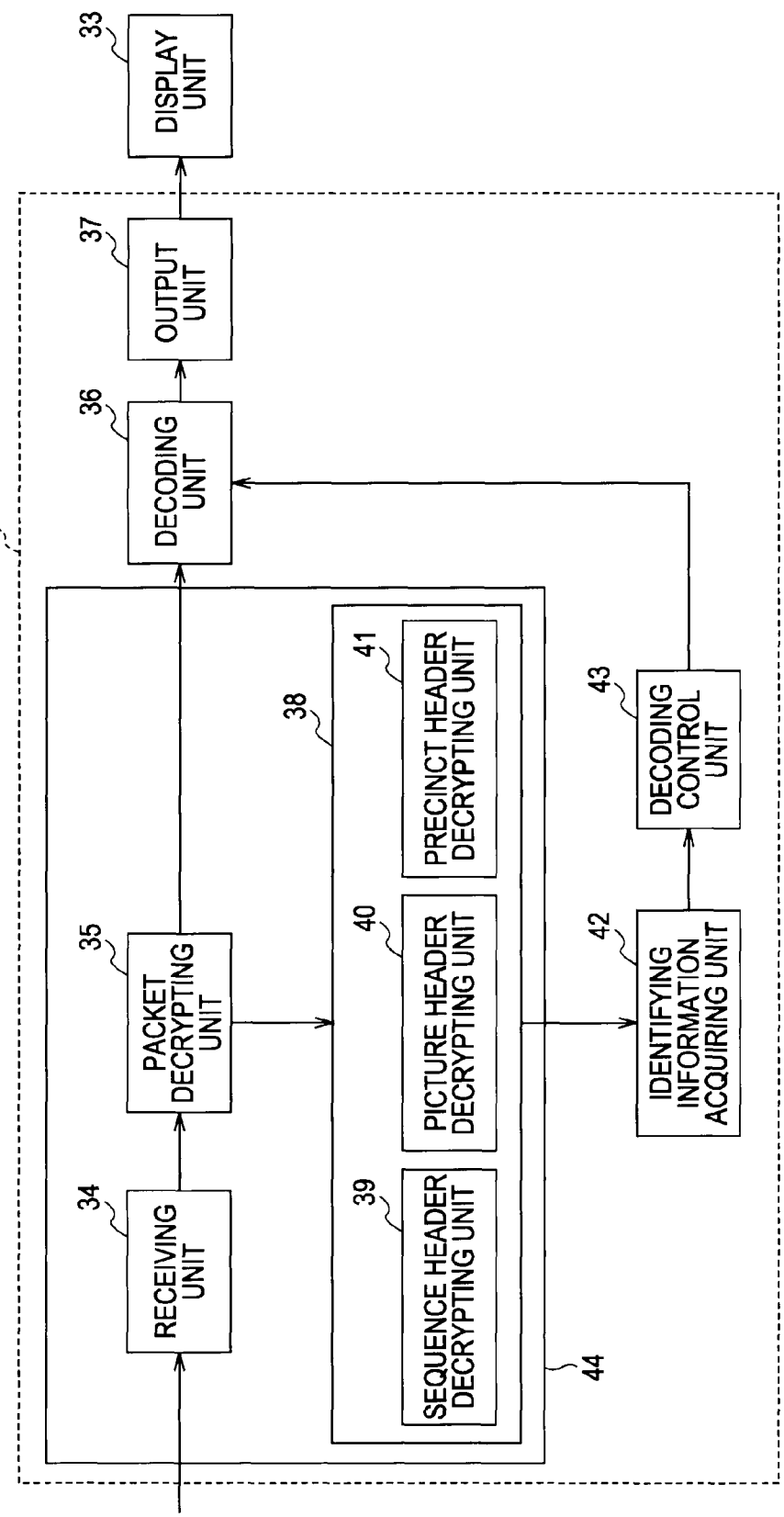
FIG. 2 is a block diagram showing a configuration example of a decoding device to which the present invention is applied.

Next, FIG. 2 is a block diagram showing a configuration example of a decoding device to which the present invention is applied.

In FIG. 2, a display device 33 is connected to the decoding device 32.

The display device 33 has a display, and displays an image decoded and outputted by the decoding device 32 on the display.

The decoding device 32 is configured by an encoded-code-stream acquiring unit 44, an identifying information acquiring unit 42, a decoding control unit 43, the decoding unit 36, and an output unit 37.

The encoded-code-stream acquiring unit 44 acquires an encoded code stream transmitted from the transmitting unit 22 of the sending unit 16 in FIG. 1. The encoded-code-stream acquiring unit 44 decodes the encoded code stream, extracts information described in the header (specifically, user data area in the MPWG standard) of the encoded code stream, and supplies the information to the identifying information acquiring unit 42.

Alternatively, the encoded-code-stream acquiring unit 44 acquires an encoded code stream by reading (playing back) from a drive (not shown) in which a recording medium recording the encoded code stream (including information contained in the header) is mounted.

That is, the encoded-code-stream acquiring unit 44 is configured by a receiving unit 34, a packet decrypting unit 35, and a header decrypting unit 38.

The receiving unit 34 receives an encoded code stream sent from the sending unit 16 in FIG. 1, and supplies the encoded code stream to the packet decrypting unit 35 by a predetermined communication method.

The packet decrypting unit 35 extracts a header and encoded data from the packets of the encoded code stream supplied from the receiving unit 34, supplies the header to the header decrypting unit 38, and also supplies the encoded data to the decoding unit 36.

The header decrypting unit 38 is configured by a sequence header decrypting unit 39, a picture header decrypting unit 40, and a precinct header decrypting unit 41.

A sequence header extracted from packets by the packet decrypting unit 35 is supplied to the sequence header decrypting unit 39. The sequence header decrypting unit 39 analyzes the sequence header, and supplies information contained in the sequence header to the identifying information acquiring unit 42.

A picture header extracted from packets by the packet decrypting unit 35 is supplied to the picture header decrypting unit 40. The picture header decrypting unit 40 analyzes the picture header, and supplies information contained in the picture header to the identifying information acquiring unit 42.

A precinct header extracted from packets by the packet decrypting unit 35 is supplied to the precinct header decrypting unit 41. The precinct header decrypting unit 41 analyzes the precinct header, and supplies information contained in the precinct header to the identifying information acquiring unit 42.

Information contained in the header of an encoded code stream is supplied to the identifying information acquiring unit 42 from the encoded-code-stream acquiring unit 44. The identifying information acquiring unit 42 acquires the information contained in the header of the encoded code stream, that is, information (such as program identifying information or program identifying information) generated by the identifying information generating unit 21 in FIG. 1, and supplies the information to the decoding control unit 43.

The decoding control unit 43 controls the decoding unit 36 to decode the encoded code stream in accordance with a processing scheme indicated by the information supplied from the identifying information acquiring unit 42.

In accordance with control of the decoding control unit 43, the decoding unit 36 decodes the encoded data supplied from the packet decrypting unit 35, by a method corresponding to the method of encoding by the encoding unit 14 in FIG. 1, and supplies image data obtained as a result to the output unit 37.

The output unit 37 outputs the image data supplied from the decoding unit 36 to the display device 33.

In the encoding device 13 and the decoding device 32 configured as described above, an image captured in the image capturing device 12 is encoded in the encoding unit 14, and is packetized in the packet generating unit 15 and sent.

The packets are decrypted in the packet decrypting unit 35, decoded in the decoding unit 36, and displayed on the display device 33.

Incidentally, in the encoding device 13 and the decoding device 32, other than images captured by the image capturing device 12, for example, images that are captured and accumulated in advance may be transmitted. Further, images transmitted from the encoding device 13 may be used for purposes other than display on the display device 33, such as for recording onto a recording device (not shown). Further, while in this example only image data is described as data to be transmitted, for example, other kinds of data such as voice data may be transmitted together with image data.

Further, the method of sending packets by the encoding device 13 may be unicast in which packets are sent only to the decoding device 32, may be multicast in which packets are sent to a plurality of devices including the decoding device 32, or may be broadcast in which packets are sent to a large, unspecified number of devices.

Furthermore, other than being added to the header of packets and sent to the decoding device 32, information generated by the identifying information generating unit 21 of the encoding device 13 may be multiplexed, and sent from the identifying information generating unit 21 to the identifying information acquiring unit 42 in a parallel manner over a different channel (different system) from a channel over which image data (encoded data) is transmitted, for example.

Figure 3:
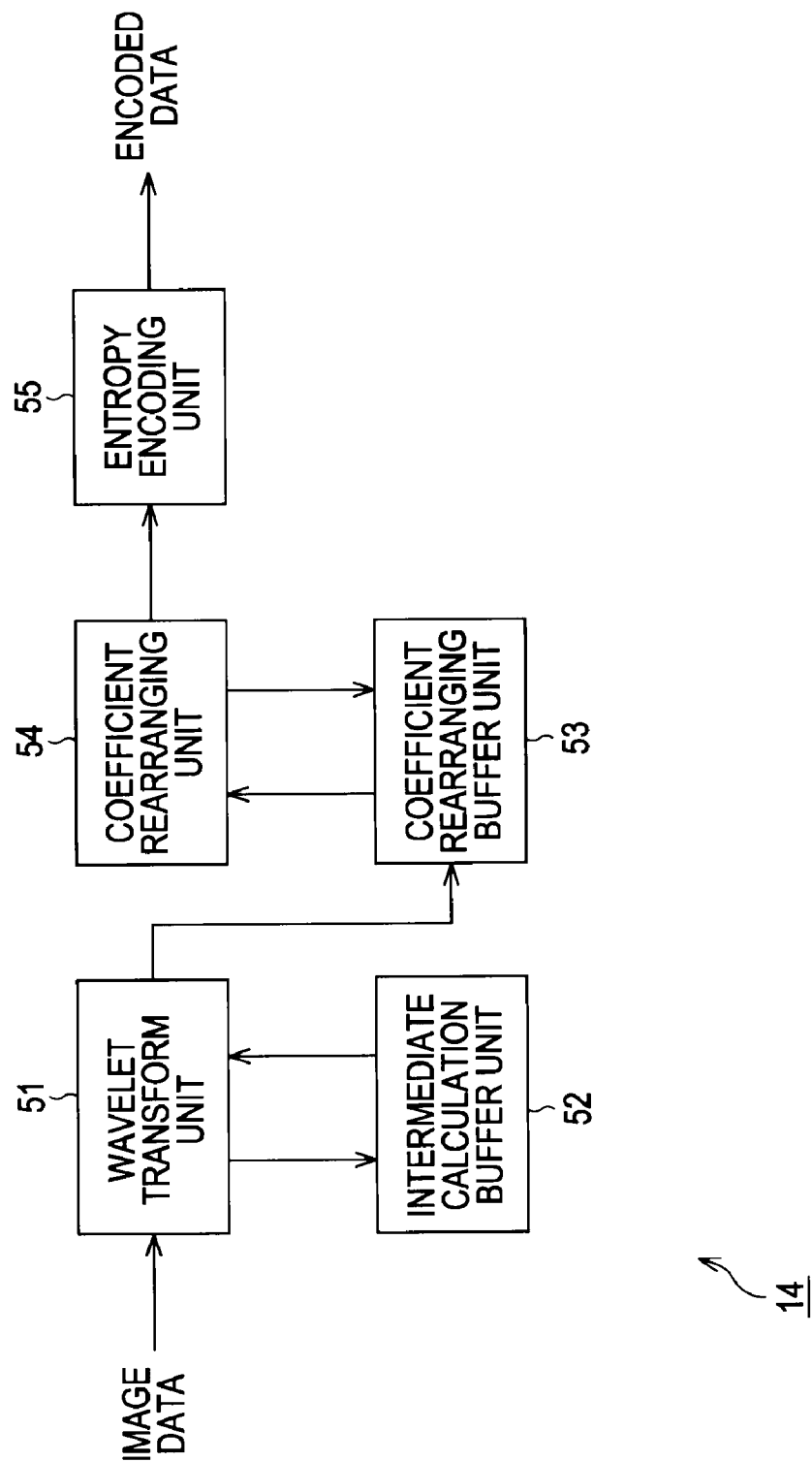
FIG. 3 is a block diagram showing a configuration example of an encoding unit 14.

Next, FIG. 3 is a block diagram showing a configuration example of the encoding unit 14 in FIG. 1.

As shown in FIG. 3, the encoding unit 14 has the features of a wavelet transform unit 51, an intermediate calculating buffer unit 52, a coefficient rearranging buffer unit 53, a coefficient rearranging unit 54, and an entropy encoding unit 55.

Image data inputted to the encoding unit 14 is temporarily accumulated into the intermediate calculation buffer unit 52 via the wavelet transform unit 51. The wavelet transform unit 51 applies a wavelet transform to the image data accumulated in the intermediate calculation buffer unit 52. That is, the wavelet transform unit 51 reads image data from the intermediate calculation buffer unit 52, applies a filtering process by an analysis filter to generate data of coefficients of low-frequency components and high-frequency components, and stores the generated coefficient data into the intermediate calculation buffer unit 52. The wavelet transform unit 51 has a horizontal analysis filter and a vertical analysis filter, and performs an analysis filtering process on a group of image data with respect to both the screen's horizontal direction and the screen's vertical direction. The wavelet transform unit 51 reads the coefficient data of low-frequency components stored in the intermediate calculation buffer unit 52 again, and applies a filtering process by an analysis filter to the read coefficient data, thus further generating data of coefficients of high-frequency components and low-frequency components. The generated coefficient data is stored into the intermediate calculating buffer unit 52.

When the decomposition level reaches a predetermined level after repeating this process, the wavelet transform unit 51 reads coefficient data from the intermediate calculation buffer unit 52, and writes the read coefficient data into the coefficient rearranging buffer unit 53.

The coefficient rearranging unit 54 reads the coefficient data written into the coefficient rearranging buffer unit 53, in a predetermined order, and supplies the coefficient data to the entropy encoding unit 55. The entropy encoding unit 55 quantizes the supplied coefficient data by a predetermined method, and performs encoding in a predetermined entropy encoding scheme such as, for example, Huffman encoding or arithmetic encoding. The entropy encoding unit 55 outputs the generated encoded data to the outside of the encoding unit 14.

Figure 4:
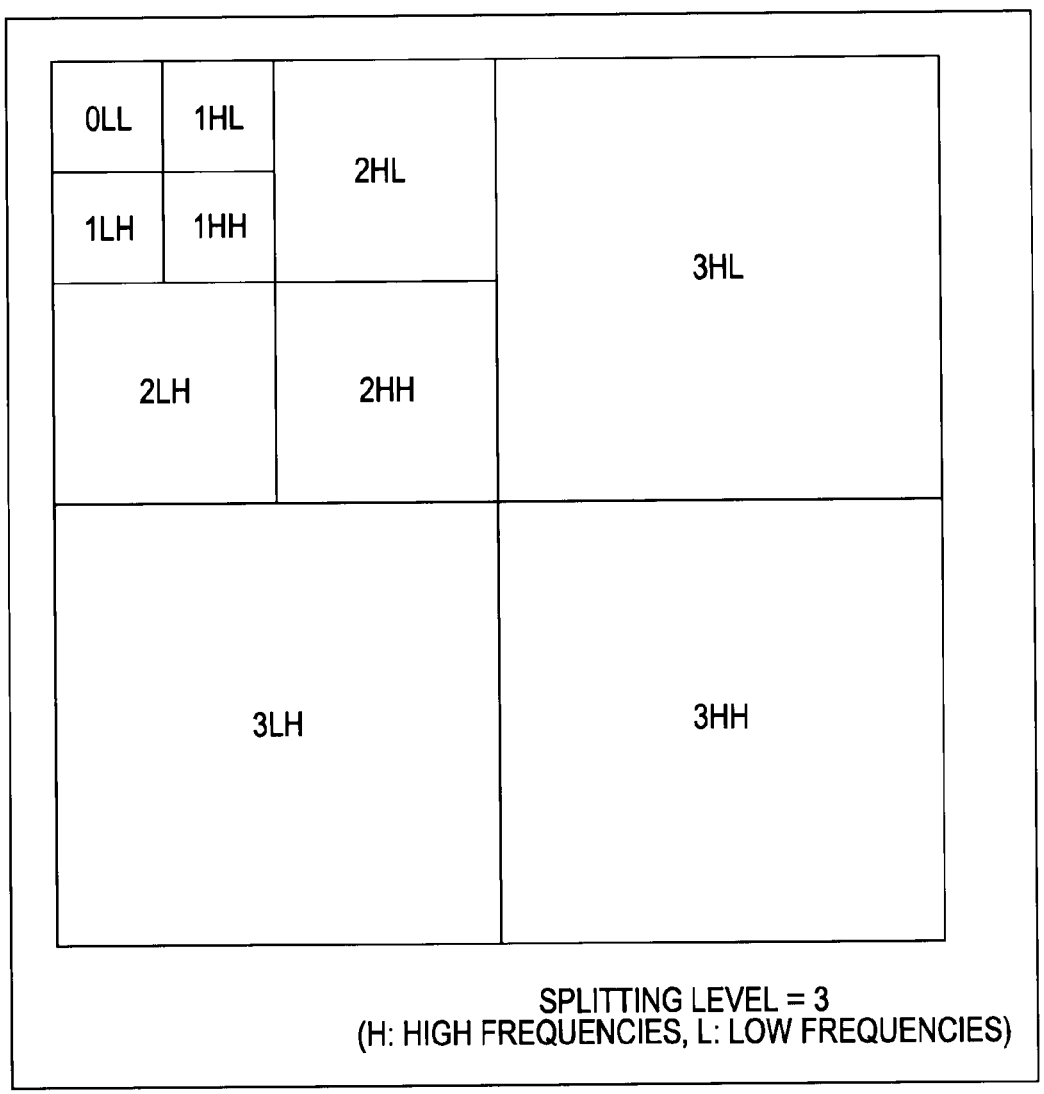
FIG. 4 is a simplified diagram for schematically illustrating a wavelet transform.

Next, a more detailed description will be given of a process performed in the wavelet transform unit 51 in FIG. 3. First, a wavelet transform will be schematically described. In a wavelet transform for image data, as schematically shown in FIG. 4, a process of splitting image data into bands of high and low spatial frequencies is recursively repeated with respect to data in a band of low spatial frequencies obtained as a result of splitting. In this way, by narrowing down data in a band of low spatial frequencies into smaller areas, it is possible to perform efficient compression encoding.

Incidentally, FIG. 4 shows a case in which a process of splitting the lowest-frequency component area of image data into an area L of low-frequency components and an area H of high-frequency components is repeated three times, and the splitting level, which represents the total number of hierarchical levels of splitting, is 3. In FIG. 4, "L" and "H" respectively indicate low-frequency components and high-frequency components, and as for the order of "L" and "H", the front side indicates a band obtained as a result of splitting in the transverse direction, and the rear side indicates the frequency band obtained as a result of splitting in the vertical direction. Numerals in front of "L" and "H" indicate the hierarchical levels of the corresponding areas, and hierarchical levels for lower frequency components are represented by smaller values. The maximum value of this hierarchical level indicates the splitting level (number of splits) of the wavelet transform at that time.

Further, as can be appreciated from the example in FIG. 4, as the processing is performed from the lower right area of the screen to the upper left area in a stepwise manner, low-frequency components are narrowed down. That is, in the example in FIG. 4, the upper left area of the screen that is split in four, with the lower right area of the screen being an area 3HH with the least low-frequency components (including the most high-frequency components), is further split in four, and of the four split areas, the upper left area is further split in four. The area at the most upper left corner is an area 0LL including the most low-frequency components.

The reason why transforms and splitting are repeated with respect to low-frequency components is that the energy of an image is concentrated in low-frequency components. This can be understood also from the fact that subbands are formed as shown in FIG. 5B as the splitting level is advanced from the state of splitting level=1 of which an example is shown in FIG. 5A, to the state of splitting level=3 of which an example is shown in FIG. 5B.

For example, the splitting level of the wavelet transform in FIG. 4 is 3 and, as a result of this, 10 subbands are formed.

The wavelet transform unit 51 normally performs the above-described process using a filter bank made up of a low-pass filter and a high-pass filter. Since a digital filter usually has an impulse response of a plurality of tap lengths, that is, filter coefficients, so it is necessary to buffer a sufficient amount of input image data or coefficient data for performing a filtering process in advance.

Also, similarly, in the case of performing a wavelet transform in a plurality of stages as well, it is necessary to buffer a number of pieces of the wavelet transform coefficients generated at the previous stage sufficient for performing a filtering process.

As a specific example of this wavelet transform, a method using a 5×3 filter will be described. This method using a 5×3 filter is adopted by the JPEG 2000 standard as well, and proves advantageous in that the method allows a wavelet transform to be performed with a small number of filter taps.

As shown in Equations (1) and (2) below, the impulse response (Z-transform expression) of a 5×3 filter is constituted by a low-pass filter $H_0(z)$ and a high-pass filter $H_1(z)$.

$$H_0(z)=(-1+2z^{-1}+6z^{-2}+2z^{-3}-z^{-4})/8 \quad (1)$$

$$H_1(z)=(-1+2z^{-1}-z^{-2})/2 \quad (2)$$

According to these Equations (1) and (2), the coefficients of low-frequency components and high-frequency components can be directly computed. At this time, by employing a lifting technique, the calculation in the filtering process can be reduced.

Next, this wavelet transform method will be described more specifically. FIG. 6 shows an example in which a filtering process by lifting with a 5×3 filter is executed up to decomposition level=2. In FIG. 6, the portion indicated as an analysis filter at the left side of the drawing is a filter of the wavelet transform unit 51 in FIG. 3. The portion indicated as a synthesis filter at the right side of the drawing is a filter of an inverse wavelet transform unit described later.

Incidentally, in the following description, it is assumed that with the pixel at the upper left corner of the screen as the first pixel in a display device or the like, for example, one line is formed as pixels are scanned from the left end to the right end of the screen, and one screen is formed as line-by-line scanning is done from the upper end to the lower end of the screen.

In FIG. 6, in the left end row, pieces of pixel data located at corresponding positions on the lines of original image data are shown as being aligned in the vertical direction. That is, a filtering process in the wavelet transform unit 51 is performed as pixels are scanned vertically on the screen using a vertical filter. The first through third rows from the left end indicate a filtering process at splitting level=1, and the fourth to sixth rows indicate a filtering process at splitting level=2. The second row from the left end indicates high-frequency component outputs based on the pixels of the original image data at the left end, and the third row from the left end indicates low-frequency component outputs based on the original image data and the high-frequency component outputs. As indicated by the fourth through sixth rows from the left end, in the filtering process at splitting level=2, processing is performed on the output of a filtering process at splitting level=1.

In the filtering process at decomposition level=1, as a filtering process at the first stage, coefficient data of high-frequency components is computed on the basis of the pixels of the original image data, and as a filtering process at the second stage, coefficient data of low-frequency components is computed on the basis of the coefficient data of high-frequency components computed in the filtering process at the first stage, and the pixels of the original image data. An example of the filtering process at decomposition level=1 is indicated by the first through third rows at the left side (analysis filter side) of FIG. 6. The computed coefficient data of high-frequency components is stored into the coefficient rearranging buffer unit 53 in FIG. 3. Further, the computed coefficient data of low-frequency components is stored into the intermediate calculation buffer unit 52 in FIG. 3.

In FIG. 6, the coefficient rearranging buffer unit 53 is shown as a portion enclosed within alternate long and short dashed lines, and the intermediate calculation buffer unit 52 is shown as a portion enclosed within dotted lines.

On the basis of the result of the filtering process at decomposition level=1 held in the intermediate calculation buffer unit 52, a filtering process at decomposition level=2 is performed. In the filtering process at decomposition level=2, with the coefficient data computed as the coefficients of low-frequency components in the filtering process at decomposition level=1 being regarded as coefficient data including both low-frequency components and high-frequency components, a filtering process similar to that at decomposition level=1 is performed. The coefficient data of high-frequency components and the coefficient data of low-frequency components, which are computed by the filtering process at decomposition level=2, are stored into the coefficient rearranging buffer unit 53.

The wavelet transform unit 51 performs the filtering process described above in each of the horizontal direction and vertical direction of the screen. For example, a filtering process at decomposition level=1 is performed in the horizontal direction, and the generated coefficient data of high-frequency components and low-frequency components is stored into the intermediate calculation buffer unit 52. Next, a filtering process at decomposition level=1 is performed in the vertical direction on the coefficient data stored in the intermediate calculation buffer unit 52. Though the processes in the horizontal and vertical directions at decomposition level=1, four areas are formed, including an area HH and an area HL respectively made up of pieces of coefficient data obtained by further decomposing high-frequency components into high-frequency components and low-frequency components, and an area LH and an area LL respectively made up of pieces of coefficient data obtained by further decomposing low-frequency components into high-frequency components and low-frequency components.

Then, at decomposition level=2, a filtering process is performed on the coefficient data of low-frequency components generated at decomposition level=1, with respect to each of the horizontal direction and the vertical direction. That is, at decomposition level=2, the area LL formed by splitting at decomposition level=1 is further split in four, and the area HH, area HL, area LH, and area LL are further formed inside the area LL.

The wavelet transform unit 51 performs a filtering process by a wavelet transform stepwise in a plurality of times, by splitting the filtering process into processes for each several lines with respect to the vertical direction of the screen. In the example in FIG. 6, in the first round of processing that is processing from the first line on the screen, a filtering process is performed with respect to seven lines. From the second round of processing onward, which is processing from the eighth line, a filtering process is performed every four lines. This number of lines is based on the number of lines necessary for the lowest-frequency components equivalent to one line to be generated after decomposition in two into high-frequency components and low-frequency components.

Incidentally, in the following, a collection of lines including other subbands necessary for generating the lowest-frequency components equivalent to one line (coefficient data equivalent to one line of a subband of the lowest-frequency components) is referred to as precinct (or line block). Here, a line represents a picture (frame or field) corresponding to image data prior to a wavelet transform, or pixel data or coefficient data equivalent to one line which is formed within each subband. That is, a precinct (line block) represents a group of pixel data in the original image data prior to a wavelet transform which is equivalent to a number of lines necessary for generating coefficient data equivalent to one line of a subband of the lowest-frequency components after the wavelet transform, or a group of coefficient data in individual subbands obtained by performing a wavelet transform on the group of pixel data.

According to FIG. 6, a coefficient C5 obtained as a result of a filtering process at decomposition level=2 is computed on the basis of a coefficient C4 and a coefficient $C_a$ that is stored in the intermediate calculation buffer unit 52, and the coefficient C4 is computed on the basis of the coefficient $C_a$, a coefficient $C_b$, and a coefficient $C_c$ that are stored in the intermediate calculation buffer unit 52. Furthermore, the coefficient $C_c$ is computed on the basis of a coefficient C2 and a coefficient C3 that are stored in the coefficient rearranging buffer unit 53, and the pixel data on the fifth line. Further, the coefficient C3 is computed on the basis of pixel data on the fifth line through seventh line. Thus, to obtain the coefficient C5 of low-frequency components at splitting level=2, pixel data on the first line through seventh line is necessary.

In contrast, from the second round of filtering process onward, coefficient data that has already been computed up to the previous round of filtering process and stored in the coefficient rearranging buffer unit 53 can be used, so a small number of lines suffices.

That is, according to FIG. 6, of the coefficients of low-frequency components obtained as a result of a filtering process at decomposition level=2, the coefficient C9, which is the next coefficient following the coefficient C5, is computed on the basis of the coefficient C4 and a coefficient C8, and the coefficient $C_c$ stored in the intermediate calculation buffer unit 52. The coefficient C4 has already been computed by the first round of filtering process described above and stored in the coefficient rearranging buffer unit 53. Similarly, the coefficient $C_c$ has already been computed by the first round of filtering process described above, and stored in the intermediate calculation buffer unit 52. Therefore, in this second round of filtering process, only a filtering process for computing the coefficient C8 is newly performed. This new filtering process is performed by further using the eighth line through eleventh line.

In this way, from the second round of filtering process onward, data that has been computed up to the previous round of filtering process and stored in the intermediate calculation buffer unit 52 and the coefficient rearranging buffer unit 53 can be used, so it suffices to perform processing only every four lines.

Incidentally, in a case where the number of lines on the screen does not coincide with the number of lines to be encoded, a filtering process is performed by replicating lines of original image data by a predetermined method to match the number of lines with the number of lines to be encoded.

In this way, a filtering process for obtaining coefficient data equivalent to one line of the lowest-frequency components is performed stepwise over a plurality of times (on a precinct-by-precinct basis) on the lines of the entire screen, thus making it possible to obtain a decoded image with low delay upon transmitting encoded data.

To perform a wavelet transform, a first buffer used for executing the wavelet transform itself, and a second buffer for storing coefficients generated in the course of executing processing up to a predetermined splitting level are required. The first buffer corresponds to the intermediate calculation buffer unit 52, and is shown enclosed within dotted lines in FIG. 6. Further, the second buffer corresponds to the coefficient rearranging buffer unit 53, and is shown enclosed within alternate long and short dashed lines in FIG. 6. Since coefficients stored in the second buffer are used at the time of decoding, the coefficients are subject to entropy encoding process at subsequent stages.

Next, a process in the coefficient rearranging unit 54 in FIG. 3 will be described. As described above, the coefficient data computed in the wavelet transform unit 51 is stored into the coefficient rearranging buffer unit 53, read after being rearranged in order by the coefficient rearranging unit 54, and sent out to the entropy encoding unit 55 on a coding-unit-by-coding-unit basis.

As already described, in a wavelet transform, coefficients are generated from the high-frequency component side to the low-frequency component side. In the example in FIG. 6, in the first round, from the pixel data of an original image, the coefficient C1, coefficient C2, and coefficient C3 of high-frequency components are sequentially generated by a filtering process at decomposition level=1. Then, a filtering process at decomposition level=2 is performed on the coefficient data of low-frequency components obtained by the filtering process at decomposition level=1, and the coefficient C4 and coefficient C5 of low-frequency components are sequentially generated. That is, in the first round, coefficient data is generated in the order of the coefficient C1, the coefficient C2, the coefficient C3, the coefficient C4, and the coefficient C5. In accordance with the principles of wavelet transform, the order of generation of coefficient data becomes this order (order from high frequencies to low frequencies) without fail.

In contrast, on the decoding side, to perform decoding immediately with low delay, it is necessary to perform generation and output of an image from low-frequency components. Thus, it is desirable that coefficient data generated on the encoding side be rearranged from the lowest-frequency component side to the high-frequency component side and then supplied to the decoding side.

A more specific description will be given by using the example in FIG. 6. The right side in FIG. 6 shows the synthesis filter side where an inverse wavelet transform is performed. The first round of synthesis process (inverse wavelet transform process) including the first line of output image data on the decoding side is performed by using the coefficient C4 and coefficient C5 of the lowest-frequency components generated by the first round of filtering process on the encoding side, and the coefficient C1.

That is, in the first round of synthesis process, coefficient data is supplied from the encoding side to the decoding side in the order of the coefficient C5, the coefficient C4, and the coefficient C1. On the decoding side, in the processing at synthesis level=2 that is a synthesis process corresponding to decomposition level=2, a synthesis process is performed on the coefficient C5 and the coefficient C4 to generate a coefficient $C_f$, which is stored into a buffer. Then, in the processing at synthesis level=1 that is a synthesis process corresponding to decomposition level=1, a synthesis process is performed on this coefficient $C_f$ and the coefficient C1, and the first line is outputted.

In this way, in the first round of synthesis process, coefficient data generated in the order of the coefficient C1, the coefficient C2, the coefficient C3, the coefficient C4, and the coefficient C5 on the encoding side and stored into the coefficient rearranging buffer unit 53 is rearranged in the order of the coefficient C5, the coefficient C4, the coefficient C1, ... and supplied to the decoding side.

On the synthesis filter side shown on the right side of FIG. 6, with respect to a coefficient supplied from the encoding side, the number of the coefficient on the encoding side is written inside the parentheses, and the line order in the synthesis filter is written outside the parentheses. For example, a coefficient C1(5) indicates that this is the coefficient C5 on the analysis filter side on the left side of FIG. 6, and is the first line on the synthesis filter side.

A synthesis process on the decoding side based on coefficient data generated by the second round of filtering process and onward on the encoding side can be performed by using coefficient data synthesized or supplied from the encoding side at the time of the previous synthesis process. In the example in FIG. 6, in the second round of synthesis process on the decoding side, which is performed by using the coefficient C8 and the coefficient C9 of low-frequency components generated by the second round of filtering process on the encoding side, the coefficient C2 and the coefficient C3 generated by the first round of filtering process on the encoding side are further required, and the second line through fifth line are decoded.

That is, in the second round of synthesis process, coefficient data is supplied in the order of the coefficient C9, the coefficient C8, the coefficient C2, and the coefficient C3 from the encoding side to the decoding side. On the decoding side, in the processing at synthesis level=2, a coefficient $C_g$ is generated by using the coefficient C8 and the coefficient C9, and the coefficient C4 supplied form the encoding side at the time of the first round of synthesis process, and is stored into the buffer. A coefficient $C_h$ is generated by using this coefficient $C_g$, the above-described coefficient C4, and the coefficient $C_f$ generated by the first round of synthesis process and stored in the buffer, and is stored into the buffer.

Then, in the processing at synthesis level=1, a synthesis process is performed by using the coefficients $C_g$ and $C_h$ generated by the processing at synthesis level=2 and stored in the buffer, and the coefficient C2 (indicated as coefficient C6(2) in the synthesis filter) and the coefficient C3 (indicated as coefficient C7(3) in the synthesis filter) supplied from the encoding side, and the second line through fifth line are decoded.

In this way, in the second round of synthesis process, coefficient data generated in the order of the coefficient C2, the coefficient C3, (the coefficient C4, the coefficient C5), the coefficient C6, the coefficient C7, the coefficient C8, and the coefficient C9 on the encoding side is rearranged in the order of the coefficient C9, the coefficient C8, the coefficient C2, the coefficient C3, . . . and supplied to the decoding side.

Similarly, from the third round of synthesis processes onward as well, coefficient data stored in the coefficient rearranging buffer unit 53 is rearranged in a predetermined order and supplied to the decoding unit, and lines are decoded every four lines.

Incidentally, in the synthesis process on the decoding side corresponding to the filtering process including the line at the lower end of the screen (hereinafter, referred to as the final round on the encoding side, all of coefficient data that have been generated through the processing so far and stored in the buffer are outputted, so the number of output lines becomes large. In the example in FIG. 6, eight lines are outputted in the final round.

Incidentally, the coefficient rearranging process by the coefficient rearranging unit 54 is done by, for example, setting read addresses from which coefficient data stored in the coefficient rearranging buffer unit 53 is read, in a predetermined order.

Figure 7:
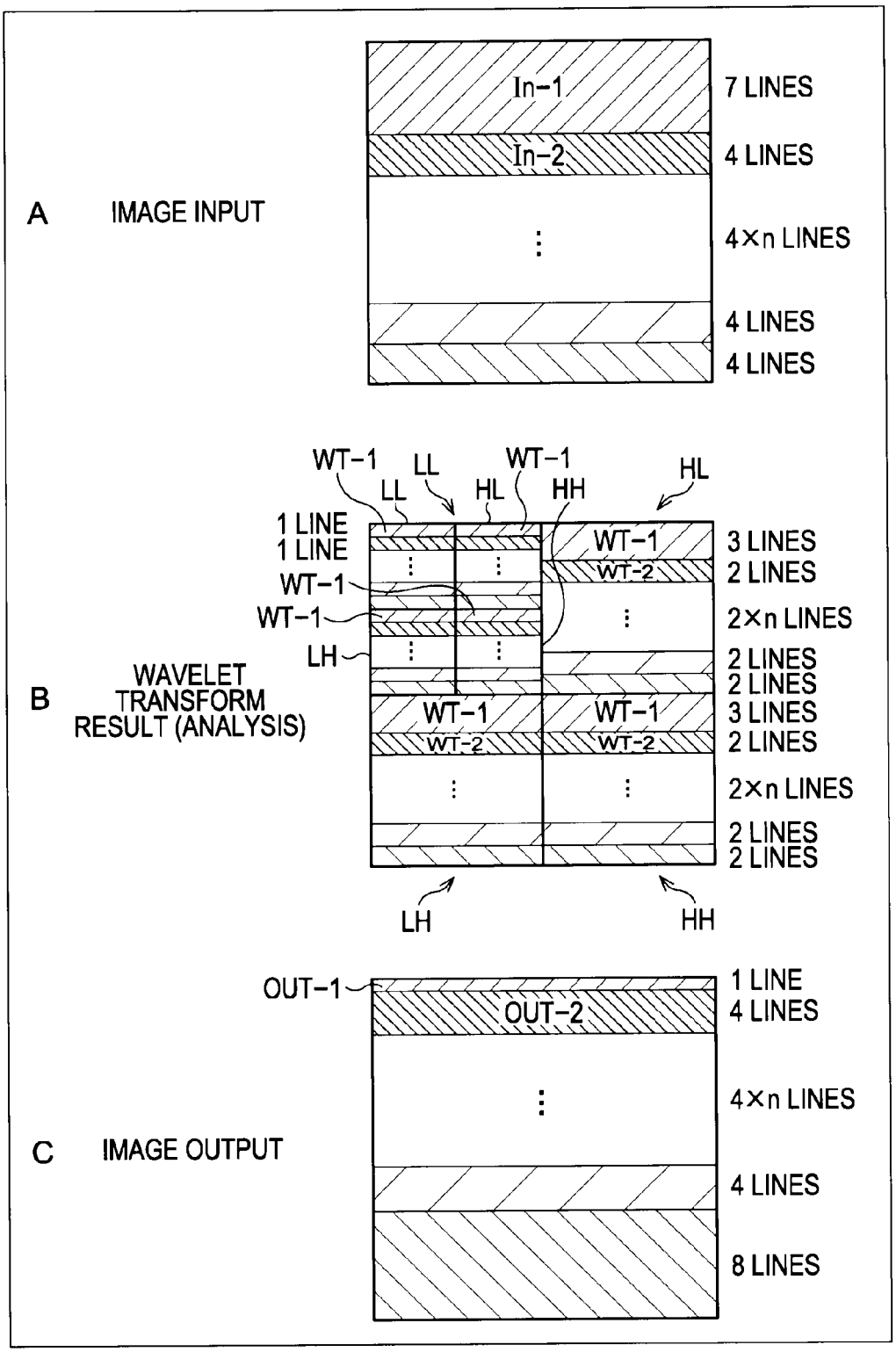
FIG. 7 is a simplified diagram schematically showing the flow of a wavelet transform and inverse wavelet transform according to the present invention.

The processing that has been described above so far will be described more specifically with reference to FIG. 7. FIG. 7 shows an example in which, by using a 5×3 filter, a filtering process by a wavelet transform is applied up to decomposition level=2. In the wavelet transform unit 51, as shown as an example in A of FIG. 7, the first round of filtering process is performed on the first line to seventh line of input image data in each of the horizontal and vertical directions (In-1 in A of FIG. 7).

In the first round of filtering process at decomposition level=1, coefficient data equivalent to three lines based on the coefficient C1, the coefficient C2, and the coefficient C3 is generated, and as shown as an example in B of FIG. 7, is arranged in each of the areas HH, HL, and LH that are formed at decomposition level=1 (WT-1 in B of FIG. 7).

Further, the area LL formed at decomposition level=1 is further split in four by a filtering process in the horizontal and vertical directions at decomposition level=2. As for the coefficient C5 and the coefficient C4 generated at decomposition level=2, within the area LL at decomposition level=1, one line based on the coefficient C5 is arranged in the area LL, and one line based on the coefficient C4 is arranged in each of the area HH, area HL, and area LH.

From the second round of filtering process onward by the wavelet transform unit 51, a filtering process is performed every four lines (In-2 . . . in A of FIG. 7), pieces of coefficient data for each two lines are generated at decomposition level=1 (WT-2 in B of FIG. 7), and pieces of coefficient data for each one line are generated at decomposition level=2.

In the example of the second round in FIG. 6, coefficient data equivalent to two lines of the coefficient C6 and the coefficient C7 is generated by the filtering process at decomposition level=1, and as shown in an example in B of FIG. 7, is arranged following the coefficient data generated in the first round of filtering process in the area HH, area HL, and area LH formed at decomposition level=1. Similarly, within the area LL at decomposition level=1, the coefficient C9 equivalent to one line generated by the filtering process at decomposition level=2 is arranged in the area LL, and the coefficient C8 equivalent to one line is arranged in each of the area HH, area HL, and area LH.

Upon decoding the data that has been wavelet transformed as shown in B of FIG. 7, as shown as an example in C of FIG. 7, with respect to the first round of filtering process based on the first line through seventh line on the encoding side, the first line based on the first round of synthesis process on the decoding side is outputted (Out-1 in C of FIG. 7).

Subsequently, for filtering processes from the second round to the round immediately preceding the final round on the encoding side, four lines are outputted at a time on the decoding side (Out-2 . . . in C of FIG. 7). Then, with respect to the final round of filtering process on the encoding side, eight lines are outputted on the decoding side.

The coefficient data generated from the high-frequency component side to the low-frequency component side in the wavelet transform unit 51 are sequentially stored into the coefficient rearranging buffer unit 53. When coefficient data is accumulated in the coefficient rearranging buffer unit 53 to a point where the rearranging of coefficient data described above becomes possible, the coefficient rearranging unit 54 reads the coefficient data from the coefficient rearranging buffer unit 53 after rearranging the coefficient data in the order required for the synthesis process. The coefficient data that has been read is sequentially supplied to the entropy encoding unit 55.

The entropy encoding unit 55 sequentially encodes the supplied coefficient data, and outputs the generated encoded data to the outside of the encoding unit 14.

Image data encoded in the encoding unit 14 as described above, that is, encoded data is supplied to the packet generating unit 15 in FIG. 1.

Figure 8:
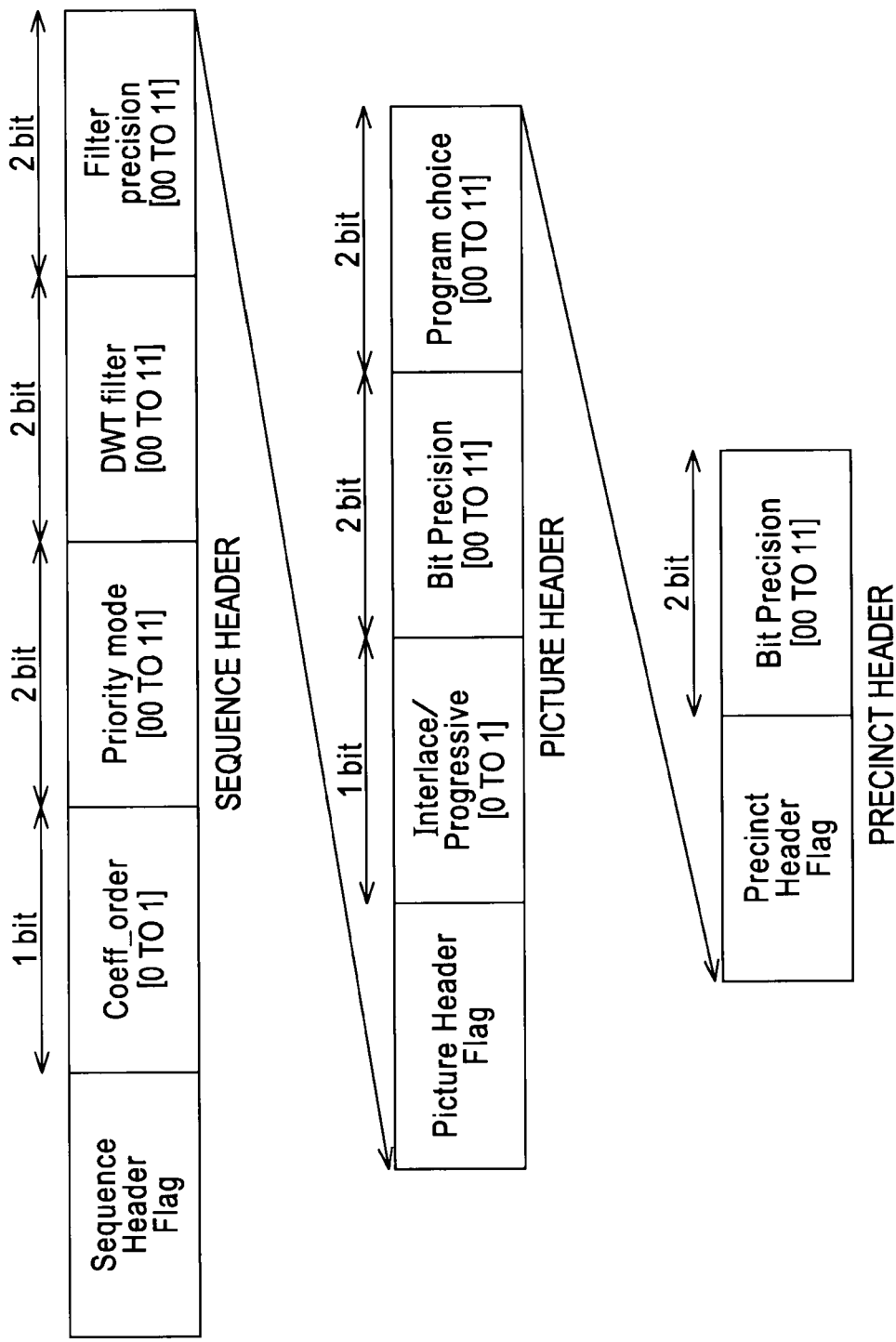
FIG. 8 is a diagram showing a configuration example of headers.

Next, FIG. 8 is a diagram showing a configuration example of headers generated in the header generating unit 17 in FIG. 1.

In the header generating unit 17, a sequence header, a picture header, and a precinct header are generated. The sequence header, the picture header, and the precinct header make up a hierarchical structure.

In the sequence header, a Sequence Header Flag that is a flag indicating the presence of a sequence header is arranged at the beginning, and following the Sequence Header Flag, 1-bit Coeff_order, 2-bit Priority mode, 2-bit DWT filter, and 2-bit Filter precision are sequentially arranged.

In the picture header, a Picture Header Flag that is a flag indicating the presence of a picture header is arranged at the beginning, and following the Picture Header Flag, 1-bit Interlace/Progressive, 2-bit Bit Precision, and 2-bit Program Choice are sequentially arranged.

In the precinct header, a Precinct Header Flag that is a flag indicating the presence of the precinct header is arranged at the beginning, and following the Precinct Header Flag, 2-bit Bit Precision is arranged.

Figure 9:
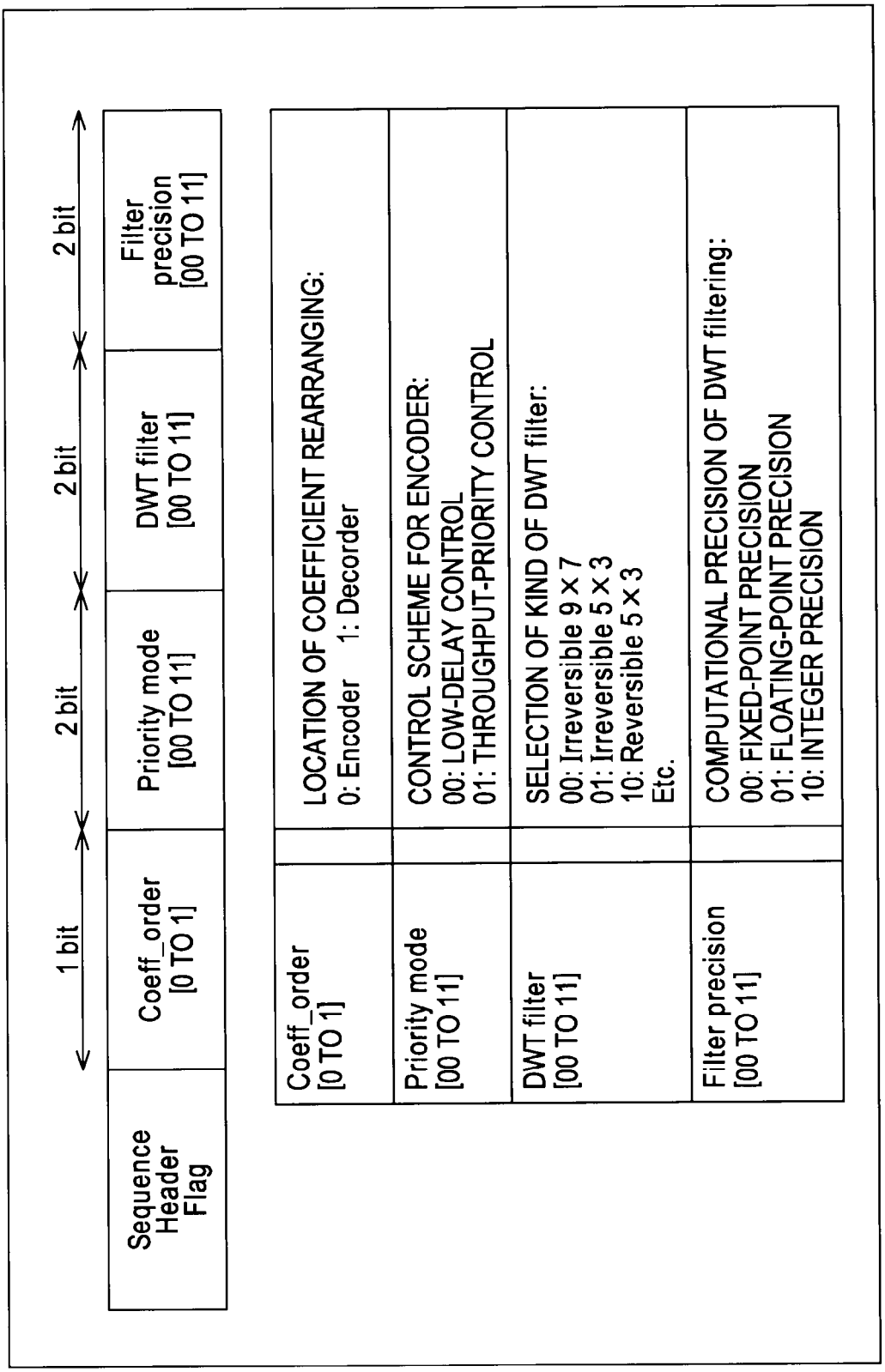
FIG. 9 is a diagram illustrating a sequence header.

Next, referring to FIG. 9, the sequence header will be described.

The Coeff_order in the sequence header indicates the location of coefficient rearranging. For example, if the Coeff_order is 0, this indicates that rearranging of coefficients is performed on the encoder side, and if the Coeff_order is 1, this indicates that rearranging of coefficients is performed on the decoder side.

While the process of coefficient rearranging can be performed in the coefficient rearranging unit 54 of the encoding unit 14 as described above with reference to FIG. 3, the process can be also performed in the decoding unit 36 (for example, a coefficient rearranging unit 65 of the decoding unit 36 in FIG. 48 described later), without being performed in the encoding unit 14. That is, the process of coefficient rearranging is a process that is shared by the encoding unit 14 and the decoding unit 36, and the Coeff_order is shared-process identifying information.

Since the process of coefficient rearranging requires a circuit for executing the process, and a buffer (memory) for accumulating coefficients, whether the process of coefficient rearranging is to be performed by the encoding unit 14 or the decoding unit 36 is selected on the basis of whether the encoding unit 14 or the decoding unit 36 can be equipped with those hardware. For example, in a case where the encoding unit 14 is incorporated into a device with a relatively low throughput, like a so-called portable terminal such as a portable telephone terminal or a PDA (Personal Digital Assistant), a portable game device, or a compact camera, a large amount of memory cannot be built in. Hence, inevitably, the decoding unit 36 performs the coefficient rearranging process.

On the other hand, in a case where the encoding unit 14 is incorporated into a device with a relatively high throughput and having abundant power supply and abundant hardware, such as a broadcasting device or a digital transmitter for professionals, the coefficient rearranging process is performed in the encoding unit 14.

In a case where, for example, the encoding unit 14 and the decoding unit 36 can both perform a coefficient rearranging process, and a coefficient rearranging process is performed in the encoding unit 14, the Coeff_order in the sequence header is 0, and the process of coefficient rearranging can be skipped in the decoding unit 36.

The Priority mode in the sequence header is control identifying information indicating the control scheme for an encoder. For example, if the Priority mode is 00, this indicates that a low-delay control is performed in the encoder, and if the Priority mode is 01, this indicates that a control that gives priority to throughput is performed in the encoder. Incidentally, in the Priority mode, 10 or 11 is used for indicating another control scheme in cases such as when a control scheme is extended.

For example, in the control that gives priority to throughput, it is optimal to employ such a control that causes processing by the entropy encoding unit 55 to be performed as soon as processing by the wavelet transform unit 51 of the encoding unit 14 in FIG. 3 is finished. On the other hand, in the low-delay control, it is optimal to employ such a control that causes processing by the wavelet transform unit 51, and processing by the entropy encoding unit 55 to be performed in a parallel fashion. For example, in a case where low-delay control is selected in the encoding unit 14, the decoding unit 36 is notified of the fact that a low-delay control has been selected, and a low-delay control is also selected in the decoding unit 36, thus reducing delay as a whole.

The DWT filter in the sequence header is filter information indicating selection of the kind of a DWT filter. For example, if the DWT filter is 00, this indicates that image data is subjected to filtering by Irreversible 9×7, if the DWT filter is 01, this indicates that image data is subjected to filtering by Irreversible 5×3, and if the DWT filter is 10, this indicates that image data is subjected to filtering by Reversible 5×3. Incidentally, 11 in the DWT filter is used when image data is subjected to filtering by another kind of filter, for example, an originally designed filter, to indicate that the filter is being selected.

For example, as for the 5×3 filter and the 9×7 filter adopted by the JPEG 2000 standard, with the 9×7 filter, the number of computations is approximately twice in terms of simple calculation, and the amount of memory required for calculation is also larger. Thus, in a case where it is desired to lighten the load on hardware, it is appropriate to select a 5×3 filter in the encoding unit 14 and the decoding unit 36. On the other hand, since a 9×7 filter enables high-performance filtering, it is appropriate to select a 9×7 filter when there is a need for high image quality.

The Filter precision in the sequence header is filtering-process-precision information indicating the computational precision of DWT filtering. For example, if the Filter precision is 00, this indicates that DWT filtering is applied with fixed-point precision, if the Filter precision is 01, this indicates that DWT filtering is applied with floating-point precision, and if the Filter precision is 10, this indicates that DWT filtering is applied with integer precision.

For example, a computation with floating-point precision places the greatest load on hardware, and a computation with integer precision places the least load on hardware. Therefore, by determining the computational precision as appropriate in accordance with the throughput of hardware, it is possible to make effective use of hardware resources. Further, a floating-point precision is desired when processing high-definition images. Incidentally, the computational precision can be selected as described with reference to FIG. 42 described later.

Figure 10:
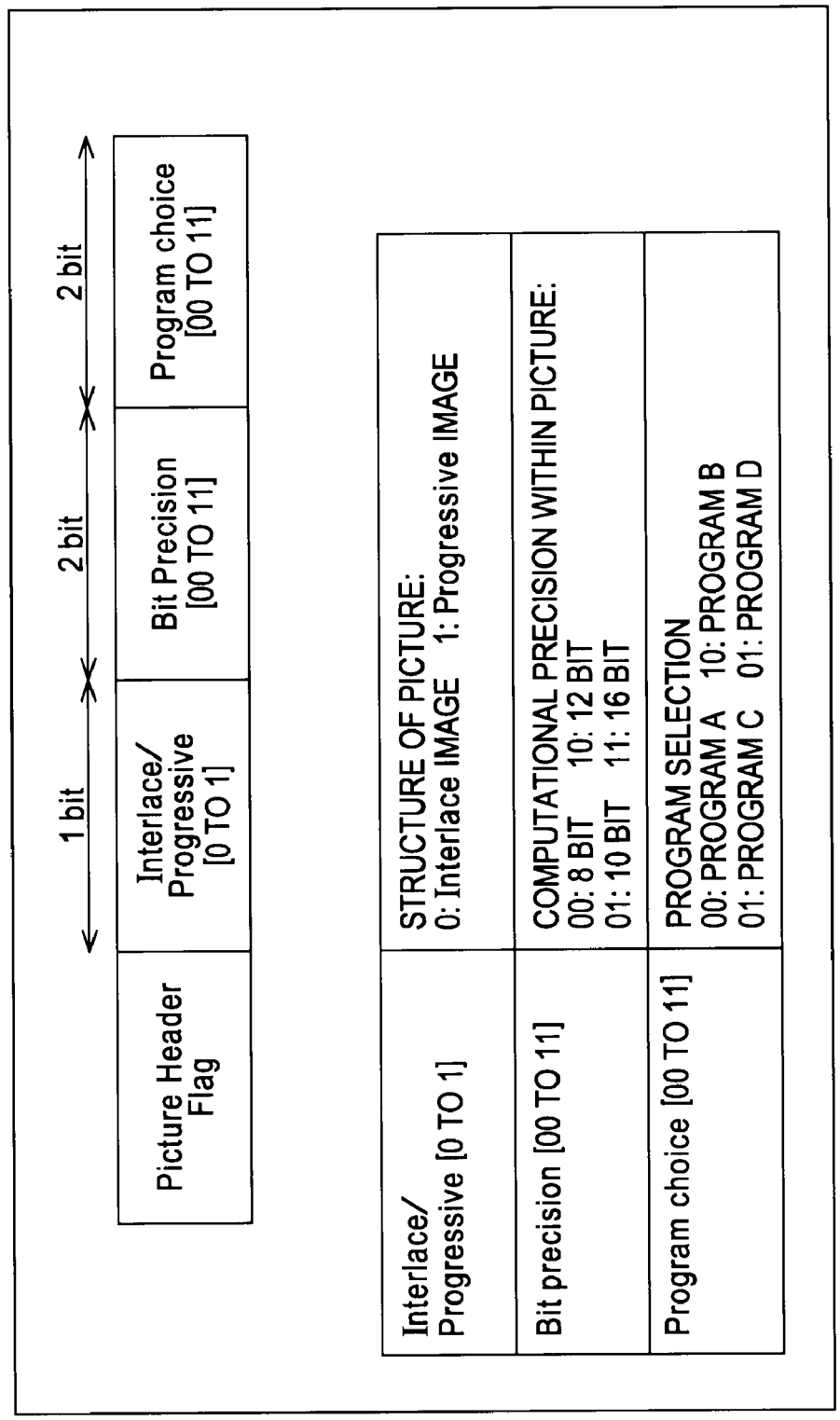
FIG. 10 is a diagram illustrating a picture header.

Next, referring to FIG. 10, the picture header will be described.

The Interlace/Progressive in the picture header indicates the structure of a picture. For example, if the Interlace/Progressive is 0, this indicates that the picture is an Interlace image, and if the Interlace/Progressive is 1, this indicates that the picture is a Progressive image.

Here, for example, the image signal for television broadcasting is interlaced, but the image signal for a personal computer or movie is progressive. Further, in the case of outputting from the decoding unit 36 as well, since a liquid crystal television receiver is progressive, if the image signal is interlaced, it is necessary to convert the signal into progressive for output. Further, in the case of interlace, encoding processing and decoding processing are performed on a fieldby-field basis, whereas in the case of progressive, encoding processing and decoding processing are performed on a frame-by-frame basis. From these differences, by notifying the decoding unit 36 of whether a picture is interfaced or progressive on a picture-by-picture basis from the encoding unit 14, optimal processing can be performed in the decoding unit 36.

The Bit Precision in the picture header indicates computational precision within a picture. For example, if the Bit Precision is 00, this indicates that the picture is computed with 8-bit precision, if the Bit Precision is 01, this indicates that the picture is computed with 10-bit precision, if the Bit Precision is 10, this indicates that the picture is computed with 12-bit precision, and if the Bit Precision is 11, this indicates that the picture is computed with 16-bit precision.

For example, in a case where an input image is 8 bit, it is known that after a wavelet transform for decomposition in four, the wavelet transform coefficients are extended to 12 bit, and in a case where an input image is 12 bit, it is known that after a wavelet transform for decomposition in four, the wavelet transform coefficients are extended to 16 bit. Therefore, to maintain precision, it is necessary to execute encoding processing while maintaining the precision required for the wavelet transform coefficients. That is, in a case where a 12-bit precision is requested by the encoding unit 14, even if there are enough resources to allow a computation with 16-bit precision in the decoding unit 36, a computation with 12-bit precision is executed, thereby making it possible to perform decoding with small resources.

The Program Choice in the picture header is program identifying information indicating the selection of the kind of program used for encoding and decoding of a picture. For example, if the Program Choice is 00, this indicates that a program A is selected, if the Program Choice is 01, this indicates that a program B is selected, if the Program Choice is 10, this indicates that a program C is selected, and if the Program Choice is 11, this indicates that a program D is selected.

Here, the programs A through D are programs respectively corresponding to encoding methods A through D to which methods of assigning CPUs or memories described later are applied. For example, the encoding unit 14 can make a selection as described with reference to the flowchart in FIG. 43 described later, and the decoding unit 36 can select a decoding method corresponding to the encoding method selected by the encoding unit 14, on the basis of the picture header.

Figure 11:
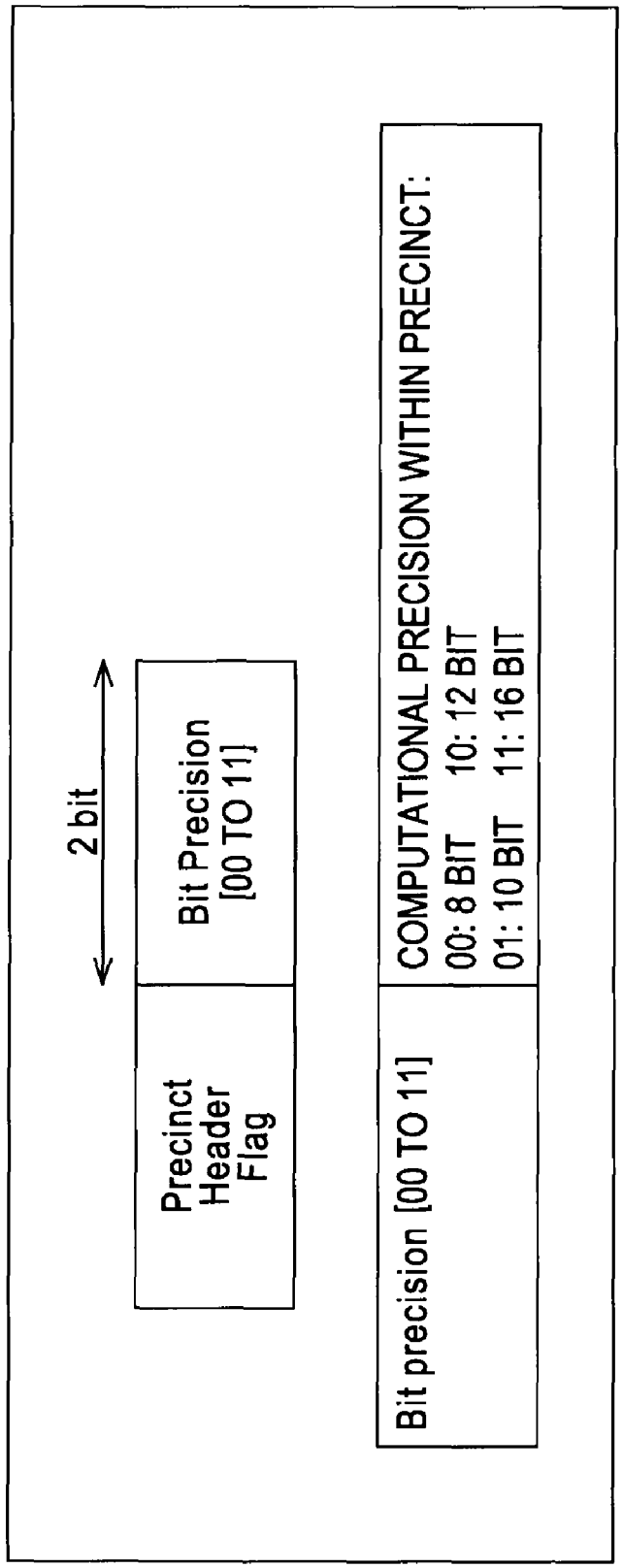
FIG. 11 is a diagram illustrating a precinct header.

Next, referring to FIG. 11, the precinct header will be described.

The Bit Precision in the precinct header indicates computational precision within a precinct. For example, if the Bit Precision is 00, this indicates that the precinct is computed with 8-bit precision, if the Bit Precision is 01, this indicates that the precinct is computed with 10-bit precision, if the Bit Precision is 10, this indicates that the precinct is computed with 12-bit precision, and if the Bit Precision is 11, this indicates that the precinct is computed with 16-bit precision.

By notifying the computational precision by the Bit Precision in the precinct header, similarly to the Bit Precision in the picture header, it is possible to make effective use of the resources of the decoding unit 36. Incidentally, in a case where the computational precision indicated by the Bit Precision in the picture header, and the computational precision indicated by the Bit Precision in the precinct header differ, priority is given to the computational precision indicated by the Bit Precision in the precinct header differ.

The shared-process identifying information, the control identifying information, the filter information, the filtering process precision information, and the program identifying information are generated by the identifying information generating unit 21, are supplied to each of the sequence header generating unit 18, the picture header generating unit 19, and the precinct header generating unit 20, and a sequence header, a picture header, and a precinct header are generated, that is, a flag is set in each of the sequence header, the picture header, and the precinct header.

By generating these pieces of information in advance on the encoding device 13 side, and sending them to the decoding device 32 to be used in the decoding device 32, in the decoding device 32, the determination for process selection (for example, the process of determining the program selection in FIG. 45 described later) can be omitted, and a load associated with decoding can be lightened. In the program selecting process, in particular, the determination as to whether there is a program feature that enables decoding can be made by simply referring to the information.

In the encoding device 13, encoding processing may be performed with different programs as appropriate by time-dividing the encoding processing and providing selection modes adaptively in accordance with the amount of data (processing load) associated with encoding. That is, with respect to a series of images, the encoding device 13 can perform encoding by selecting the program A in a given period, perform encoding by selecting the program D in the next period, and perform encoding by selecting the program C in the further next period.

Figure 12:
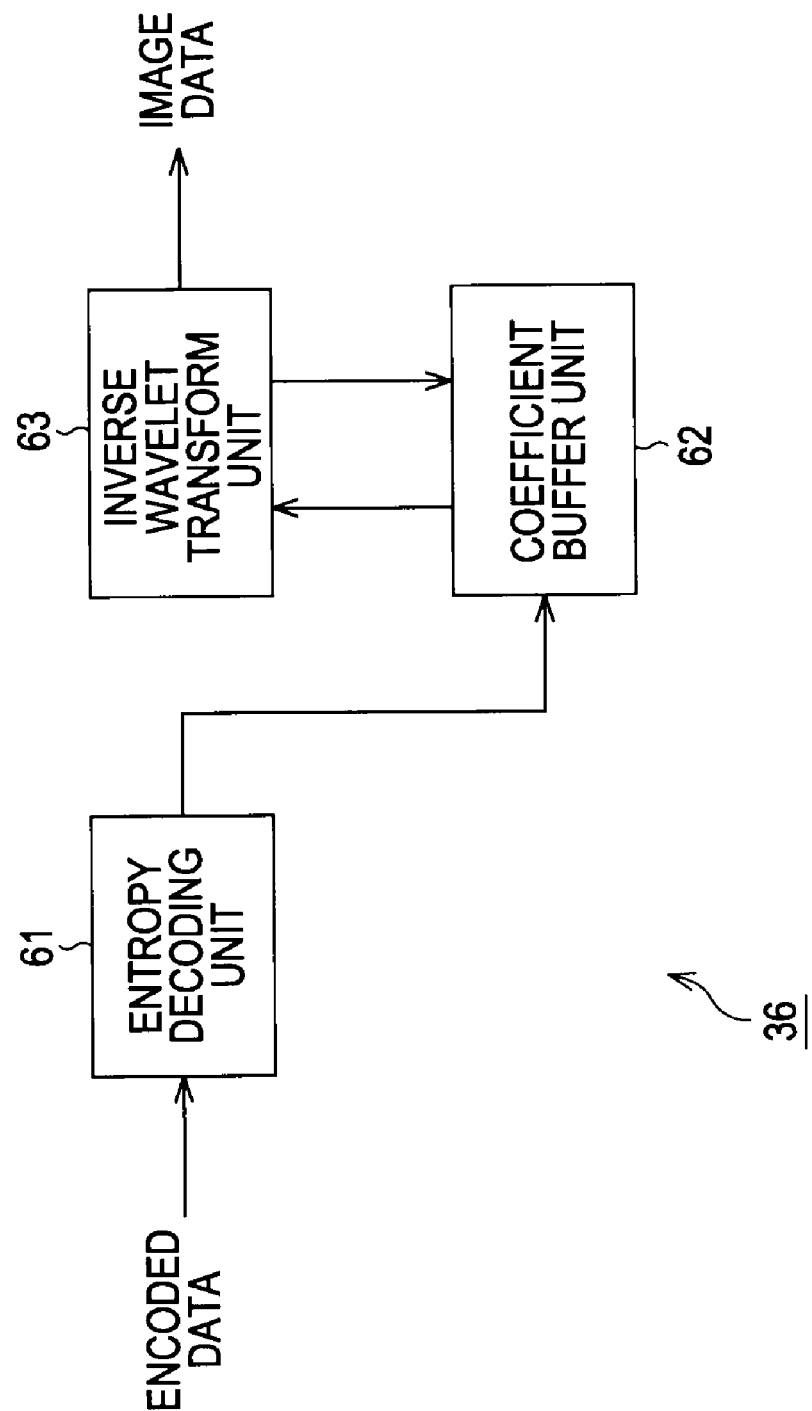
FIG. 12 is a block diagram showing a configuration example of a decoding unit 36.

Next, FIG. 12 is a block diagram showing a configuration example of the decoding unit 36 in FIG. 2.

As shown in FIG. 12, the decoding unit 36 has the features of an entropy decoding unit 61, a coefficient buffer unit 62, and an inverse wavelet transform unit 63.

The entropy decoding unit 61 decodes encoded data that has been supplied, by a decoding method corresponding to an encoding method employed by the entropy encoding unit 55 (FIG. 3), and obtains coefficient data. The coefficient data is stored into the coefficient buffer unit 62. The inverse wavelet transform unit 63 performs a synthesis filtering process (inverse wavelet transform) by a synthesis filter, by using the coefficient data stored in the coefficient buffer unit 62, and stores the result of the synthesis filtering process into the coefficient buffer unit 62 again. Upon obtaining decoded image data (output image data) by repeating this process in accordance with the decomposition level, the inverse wavelet transform unit 63 outputs it to the outside.

Next, referring to FIGS. 13 through 16, a description will be given of the flow of processes executed by individual units.

Figure 13:
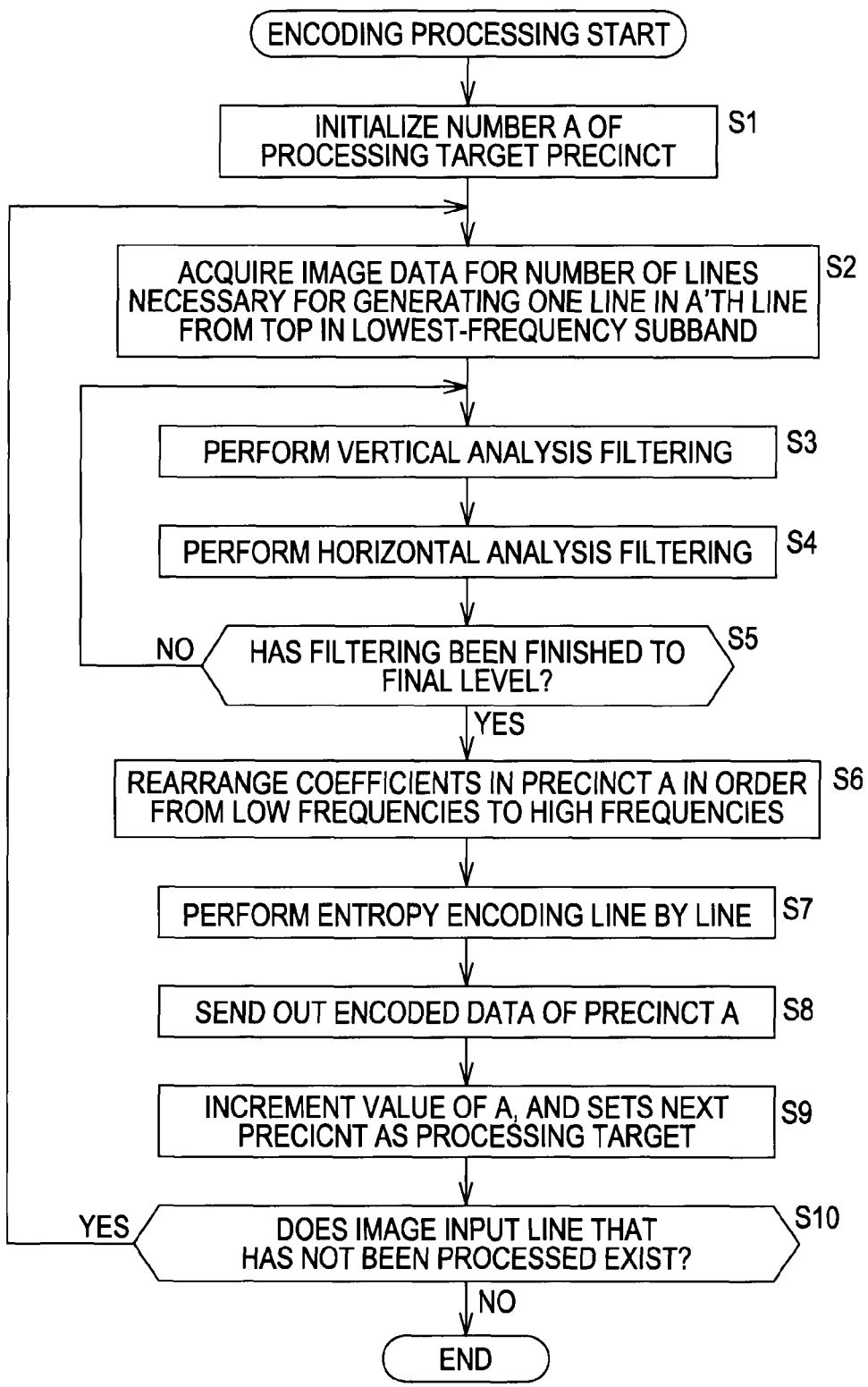
FIG. 13 is a flowchart illustrating a process of encoding image data.

FIG. 13 is a flowchart illustrating a process of encoding image data by the encoding unit 14 in FIG. 3.

When encoding processing is started, the wavelet transform unit 51 of the encoding unit 14 initializes the number A of a processing target precinct in step S1. Normally, the number A is set to "1". When the setting is finished, in step S2, the wavelet transform unit 51 acquires image data for a number of lines (that is, one precinct) necessary for generating one line in the A'th line from the top in the lowest-frequency subband. In step S3, the wavelet transform unit 51 performs on the image data a vertical analysis filtering process for performing analysis filtering on image data arrayed in the screen vertical direction, and in step S4, performs horizontal analysis filtering process for performing an analysis filtering process on image data arrayed in the screen horizontal direction.

In step S5, the wavelet transform unit 51 determines whether or not the analysis filtering process has been performed to the final level. If it is determined that the decomposition level has not reached the final level, the processing returns to step S3, and the analysis filtering processes in step S3 and step S4 are repeated with respect to the current decomposition level.

If it is determined in step S5 that the analysis filtering process has been performed to the final level, the processing proceeds to step S6.

In step S6, the coefficient rearranging unit 54 rearranges the coefficients in a precinct A (the A'th precinct from the top of a picture (frame or field)) in the order from low frequencies to high frequencies. The entropy encoding unit 55 applies entropy encoding line by line to the coefficients in step S7, and in step S8, sends out the encoded data of the precinct A.

In step S9, the wavelet transform unit 51 increments the value of the number A by "1" and sets the next precinct as a processing target, and in step S10, determines whether or not an image input line that has not been processed exist, with respect to a processing target picture (frame or field). If it is determined that an image input line that has not been processed exists, the processing returns to step S2, and subsequent processing is repeated with respect to a new processing target precinct.

In this way, the processes from step S2 through step S10 are repeatedly executed, and individual precincts are encoded. Then, if it is determined in step S10 that an image input line that has not been processed does not exist, encoding processing on the picture is terminated. Encoding processing is started anew with respect to the next picture.

In this way, the wavelet transform unit 51 successively performs a vertical analysis filtering process and a horizontal analysis filtering process on a precinct-by-precinct basis up to the final level. Thus, as compared with conventional methods, the amount of data that needs to be held (buffered) at once (at the same time) is small, thereby making it possible to significantly reduce the memory capacity of the buffer that needs to be made available. In addition, since the analysis filtering process is performed up to the final level, processes such as coefficient rearranging and entropy encoding at subsequence stages can be also performed (that is, coefficient rearranging or entropy encoding can be performed on a precinct-by-precinct basis). Therefore, delay time can be significantly reduced as compared with methods in which a wavelet transform is performed on the entire screen.

Figure 14:
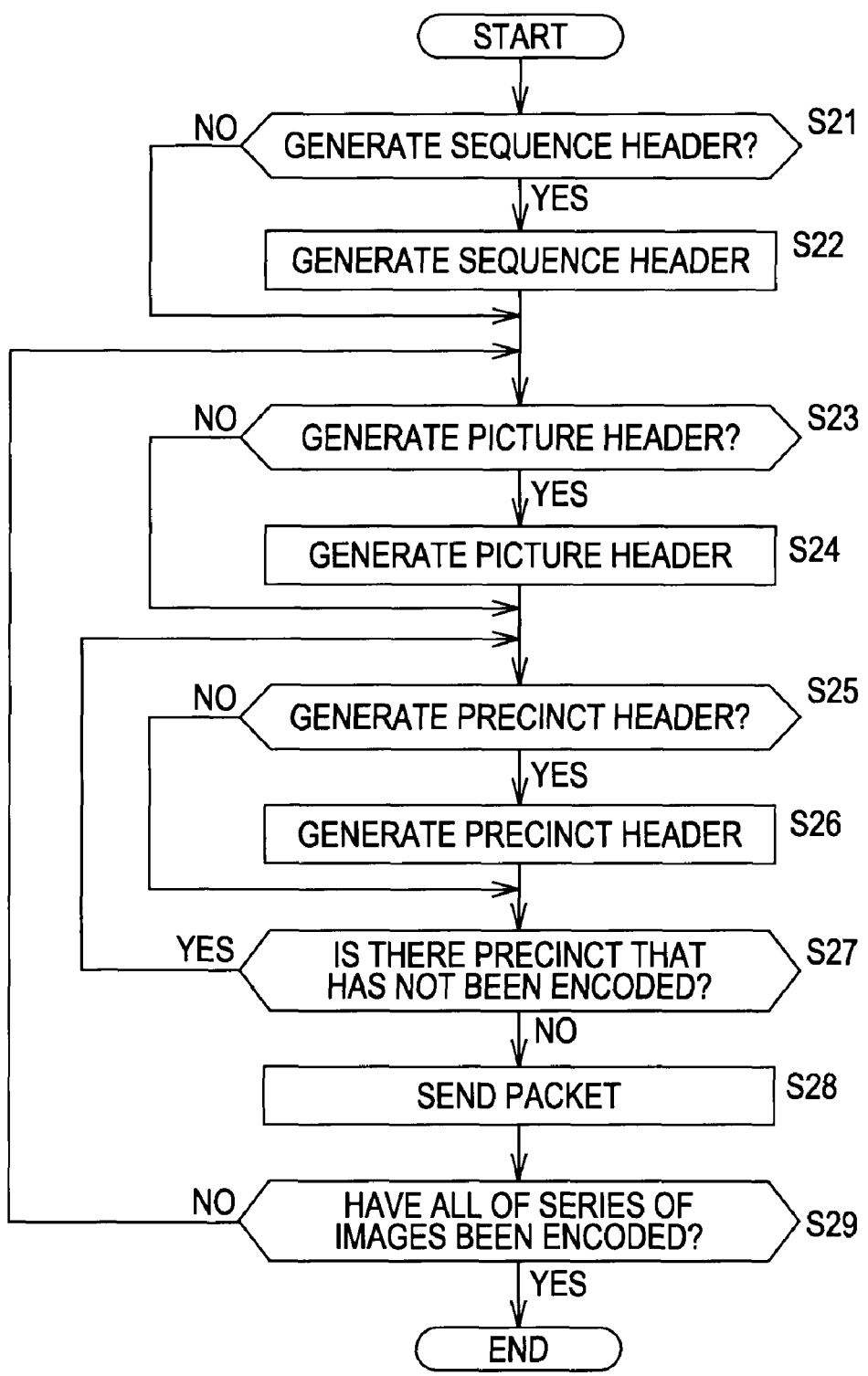
FIG. 14 is a flowchart illustrating a process of generating headers.

Next, FIG. 14 is a flowchart illustrating a process of generating headers by the header generating unit 17 in FIG. 1.

The process is started simultaneously with the starting of encoding processing in the encoding unit 14. In step S21, the packet generating unit 15 determines whether or not to generate (describe) a sequence header.

For example, if the image as an encoding target in encoding processing is the first image of a series of images sent from the encoding device 13, the packet generating unit 15 determines to generate a sequence header. On the other hand, if the image is not the first image, the packet generating unit 15 determines not to generate a sequence header.

If the packet generating unit 15 determines in step S21 to generate a sequence header, the processing proceeds to step S22, and the packet generating unit 15 supplies a signal instructing generation of a sequence header to the sequence header generating unit 18. When supplied with the signal instructing generation of a sequence header from the packet generating unit 15, the sequence header generating unit 18 acquires information (parameters) as shown in FIG. 9 from the identifying information generating unit 21 to generate a sequence header, supplies the sequence header to the packet generating unit 15, and the processing proceeds to step S23.

On the other hand, if the packet generating unit 15 determines in step S21 not to generate a sequence header, the processing proceeds to step S23 by skipping step S22.

In step S23, the packet generating unit 15 determines whether or not to generate (describe) a picture header.

For example, the packet generating unit 15 determines to generate a picture header if the image as an encoding target is the first image after encoding processing is started, and if encoding parameters have been changed from the previous encoding target image. On the other hand, the packet generating unit 15 determines not to generate a picture header if encoding parameters have not been changed from the previous encoding target image.

If the packet generating unit 15 determines in step S23 to generate a picture header, the processing proceeds to step S24, and the packet generating unit 15 supplies a signal instructing generation of a picture header to the picture header generating unit 19. When supplied with the signal instructing generation of a picture header from the packet generating unit 15, the picture header generating unit 19 acquires information (parameters) as shown in FIG. 10 from the identifying information generating unit 21 to generate a picture header, supplies the picture header to the packet generating unit 15, and the processing proceeds to step S25.

On the other hand, if the packet generating unit 15 determines in step S23 not to generate a picture header, the processing proceeds to step S25 by skipping step S24. In this case, the packet generating unit 15 adds to the image the same picture header as the picture header used with respect to the previous encoding target image.

In step S25, the packet generating unit 15 determines whether or not to generate (describe) a precinct header.

For example, the packet generating unit 15 determines to generate a precinct header if the precinct as an encoding target is the first precinct after encoding processing is started, and if encoding parameters have been changed from the previous encoding target precinct. On the other hand, the packet generating unit 15 determines not to generate a precinct header if encoding parameters have not been changed from the previous encoding target precinct.

If the packet generating unit 15 determines in step S25 to generate a precinct header, the processing proceeds to step S26, and the packet generating unit 15 supplies a signal instructing generation of a precinct header to the precinct header generating unit 20. When supplied with the signal instructing generation of a precinct header from the packet generating unit 15, the precinct header generating unit 20 acquires information (parameters) as shown in FIG. 11 from the identifying information generating unit 21 to generate a precinct header, supplies the precinct header to the packet generating unit 15, and the processing proceeds to step S27.

On the other hand, if the packet generating unit 15 determines in step S25 not to generate a precinct header, the processing proceeds to step S27 by skipping step S26. Incidentally, in this case, the packet generating unit 15 adds to the precinct the same precinct header as the precinct header used with respect to the previous encoding target precinct.

In step S27, the packet generating unit 15 determines whether or not a precinct that has not been encoded exists within the image being currently an encoding processing target.

If the packet generating unit 15 determines in step S27 that a precinct that has not been encoded exists within the image being currently an encoding processing target, the processing returns to step S25, and similar processing is repeated thereafter.

On the other hand, if the packet generating unit 15 determines in step S27 that a precinct that has not been encoded does not exist within the image being currently an encoding processing target, that is, if all the precincts within the image being currently an encoding processing target have been encoded, the processing proceeds to step S28.

In step S28, the sending unit 16 sends a packet in which the sequence header generated in step S22, the picture header generated in step S24, or the precinct header generated in step S26 is added to the encoded data outputted from the encoding unit 14.

After the process of step S28, the processing proceeds to step S29, and the packet generating unit 15 determines whether or not all of the series of images sent from the encoding device 13 have been encoded.

If the packet generating unit 15 determines in step S29 that not all of the series of images sent from the encoding device 13 have been encoded, that is, if there is still the next image to be encoded, the processing returns to step S23, and thereafter, similar processing is repeated with the next image as an encoding target.

On the other hand, if the packet generating unit 15 determines in step S29 that all of the series of images sent from the encoding device 13 have been encoded, the processing is terminated.

Figure 15:
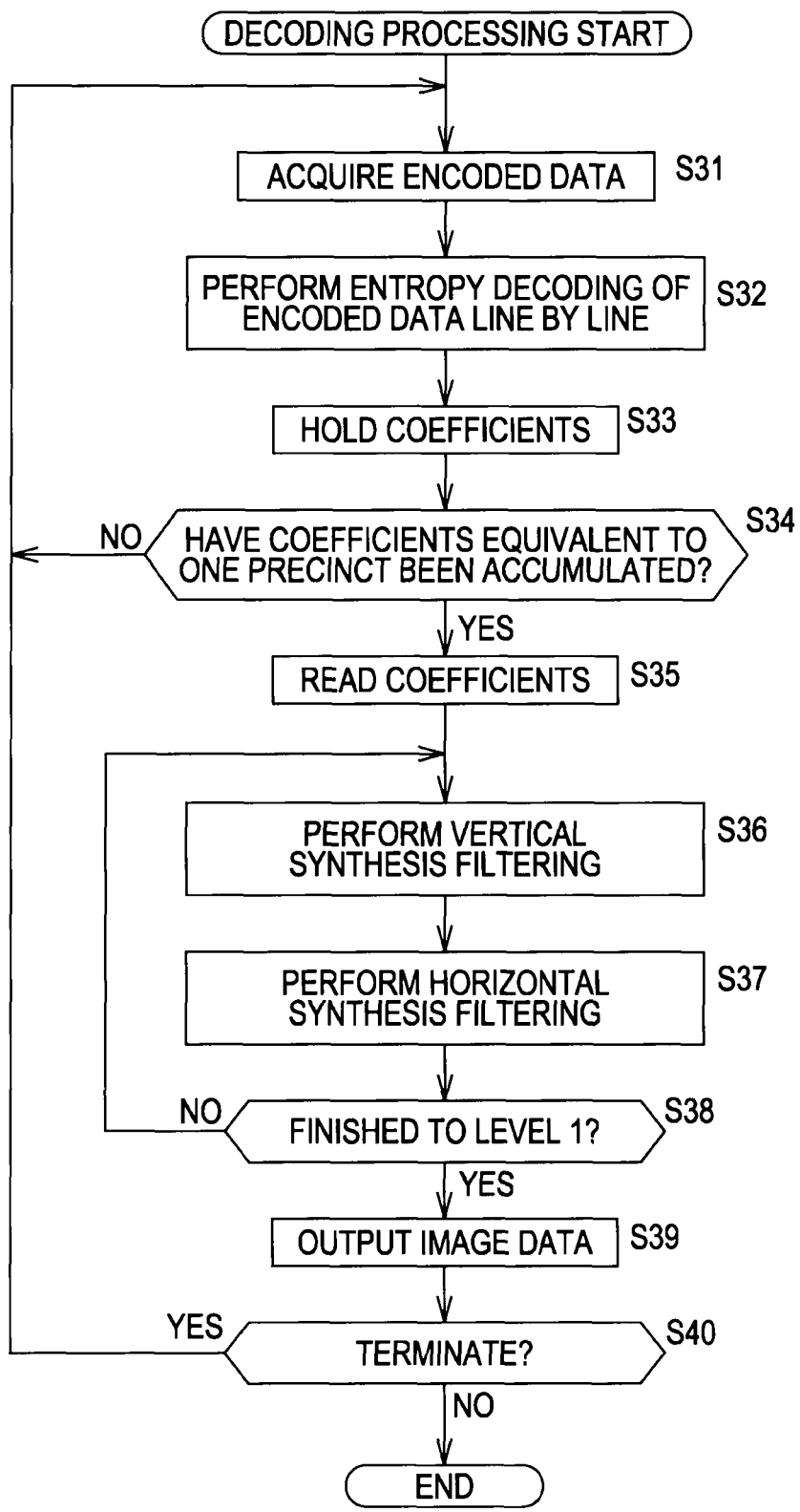
FIG. 15 is a flowchart illustrating a process of decoding image data.

Next, FIG. 15 is a flowchart illustrating a process of decoding image data by the decoding unit 36 in FIG. 12.

When decoding processing is started, in step S31, the entropy decoding unit 61 acquires encoded data supplied from the outside of the decoding unit 36, and in step S32, performs entropy decoding of the encoded data line by line. In step S33, the coefficient buffer unit 62 holds the coefficient data obtained by the decoding. In step S34, the inverse wavelet transform unit 63 determines whether or not coefficient data equivalent to one precinct has been accumulated in the coefficient buffer unit 62. If it is determined that coefficient data equivalent to one precinct has not been accumulated, the processing returns to step S31, and subsequent processing is executed. That is, the inverse wavelet transform unit 63 waits on standby until coefficient data equivalent to one precinct is accumulated in the coefficient buffer unit 62.

If it is determined in step S34 that coefficient data equivalent to one precinct has been accumulated in the coefficient buffer unit 62, the processing proceeds to step S35. In step S35, the inverse wavelet transform unit 63 reads coefficient data held in the coefficient buffer unit 62 equivalent to one precinct, and in step S36, performs on the read coefficient data a vertical synthesis filtering process for performing a synthesis filtering process on coefficient data arrayed in the screen vertical direction, and in step S37, performs a horizontal synthesis filtering process for performing a synthesis filtering process on coefficient data arrayed in the screen horizontal direction. In step S38, the inverse wavelet transform unit 63 determines whether or not the synthesis filtering process has been finished to level 1 (level at which the value of the decomposition level is "1"), that is, whether or not an inverse transform has been performed up to the state prior to the wavelet transform. If it is determined that level 1 has not been reached, the processing returns to step S36, and the filtering processes in step S36 and step S37 are repeated.

If it is determined in step S38 that the inverse wavelet transform process has been finished to level 1, the processing proceeds to step S39. In step S39, the inverse wavelet transform unit 63 outputs the image data obtained by the inverse wavelet transform process to the outside.

In step S40, the entropy decoding unit 61 determines whether or not to terminate decoding processing. If it is determined not to terminate decoding processing, the process returns step S31, and subsequent processing is repeated. If it is determined in step S40 that decoding processing is to be terminated due to the end of a precinct or the like, the decoding processing is terminated.

In the case of conventional methods of inverse wavelet transform, with respect to all the coefficients at a decomposition level as a processing target, first, horizontal synthesis filtering process is performed in the screen horizontal direction, and then a vertical synthesis filtering process is performed in the screen vertical direction. That is, upon each synthesis filtering process, the result of the synthesis filtering process needs to be held in the buffer. At that time, it is necessary for the buffer to hold the synthesis filtering result at a decomposition level at that point, and all the coefficients at the next decomposition level, and thus a very large memory capacity is required (the amount of data to be held is large).

Further, in this case, no image data output is performed until all the inverse wavelet transforms are finished within a picture (frame or field), so the delay time from an input to an output increases.

In contrast, in the case of the inverse wavelet transform unit 63 of the decoding unit 36, as described above, a vertical synthesis filtering process and a horizontal synthesis filtering process are performed successively on a precinct-by-precinct basis up to level 1. Thus, as compared with conventional methods, the amount of data that needs to be buffered at once (at the same time) is small, thereby making it possible to significantly reduce the memory capacity of the buffer that needs to be made available. Further, since the synthesis filtering process (inverse wavelet transform process) is performed up to level 1, image data can be sequentially outputted (on a precinct-by-precinct basis) before all of image data within a picture are obtained, thereby making it possible to significantly reduce delay time in comparison to conventional methods.

Figure 16:
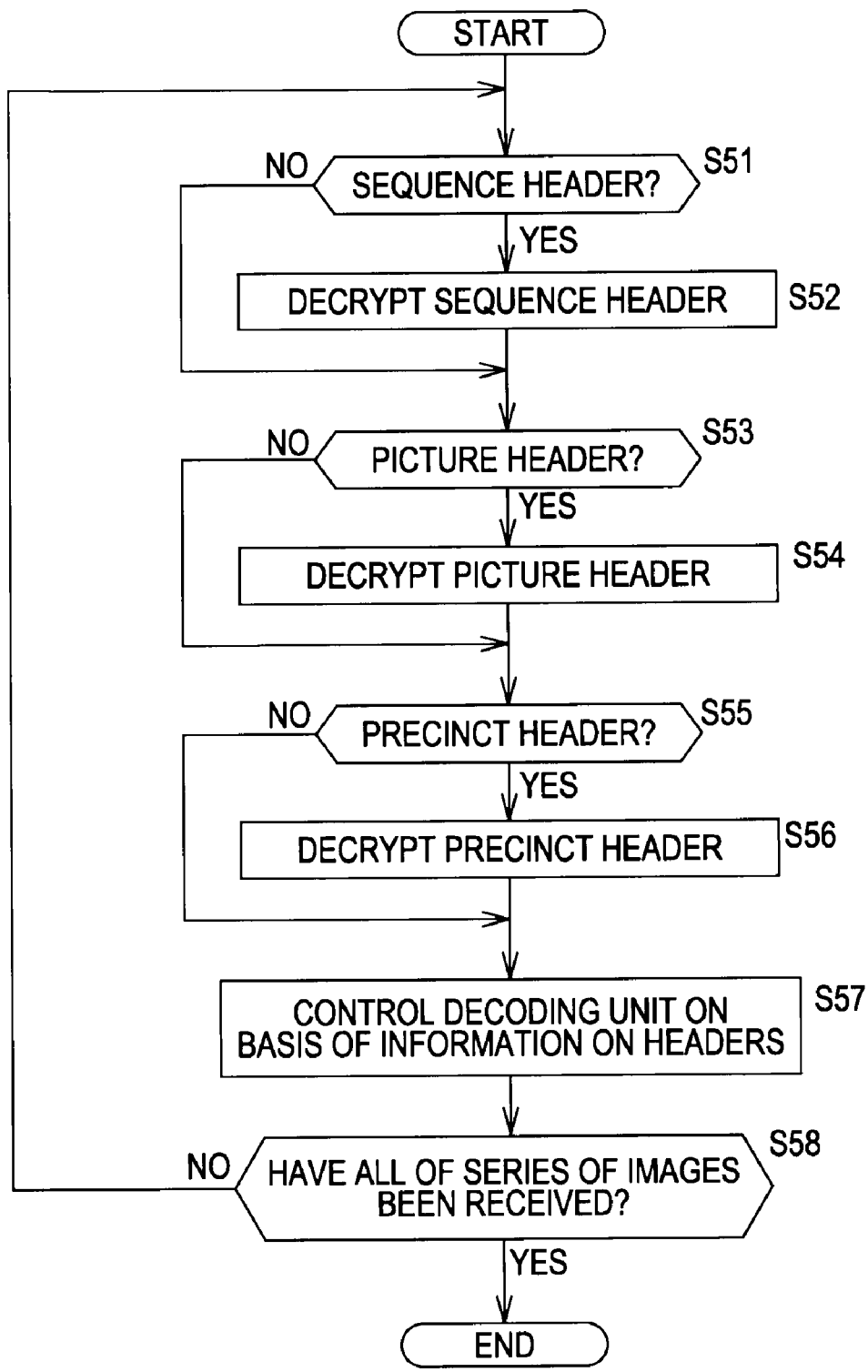
FIG. 16 is a flowchart illustrating a process of analyzing headers.

Next, FIG. 16 is a flowchart illustrating a process of decrypting headers by the header decrypting unit 38 in FIG. 2.

When decoding processing is started, in step S51, the packet decrypting unit 35 determines whether or not a header extracted from a packet is a sequence header.

If the packet decrypting unit 35 determines in step S51 that the header extracted from the packet is a sequence header, the processing proceeds to step S52, and the packet decrypting unit 35 supplies the sequence header to the sequence header decrypting unit 39. The sequence header decrypting unit 39 decrypts the sequence header supplied from the packet decrypting unit 35, acquires information (parameters) contained in the sequence header and supplies the information to the identifying information acquiring unit 42, and the processing proceeds to step S53.

On the other hand, if the packet decrypting unit 35 determines in step S51 that the header extracted from the packet is not a sequence header, the processing proceeds to step S53 by skipping step S52.

In step S53, the packet decrypting unit 35 determines whether or not the header extracted from the packet is a picture header.

If the packet decrypting unit 35 determines in step S53 that the header extracted from the packet is a picture header, the processing proceeds to step S54, and the packet decrypting unit 35 supplies the sequence header to the picture header decrypting unit 40. The picture header decrypting unit 40 decrypts the picture header supplied from the packet decrypting unit 35, and if information (parameters) contained in the picture header has been updated, that is, if the information has been changed from information contained in the previous acquired picture header, the information is acquired and supplied to the identifying information acquiring unit 42, and the processing proceeds to step S55.

On the other hand, if the packet decrypting unit 35 determines in step S53 that the header extracted from the packet is not a picture header, the processing proceeds to step S55 by skipping step S54.

In step S55, the packet decrypting unit 35 determines whether or not the header extracted from the packet is a precinct header.

If the packet decrypting unit 35 determines in step S55 that the header extracted from the packet is a precinct header, the processing proceeds to step S56, and the packet decrypting unit 35 supplies the precinct header to the precinct header decrypting unit 41. The precinct header decrypting unit 41 decrypts the precinct header supplied from the packet decrypting unit 35, and if information (parameters) contained in the precinct header has been updated, that is, if the information has been changed from information contained in the previous acquired precinct header, the information is acquired and supplied to the identifying information acquiring unit 42, and the processing proceeds to step S57.

On the other hand, if the packet decrypting unit 35 determines in step S55 that the header extracted from the packet is not a precinct header, the processing proceeds to step S57 by skipping step S56.

In step S57, the identifying information acquiring unit 42 supplies the information supplied from the sequence header decrypting unit 39 in step S52, the information supplied from the picture header decrypting unit 40 in step S54, or the information supplied from the precinct header decrypting unit 41 in step S56, to the decoding control unit 43. The decoding control unit 43 controls the decoding unit 36 in such a way that the decoding unit 36 performs decoding processing in a processing scheme based on those pieces of information.

After the process of step S57, the processing proceeds to step S58, and the packet decrypting unit 35 determines whether or not all of the series of images sent from the encoding device 13 have been received.

If the packet decrypting unit 35 determines in step S58 that not all of the series of images sent from the encoding device 13 have been received, the processing returns to step S51, and thereafter, similar processing is repeated.

On the other hand, if the packet decrypting unit 35 determines in step S58 that all of the series of images sent from the encoding device 13 have been received, the processing is terminated.

As described above, by setting various flags for applying a process that is common to the encoding unit 14 and the decoding unit 36, in each of the sequence header, the picture header, and the precinct header, it is possible to make effective use of resources in the encoding unit 14 and the decoding unit 36, for example, to optimally select the computational precision, the kind of a wavelet transform, assignment of CPUs, or the like in accordance with an application.

Figure 17:
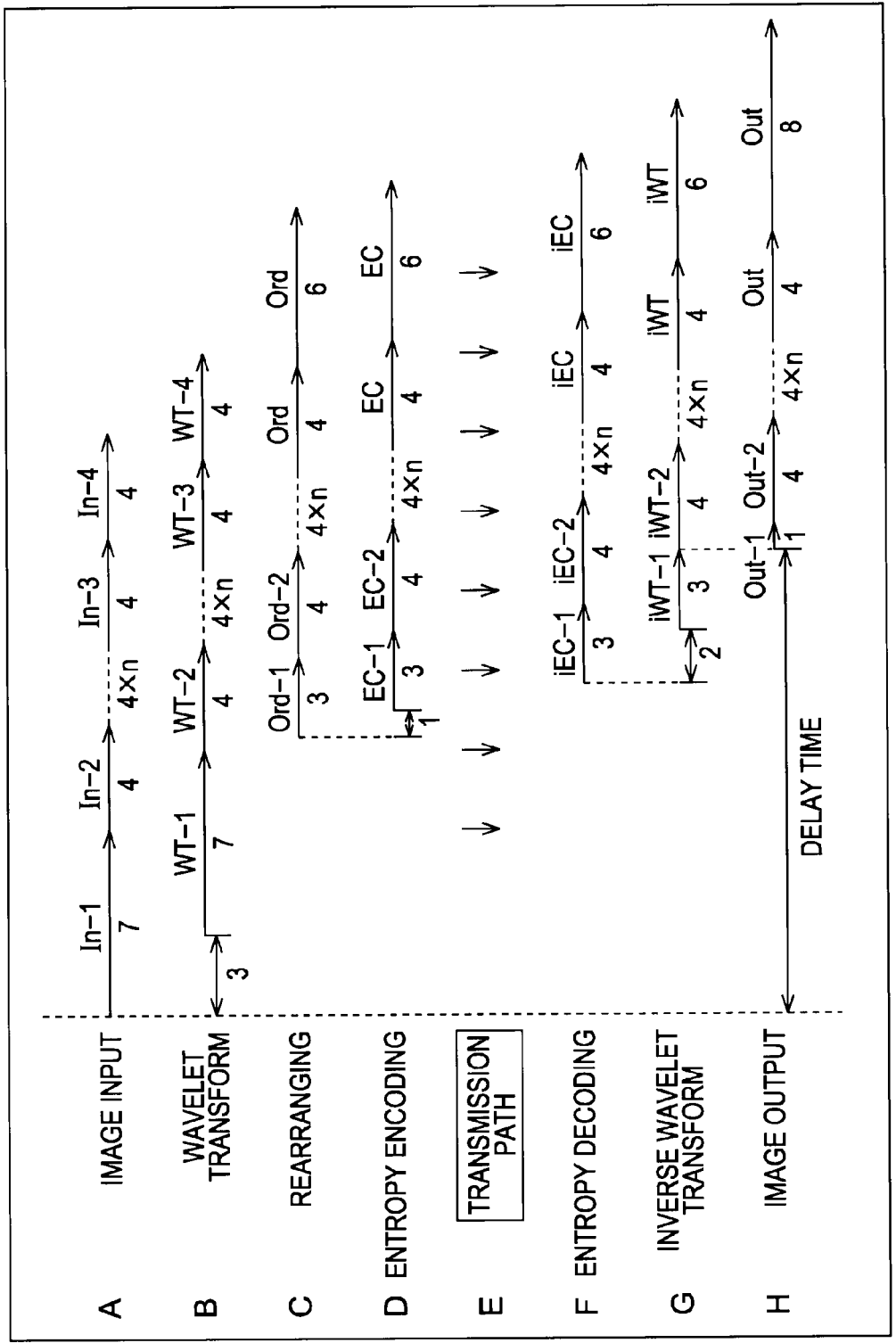
FIG. 17 is a simplified diagram schematically showing an example of parallel operations performed by individual elements of an encoding unit and decoding unit.

The various processes described above can be executed in a parallel fashion as appropriate as shown in FIG. 17, for example.

FIG. 17 is a diagram schematically showing an example of parallel operations of individual elements of processes executed by the individual units in the encoding unit 14 shown in FIG. 3 and decoding unit 36 shown in FIG. 12. This FIG. 17 corresponds to FIG. 6 described above. With respect to an input In-1 of image data (A of FIG. 17), a first wavelet transform WT-1 is applied by the wavelet transform unit 51 (FIG. 3) (B of FIG. 17). As described above with reference to FIG. 6, this first wavelet transform WT-1 is started at the point in time when the first three lines are inputted, and the coefficient C1 is generated. That is, there is a delay equivalent to three lines until the wavelet transform WT-1 is started after the input of image data In-1.

The generated coefficient data is stored into the coefficient rearranging buffer unit 53 (FIG. 3). Thereafter, a wavelet transform is applied to inputted image data, and when the first round of processing is finished, the processing directly shifts to the second round of wavelet transform WT-2.

In a manner parallel with the input of image data In-2 for the second round of wavelet transform WT-2, and the process of the second round of wavelet transform WT-2, rearranging Ord-1 of three coefficients, the coefficient C1, the coefficient C4, and the coefficient C5 is executed by the coefficient rearranging unit 54 (FIG. 3) (C of FIG. 17).

Incidentally, the delay from when the wavelet transform WT-1 is finished to when the rearranging Ord-1 is started is a delay based on device or system configuration, for example, a delay associated with transmission of a control signal for instructing the coefficient rearranging unit 54 to perform a rearranging process, a delay required for the coefficient rearranging unit 54 to start processing in response to the control signal, or a delay required for program processing, and is not a delay intrinsic to encoding processing.

The coefficient data is read from the coefficient rearranging buffer unit 53 in the finishing order of rearranging, supplied to the entropy encoding unit 55 (FIG. 3), and undergoes entropy encoding EC-1 (D of FIG. 17). This entropy encoding EC-1 can be started without waiting for the finishing of rearranging of all of the three coefficients, the coefficient C1, the coefficient C4, and the coefficient C5. For example, at the point in time when rearranging of one line based on the coefficient C5 that is outputted first is finished, entropy encoding with respect to the coefficient C5 can be started. In this case, the delay from when the process of the rearranging Ord-1 is started to when the process of the entropy encoding EC-1 is started is equivalent to one line.

The encoded data for which the entropy encoding EC-1 by the entropy encoding unit 55 has been finished is transmitted to the decoding unit 36 (FIG. 12) after being subjected to predetermined signal processing (E of FIG. 17).

As described above, with respect to the encoding unit 14, image data is sequentially inputted up to the line at the lower end on the screen, following the image data input equivalent to seven lines by the first round of processing. In the encoding unit 14, following an input In-n (n is 2 or larger) of image data, a wavelet transform WT-n, rearranging Ord-n, and entropy encoding EC-n are performed every four lines as described above. Rearranging Ord and entropy encoding EC with respect to the final round of processing in the encoding unit 14 are performed on six lines. These processes are performed in the encoding unit 14 in a parallel fashion as illustrated in A of FIG. 17 through D of FIG. 17.

The encoded data encoded by the entropy encoding EC-1 by the encoding unit 14 is supplied to the decoding unit 36. The entropy decoding unit 61 (FIG. 12) of the decoding unit 36 sequentially performs decoding iEC-1 of entropy codes, with respect to the supplied encoded data encoded by the entropy encoding EC-1, thus reconstructing coefficient data (F of FIG. 17). The reconstructed coefficient data is sequentially stored into the coefficient buffer unit 62. Once an enough amount of coefficient data for performing an inverse wavelet transform is stored in the coefficient buffer unit 62, the inverse wavelet transform unit 63 reads coefficient data from the coefficient buffer unit 62, and performs an inverse wavelet transform iWT-1 by using the read coefficient data (G of FIG. 17).

As described above with reference to FIG. 6, the inverse wavelet transform iWT-1 by the inverse wavelet transform unit 63 can be started at the point in time when the coefficient C4 and the coefficient C5 are stored into the coefficient buffer unit 62. Therefore, the delay from when the decoding iEC-1 by the entropy decoding unit 61 is started to when the inverse wavelet transform iWT-1 by the inverse wavelet transform unit 63 is started is equivalent to two lines.

In the inverse wavelet transform unit 63, when the inverse wavelet transform iWT-1 for three lines by the first wavelet transform is finished, output Out-1 of image data generated by the inverse wavelet transform iWT-1 is performed (H of FIG. 17). At the output Out-1, as described above with reference to FIG. 6 and FIG. 7, image data of the first line is outputted.

Following the input of the encoded coefficient data equivalent to three lines by the first round of processing in the encoding unit 14, coefficient data encoded by entropy encoding EC-n (n is 2 or larger) is sequentially inputted to the decoding unit 36. In the decoding unit 36, as described above, entropy decoding iEC-n and an inverse wavelet transform iWT-n are performed every four lines, and output Out-n of image data reconstructed by the inverse wavelet transform iWT-n is sequentially performed. The entropy decoding iEC and the inverse wavelet transform iWT corresponding to the final round in the encoding unit 14 are performed on six lines, and eight lines are outputted as the output Out. As illustrated in F of FIG. 17 through H of FIG. 17, in the decoding unit 36, these processes are performed in a parallel fashion.

As described above, individual processes in the encoding unit 14 and the decoding unit 36 are performed in a parallel fashion in order from the upper part to lower part of the screen, thereby making it possible to perform image compression processing and image decoding processing with lower delay.

Referring to FIG. 17, a delay time from an image input to an image output in a case where a wavelet transform is performed to decomposition level=2 using a 5×3 filter is calculated. The delay time from when image data of the first line is inputted to the encoding unit 14, to when the image data of the first line is outputted from the decoding unit 36 is the total sum of individual elements mentioned below. Incidentally, here, delays that vary depending on the system configuration, such as a delay in the transmission path, and a delay associated with the actual processing timings in individual units of the device, are excluded.

(1) Delay D_WT from the first line input to when a wavelet transform WT-1 for seven lines is finished (2) Time D_Ord associated with coefficient rearranging Ord-1 for three lines (3) Time D_EC associated with entropy encoding EC-1 for three lines (4) Time D_iEC associated with entropy decoding iEC-1 for three lines (5) Time D_iWT associated with an inverse wavelet transform iWT-1 for three lines Referring to FIG. 17, calculation of the delays due to the individual elements described above is attempted. The delay D_WT in (1) is a time equivalent to 10 lines. The time D_Ord in (2), and time D_EC in (3), the time D_iEC in (4), and the time D_iWT in (5) are each a time equivalent to three lines. Further, in the encoding unit 14, the entropy encoding EC-1 can be started one line after the rearranging Ord-1 is started. Similarly, in the decoding unit 36, the inverse wavelet transform iWT-1 can be started two lines after the entropy decoding iEC-1 is started. Further, as for the entropy decoding iEC-1, processing can be started at the point in time when encoding for one line is finished by entropy encoding EC-1.

Therefore, in this example in FIG. 17, the delay time from when image data of the first line is inputted to the encoding unit 14, to when the image data of the first line is outputted from the decoding unit 36 is equivalent to 10+1+1+2+3=17 lines.

The delay time will be discussed by way of a more specific example. In a case where inputted image data is an interlaced video signal of the HDTV (High Definition Television), for example, one frame is configured with a resolution of 1920 pixels×1080 lines, and one field is 1920 pixels×540 lines. Therefore, provided that the frame frequency is 30 Hz, 540 lines as one field are inputted to the encoding unit 14 in a time of 16.67 msec (=1 sec/60 fields).

Therefore, a delay time associated with the input of image data equivalent to seven lines is 0.216 msec (=16.67 msec× 7/540 lines), which is an extremely short time relative to, for example, the updating time of one field. Further, with regard to the total sum of the above-described delay D_WT in (1), time D_Ord in (2), time D_EC in (3), time D_iEC in (4), and time D_iWT in (5) as well, the number of lines to be processed is small, so the delay time is extremely shortened.

Figure 18:
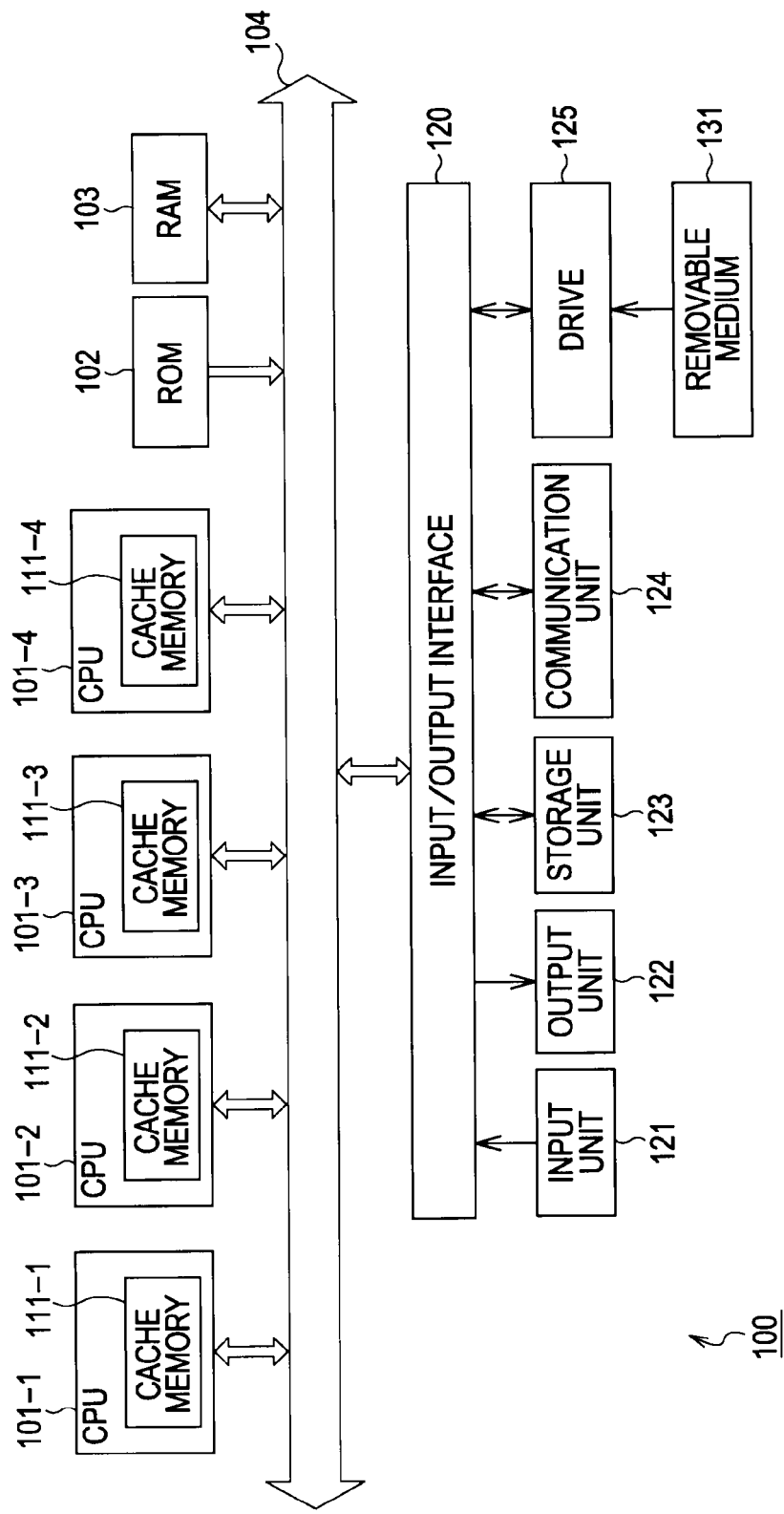
FIG. 18 is a block diagram showing a configuration example of a personal computer.

Next, a description will be given of hardware in which the software encoder or software decoder mentioned above are implemented. FIG. 18 is a block diagram showing a configuration example of a personal computer.

In FIG. 18, CPU 101-1, CPU 101-2, CPU 101-3, and CPU 101-4 of the personal computer 100 are each a processing unit that executes various kinds of processing in accordance with a software program. In the following, the CPU 101-1 through CPU 101-4 will be referred to as CPU 101 when there is no need to distinguish them from each other. The CPU 101 is interconnected with a ROM (Read Only Memory) 102 and a RAM (Random Access Memory) 103 via a bus 104 that is a shared bus. Software programs or data are stored in the ROM 102 in advance. Software programs or data stored in the ROM 102 or a storage unit 123 are loaded into the RAM 103.

A cache memory 111-1 is built in the CPU 101-1, a cache memory 111-2 is built in the CPU 101-2, a cache memory 111-3 is built in the CPU 101-3, and a cache memory 111-4 is built in the CPU 101-4. In the following description, the cache memory 111-1 through cache memory 111-4 will be referred to as cache memory 111 when there is no need to distinguish them from each other.

The cache memory 111 is a storage medium that operates at high speed such as, for example, a SRAM (Static Random Access Memory), and is used exclusively by the CPU 101 in which the cache memory 111 is built. Since the cache memory 111 has a high price per unit storage capacity, and is built in the CPU 101, an increase in the storage capacity of the cache memory 111 also leads to an increase in the circuit scale of the CPU 101. Accordingly, to reduce cost or to suppress an increase in circuit scale, the storage capacity of the cache memory 111 is generally kept to a smaller capacity of about several hundred kilobytes to several megabytes, for example, than the RAM 103 having a storage capacity of about several hundred megabytes to several gigabytes and provided outside of the CPU 101.

Of course, any kind of memory may be used as the cache memory 111, and its storage capacity may be set to any level. In this case, it is assumed that the cache memory 111 is a storage medium that is used exclusively by the CPU 101 in which the cache memory 111 is built, and allows data to be read or written at higher speed than the RAM 103, but whose storage capacity is smaller than the RAM 103 and has a limit as to the amount of information that can be stored.

In contrast to the cache memory 111, it is assumed that the RAM 103 is shared by the CPU 101-1 through CPU 101-4 and the like, allows data to be read or written at lower speed than the cache memory 111, and has a larger capacity than the cache memory 111. Incidentally, of course, the storage capacity of the RAM 103 is also finite in actuality. However, in the following, for the convenience of description, it is assumed that the storage capacity of the RAM 103 is sufficiently large relative to the capacity required for the encoding processing or decoding processing described above, and the limit for the capacity is not particularly considered.

That is, although the cache memory 111 allows input and output of program or data at high speed, due to a limit on its capacity, it is sometimes difficult to store all of software programs or data of a software encoder or software decoder. In contrast, the RAM 103 can store arbitrary software programs or data, their input and output are performed at low speed.

The CPU 101 loads software programs or data into the cache memory 111 or the RAM 103 which is built in the CPU 101 itself, and performs various processes in encoding or decoding by using those programs or software.

An input/output interface 120 is also connected to the bus 104. An input unit 121 such as a keyboard or a mouse, an output unit 122 such as a display, such as a CRT (Cathode Ray Tube) or an LCD (Liquid Crystal Display), or a speaker, the storage unit 123 configured by a hard disk or the like, and a communication unit 124 configured by a modem or the like are connected to the input/output interface 120. The communication unit 124 performs a communication process via a network including the Internet.

A drive 125 is also connected to the input/output interface 120 as required, a removable medium 131 such as a magnetic disk, an optical disk, a magneto-optical disk, or a semiconductor memory is mounted as appropriate, and a software program read therefrom is installed into the storage unit 123 as required. The software program can be also installed from the communication unit 124 via a network.

Incidentally, while it is described in FIG. 18 that four CPUs 101 are provided in the personal computer 109, the number of CPUs 101 is arbitrary. However, depending on the method of implementing the software encoder or software decoder described later, there is a limit on the minimum number of CPUs 101 in some cases. For example, there are cases where two CPUs 101 are required, or cases where four CPUs 101 are required. Further, the CPU 101-1 through CPU 101-4 may physically be one CPU 101 having four cores. In that case, the cache memory 111-1 through cache memory 111-4 may be provided in the respective CPU cores (the CPU 101-1 through CPU 101-4), or partial areas of a single cache memory 111 shared by the CPU cores which are assigned to the individual CPU cores may be the cache memory 111-1 through cache memory 111-4.

In the personal computer 100 configured as described above, in order to implement the encoding unit 14 shown in FIG. 3 or the decoding unit 36 in FIG. 12 in such a way that does not unnecessarily reduce the efficiency of processing or increase the delay time, there is a need to assign the hardware recourses of the personal computer 100 such as the CPU 101 or the RAM 103 appropriately to individual processes in the encoding unit 14 or the decoding unit 36. An example of such assignment will be described below.

Figure 19:
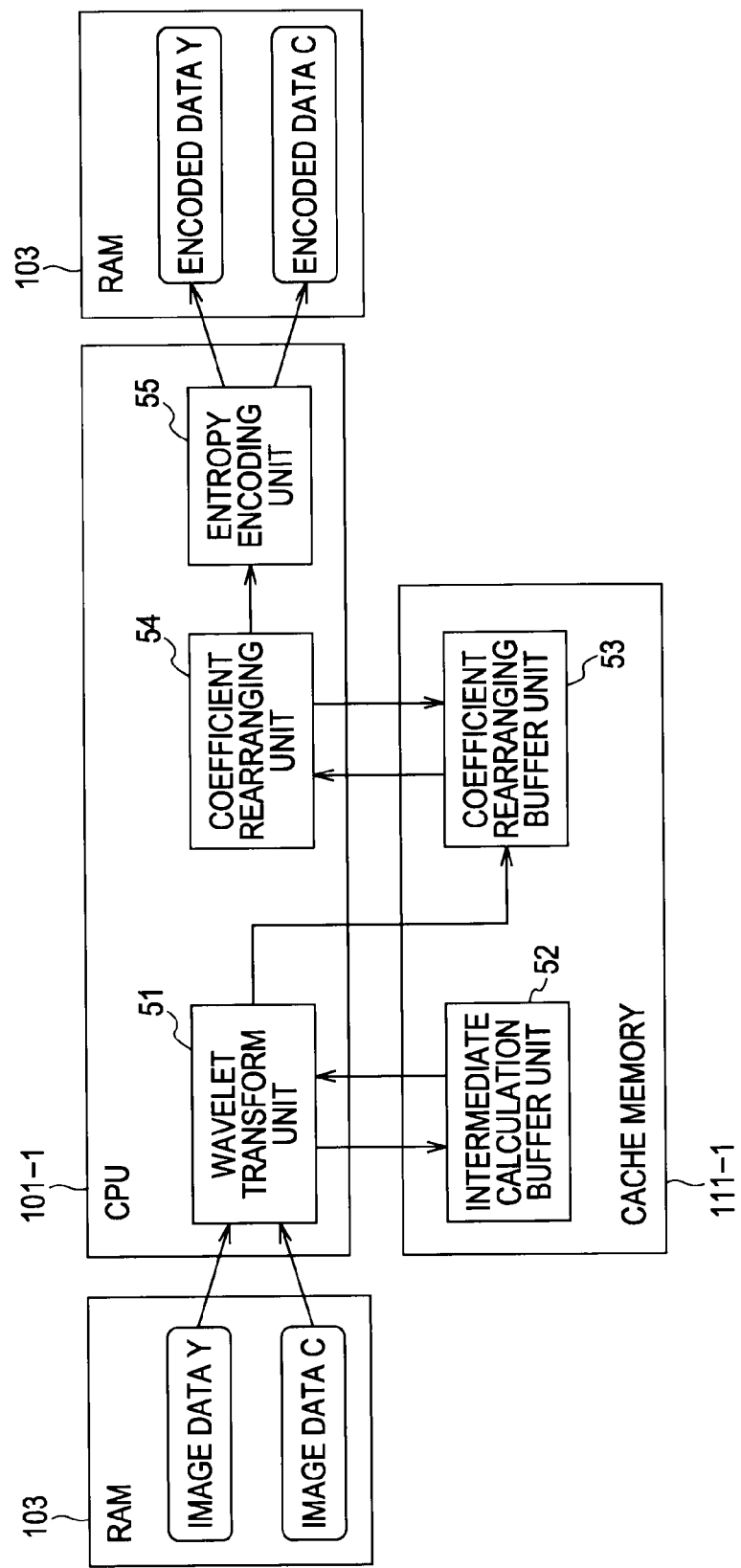
FIG. 19 is a diagram showing an example of assignment of hardware resources to an encoding unit.

FIG. 19 is a diagram showing an example of assignment of hardware resources to the encoding unit 14 in FIG. 3. In the example shown in FIG. 19, the CPU 101-1 is assigned to all the processes of the wavelet transform unit 51, coefficient rearranging unit 54, and entropy encoding unit 55 of the encoding unit 14, and the intermediate calculation buffer unit 52 and the coefficient rearranging buffer unit 53 are formed in the cache memory 111-1.

At this time, a software program that realizes the respective features of the wavelet transform unit 51, coefficient rearranging unit 54, and entropy encoding unit 55 is loaded into the cache memory 111-1. The CPU 101-1 reads and executes functions of the software program from the cache memory 111-1 as required.

Image data Y as a luminance component of image data to be encoded, and image data C as a chrominance component are held in the RAM 103. Incidentally, although there are Cb and Cr as chrominance components in actuality, here, for the simplicity of description, Cb and Cr are collectively indicated as C. Incidentally, while YC (YCbCr) components made up of the luminance component Y and the chrominance component C are described in the following, the same applies to the case of RGB components made up of an R component, a G component, and a B component.

In the case of the example in FIG. 19, both the image data Y and the image data C are encoded in the CPU 101-1. That is, by executing the process of the wavelet transform unit 51, the CPU 101-1 reads the image data Y from the RAM 103 and performs a wavelet transform process. At that time, the CPU 101-1 uses a part of the storage area of the cache memory 111-1 as the intermediate calculation buffer unit 52, and causes the intermediate calculation buffer unit 52 to hold intermediate data (for example, low-frequency components at an intermediate splitting level) generated in the analysis filtering process in the vertical direction and horizontal direction of the wavelet transform process. Further, the CPU 101-1 uses another part of the storage area of the cache memory 111-1 as the coefficient rearranging buffer unit 53, and causes the coefficient rearranging buffer unit 53 to hold coefficient data generated by a wavelet transform.

By executing the process of the coefficient rearranging unit 54, the CPU 101-1 reads coefficient data held in the coefficient rearranging buffer unit 53 of the cache memory 111-1 while rearranging the coefficient data in a predetermined order. By executing the process of the entropy encoding unit 55, the CPU 101-1 encodes the coefficient data read from the cache memory 111-1 while being rearranged in order by the process in the coefficient rearranging unit 54, and generates encoded data Y. The CPU 101-1 supplies the generated encoded data Y to the RAM 103 to be stored therein.

The CPU 101-1 performs processing on the image data C similarly as in the case of the image data Y.

In a case where the encoding unit 14 is implemented in the personal computer 100 as shown in FIG. 19, all of the processes in the encoding unit 14 are executed by one CPU 101, and intermediate data or coefficient data of a wavelet transform generated during encoding processing are all stored into the cache memory 111 of the CPU 101.

At this time, for example, the other CPU 101-2 through CPU 101-4 may be also assigned to the encoding unit 14, similarly to the CPU 101-1. That is, as in the case of the CPU 101-1 shown in FIG. 19, a software program that realizes the respective features of the wavelet transform unit 51, coefficient rearranging unit 54, and entropy encoding unit 55 is also loaded into each of the cache memory 111-2 through cache memory 111-4. The CPU 101-2 through CPU 101-4 read and execute those software programs from the respective cache memories 111, and execute the respective processes of the wavelet transform unit 51, coefficient rearranging unit 54, and entropy encoding unit 55 of the encoding unit 14. At this time, as in the cache memory 111-1, the intermediate buffer unit 52 and the coefficient rearranging buffer unit 53 are formed in each of the cache memory 111-2 through cache memory 111-4.

That is, in this case, four encoding units 14 are realized by the CPU 101-1 through CPU 101-4. To the encoding units 14, for example, encoding processing is assigned for each picture of moving image data to be encoded. That is, in this case, the CPU 101-1 through CPU 101-4 perform encoding processing with respect to mutually different pictures in parallel to each other. The flow of processing in that case is schematically shown in FIG. 20.

Figure 20:
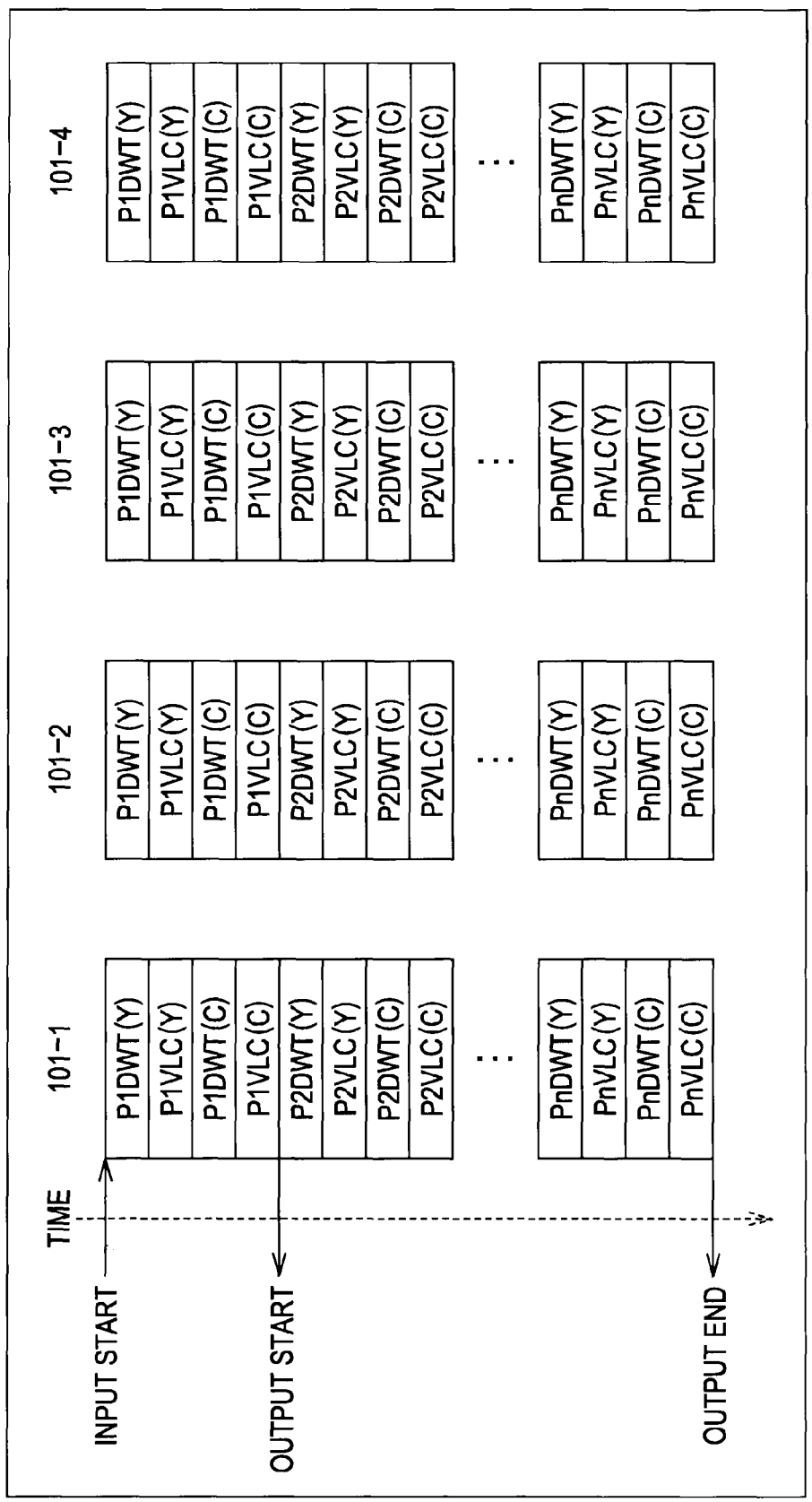
FIG. 20 is a schematic diagram showing the flow of processing in the case of the example in FIG. 19.

In FIG. 20, a time series is shown from top to bottom in the vertical direction in the drawing, and processes executed by individual CPUs are indicated by squares.

In the example in FIG. 20, the CPU 101-1 first reads from the RAM 103 image data Y that is the luminance component Y of the first precinct (P1) of the first picture, performs a wavelet transform on the image data Y while causing the cache memory 111-1 to hold intermediate data (P1DWT(Y)), and after causing the cache memory 111-1 to hold the obtained coefficient data, performs rearranging of order and entropy encoding with respect to the coefficient data (P1VLC (Y)). The encoded data Y obtained by this entropy encoding is accumulated in the RAM 103. Next, the CPU 101-1 reads from the RAM 103 image data C that is the chrominance component C of the first precinct (P1), performs a wavelet transform on the image data C while causing the cache memory 111-1 to hold intermediate data (P1DWT(C)), and after causing the cache memory 111-1 to hold the obtained coefficient data, performs rearranging of order and entropy encoding with respect to the coefficient data (P1VLC(C)). The encoded data C obtained by this entropy encoding is accumulated in the RAM 103.

At this point in time, encoded data Y and encoded data C equivalent to at least one precinct or more are accumulated in the RAM 103, so outputting of the encoded data Y and the encoded data C is started.

In this way, the wavelet transform unit 51 through the entropy encoding unit 55 realized in the CPU 101-1 and the cache memory 111-1 perform mutually similar processes or hold data, with respect to both the image data Y and the image data C. In other words, the CPU 101-1 and the cache memory 111-1 perform processing related to encoding or hold data in a similar manner with respect to either of the image data Y and the image data C.

When processing with respect to the first precinct is finished, the CPU 101-1 then reads from the RAM 103 image data Y of the second precinct (P2) of the first picture, performs a wavelet transform (P2DWT(Y)) with respect to the image data Y while causing the cache memory 111-1 to hold intermediate data, and after causing the cache memory 111-1 to hold the obtained coefficient data, performs rearranging of order and entropy encoding with respect to the coefficient data (P2VLC(Y)). The encoded data Y generated by this entropy encoding is outputted after being accumulated in the RAM 103. Next, the CPU 101-1 reads from the RAM 103 image data C of the second precinct (P2), performs a wavelet transform (P2DWT(C)) with respect to the image data C while causing the cache memory 111-1 to hold intermediate data, and after causing the cache memory 111-1 to hold the obtained coefficient data, performs rearranging of order and entropy encoding with respect to the coefficient data (P2VLC (C)). The encoded data C generated by this entropy encoding is outputted after being accumulated in the RAM 103.

The CPU 101-1 performs processing in a similar manner with respect to the third precinct and onward of the first picture, and performs a wavelet transform, and coefficient rearranging and entropy encoding (PnDWT(Y), PnVLC(Y), PnDWT(C), PnVLC(C)) with respect to each of the image data Y and image data C of the last n-th precinct (Pn). The obtained encoded data Y and encoded data C are outputted after being accumulated in the RAM 103, as in preceding precincts. When the encoded data C of the n-th precinct is outputted, all of the encoded data of the first picture have been outputted, so outputting of encoded data is terminated with respect to the first picture.

In parallel with this processing of the CPU 101-1, as shown in FIG. 20, the CPU 101-2, the CPU 101-3, and the CPU 101-4 can perform, respectively on the second picture, the third picture, and the fourth picture, the respective processes of a wavelet transform, and coefficient rearranging and entropy encoding similarly as in the case of the CPU 101, from the first precinct to the n-th precinct, generate encoded data Y and encoded data C from the image data Y and the image data C, and cause those pieces of data to be outputted after being held in the RAM 103.

That is, in this case, like the CPU 101-1 and the cache memory 111-1, the CPU 101-2 and the cache memory 111-2, the CPU 101-3 and the cache memory 111-3, and the CPU 101-4 and the cache memory 111-4 each perform processing related to encoding or hold data with respect to both the image data Y and the image data C.

In this case, after processing with respect to the first picture is finished, the CPU 101-1 then performs encoding processing with respect to the fifth picture. In parallel with the processing in the CPU 101-1, the CPU 101-2 through CPU 101-4 similarly perform encoding processing with respect to the sixth through eighth pictures, respectively. Incidentally, the ninth picture and onward are performed similarly as well.

As described above, in the case of the example of assignment shown in FIG. 19, the encoding unit 14 can perform encoding processing of four pictures simultaneously in parallel. Further, in this case, there is no need to switch CPUs during the series of encoding processing. Further, processing can be performed by using only the cache memory 111 without using the RAM 103, so the wavelet transform 51 or the coefficient rearranging unit 54 can also perform reading or writing of data from or to the intermediate calculation buffer unit 52 or the coefficient rearranging buffer unit 53 at high speed. Therefore, by such assignment of hardware resources, the encoding unit 14 can encode image data at high speed. That is, in the case of the example of assignment shown in FIG. 19, the encoding unit 14 can perform encoding with high throughput. Further, the personal computer 100 can implement the encoding unit 14 irrespective of the number of its CPUs 101 (for example, even when it is one).

However, since the cache memory 111 has a small capacity, there is a limit on the amount of data that can be accumulated at the same time, and depending on the data amount or contents of image data to be encoded, there is a fear that the capacity of the cache memory 111 may become short, causing an overflow, so it is often impossible to apply the example of assignment shown in FIG. 19 to cases where the amount of buffer required for the execution of encoding is large.

Further, since both encoding of the image data Y, and encoding of the image data C are performed in one CPU 101, the time from when encoding processing is started to when encoded data of the first precinct is outputted from the encoding unit 14, that is, the delay time in encoding processing is long. Therefore, the delay time from when the encoded data is decoded by the decoding unit 36, to when the image of reconstructed image data is displayed on the monitor also becomes long. For the same reason, the time until the first picture is displayed on the monitor is long.

Figure 21:
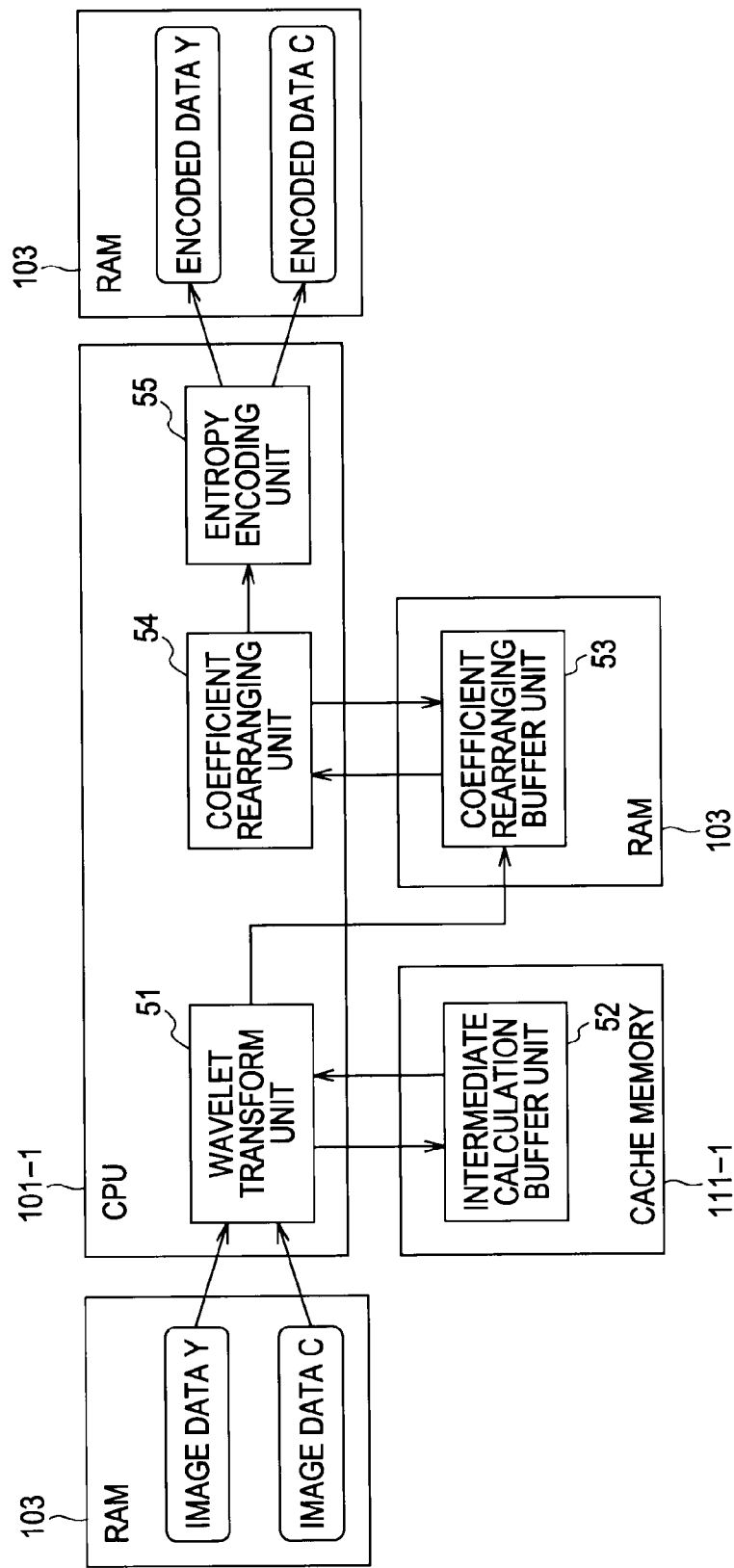
FIG. 21 is a diagram showing another example of assignment of hardware resources to an encoding unit.

FIG. 21 shows another example of assignment of hardware resources to the encoding unit 14 in FIG. 3. In the example shown in FIG. 21, as in the case of FIG. 19, the CPU 101-1 is assigned to all the processes of the wavelet transform unit 51, coefficient rearranging unit 54, and entropy encoding unit 55 of the encoding unit 14. It should be noted, however, that although the intermediate calculation buffer unit 52 is formed in the cache memory 111-1, the coefficient rearranging buffer unit 53 is formed in the RAM 103.

At this time, a software program that realizes the respective features of the wavelet transform unit 51, coefficient rearranging unit 54, and entropy encoding unit 55 is loaded into the cache memory 111-1. The CPU 101-1 reads and executes functions of the software program from the cache memory 111-1 as required.

In the case of the example in FIG. 21 as well, as in the case of the example in FIG. 19, the image data Y and the image data C are both encoded in the CPU 101-1. That is, by executing the process of the wavelet transform unit 51, the CPU 101-1 reads the image data Y from the RAM 103 and performs a wavelet transform process. At that time, the CPU 101-1 uses a part of the storage area of the cache memory 111-1 as the intermediate calculation buffer unit 52, and causes the intermediate calculation buffer unit 52 to hold intermediate data (for example, low-frequency components at an intermediate splitting level) generated in the analysis filtering process in the vertical direction and horizontal direction of the wavelet transform process.

It should be noted, however, that in the case of the example in FIG. 21, unlike in the case of the example in FIG. 19, the CPU 101-1 uses a part of the storage area of the RAM 103 as the coefficient rearranging buffer unit 53, and causes the coefficient rearranging buffer unit 53 to hold coefficient data generated by the wavelet transform.

By executing the process of the coefficient rearranging unit 54, the CPU 101-1 reads coefficient data held in the coefficient rearranging buffer unit 53 of the RAM 103 while rearranging the coefficient data in a predetermined order. By executing the process of the entropy encoding unit 55, the CPU 101-1 encodes the coefficient data read from the RAM 103 while being rearranged in order by the process in the coefficient rearranging unit 54, and generates encoded data Y. The CPU 101-1 supplies the generated encoded data Y to the RAM 103 to be stored therein.

The CPU 101-1 performs processing similarly with respect to the image data C as in the case of the image data Y.

In a case where the encoding unit 14 is implemented in the personal computer 100 as shown in FIG. 21, all of the processes of the encoding unit 14 are executed by one CPU 101, intermediate data of a wavelet transform generated during encoding processing are stored into the cache memory 111 of the CPU 101 which operates at high speed, and coefficient data generated by the wavelet transform is stored into the RAM 103 with a large capacity.

At this time, for example, like the CPU 101-1, the other CPU 101-2 through CPU 101-4 may also be assigned to the encoding unit 14. That is, as in the case of FIG. 21, a software program that realizes the respective features of the wavelet transform unit 51, coefficient rearranging unit 54, and entropy encoding unit 55 is also loaded into each of the cache memory 111-2 through cache memory 111-4. The CPU 101-2 through CPU 101-4 read and execute those software programs from the respective cache memories 111, and execute the respective processes of the wavelet transform unit 51, coefficient rearranging unit 54, and entropy encoding unit 55 of the encoding unit 14. At this time, as in the cache memory 111-1, the intermediate calculation buffer unit 52 is formed in each of the cache memory 111-2 through cache memory 111-4, and the respective coefficient rearranging buffer units 53 are formed in the RAM 103.

That is, in this case, four encoding units 14 are realized by the CPU 101-1 through CPU 101-4. To the encoding units 14, for example, encoding processing is assigned for each picture of moving image data to be encoded. That is, in this case, the CPU 101-1 through CPU 101-4 execute encoding processing with respect to mutually different pictures in parallel with each other. The flow of processing in that case is schematically shown in FIG. 20, as in the case of FIG. 19.

In the case of the example of assignment shown in FIG. 21 mentioned above, since the coefficient rearranging buffer unit 53 is formed in the RAM 103, a larger portion of the cache memory ill can be used as the intermediate calculation buffer unit 52 than in the case of the example of assignment in FIG. 19. That is, the capacity of the intermediate calculation buffer unit 52 can be made large. Further, the capacity of the coefficient rearranging buffer unit 53 can be also made large. That is, in the case of the assignment in the example in FIG. 21, the encoding unit 14 can suppress occurrence of a buffer overflow, and can be realized under a broader range of conditions, as compared with the case of assignment shown in FIG. 19.

It should be noted, however, that since the coefficient rearranging buffer unit 53 is formed in the RAM 103 that allows reading and writing at lower speed than the cache memory 111, the throughput decreases as compared with the case of the example of assignment in FIG. 19. However, since the intermediate calculation buffer unit 52 for which reading or writing of data is performed many times is formed in the cache memory 111 that operates high speed, the decrease in throughput is small.

Figure 22:
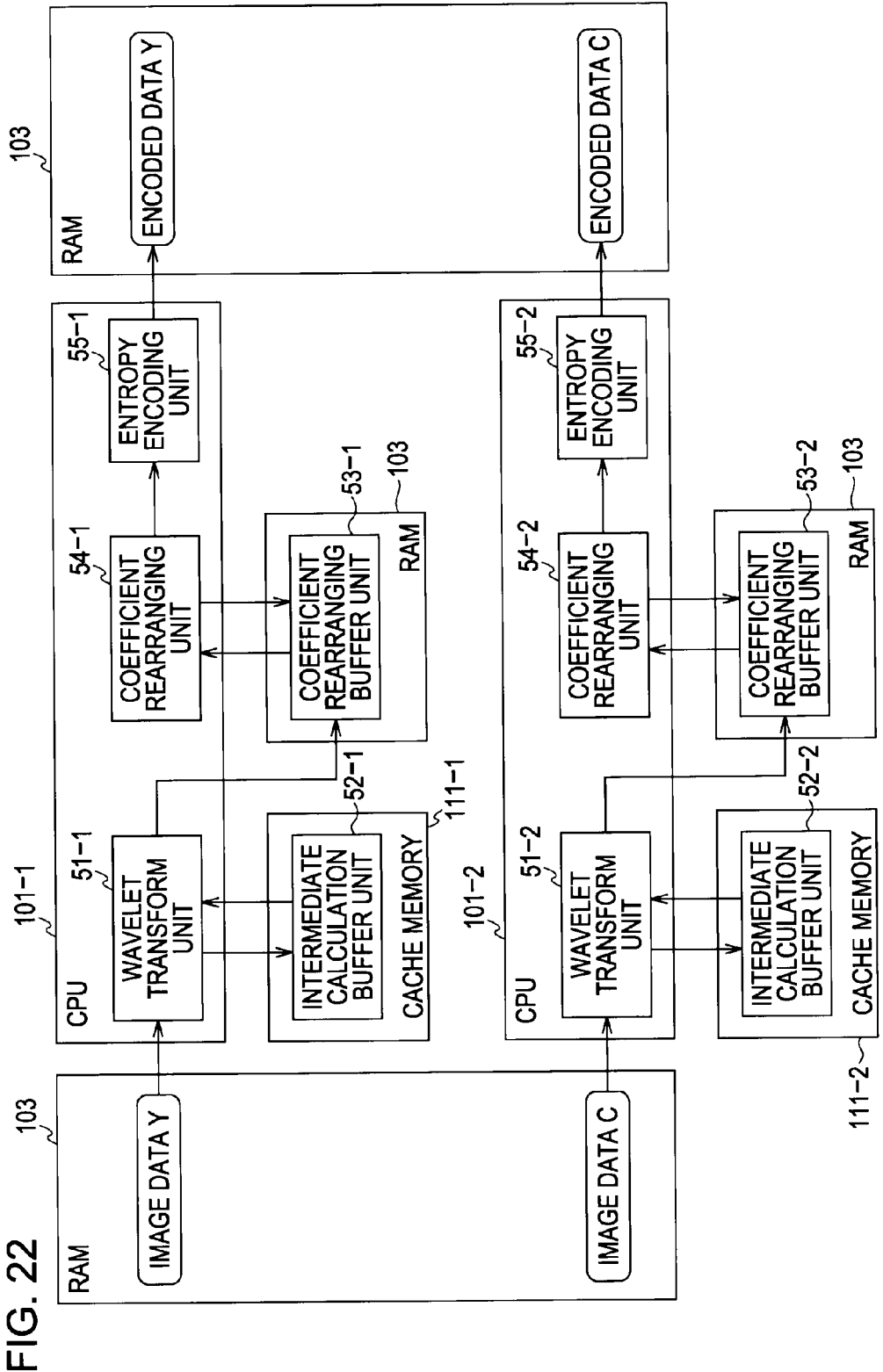
FIG. 22 is a diagram showing still another example of assignment of hardware resources to an encoding unit.

FIG. 22 shows still another example of assignment of hardware resources to the encoding unit 14 in FIG. 3. In the example shown in FIG. 22, in addition to the example of assignment in FIG. 21, mutually different CPUs are assigned respectively to an encoding unit that performs encoding of image data Y and an encoding unit that performs encoding of image data C. That is, the CPU 101-1 is assigned to all the processes of a wavelet transform unit 51-1, coefficient rearranging unit 54-1, and entropy encoding unit 55-1 of the encoding unit that performs encoding of the image data Y, an intermediate calculation buffer unit 52-1 is formed in the cache memory 111-1, and a coefficient rearranging buffer unit 53-1 is formed in the RAM 103. Further, the CPU 101-2 is assigned to all the processes of a wavelet transform unit 51-2, coefficient rearranging unit 54-2, and entropy encoding unit 55-2 of the encoding unit that performs encoding of the image data C, an intermediate calculation buffer unit 52-2 is formed in the cache memory 111-2, and a coefficient rearranging buffer unit 53-2 is formed in the RAM 103.

At this time, a software program that realizes the respective features of the wavelet transform unit 51, coefficient rearranging unit 54, and entropy encoding unit 55 is loaded into the cache memory 111-1 and the cache memory 111-2. The CPU 101-1 and the CPU 101-2 each read and execute functions of the software program from the cache memory 111-1 or the cache memory 111-2 as required.

In the case of the example in FIG. 22, image data Y is encoded in the CPU 101-1, and image data C is encoded in the CPU 101-2. That is, by executing the process of the wavelet transform unit 51-1 with respect to the image data Y as in the case of the example in FIG. 21, the CPU 101-1 reads the image data Y from the RAM 103 and performs a wavelet transform process. At that time, the CPU 101-1 uses a part of the storage area of the cache memory 111-1 as the intermediate calculation buffer unit 52-1, and causes the intermediate calculation buffer unit 52-1 to hold intermediate data generated in the analysis filtering process in the vertical direction and horizontal direction of the wavelet transform process.

As in the case of the example in FIG. 21, the CPU 101-1 uses a part of the storage area of the RAM 103 as the coefficient rearranging buffer unit 53-1, and causes the coefficient rearranging buffer unit 53-1 to hold coefficient data generated by the wavelet transform. By executing the process of the coefficient rearranging unit 54-1, the CPU 101-1 reads coefficient data held in the coefficient rearranging buffer unit 53-1 of the RAM 103 while rearranging the coefficient data in a predetermined order. By executing the process of the entropy encoding unit 55-1, the CPU 101-1 encodes the coefficient data read from the RAM 103 while being rearranged in order by the process in the coefficient rearranging unit 54-1, and generates encoded data Y. The CPU 101-1 supplies the generated encoded data Y to the RAM 103 to be stored therein.

It should be noted, however, that in the case of the example in FIG. 22, unlike in the case of the example in FIG. 21, in parallel with the processing in the CPU 101-1, the CPU 101-2 performs a wavelet transform, coefficient rearranging, and entropy encoding with respect to image data C, as in the case of the example in FIG. 21.

In a case where the encoding unit 14 is implemented in the personal computer 100 as shown in FIG. 22, all of the processes of the encoding unit 14 with respect to image data Y and image data C are executed by mutually different single CPUs 101, pieces of intermediate data of a wavelet transform generated during their encoding processing are stored into the cache memories 111 built in the respective CPUs 101, and pieces of coefficient data generated by the respective wavelet transforms are both stored into the RAM 103. That is, encoding processing is performed with two CPUs as a set.

At this time, for example, like the CPU 101-1 and the CPU 101-2, the other CPU 101-3 and CPU 101-4 may also be assigned to the encoding unit 14. That is, as in the case of FIG. 22, a software program that realizes the respective features of the wavelet transform unit 51, coefficient rearranging unit 54, and entropy encoding unit 55 is also loaded into each of the cache memory 111-3 and the cache memory 111-4. The CPU 101-3 and the CPU 101-4 read and execute those software programs from the respective cache memories 111, and execute the respective processes of the wavelet transform unit 51, coefficient rearranging unit 54, and entropy encoding unit 55 of the encoding unit 14. At this time, the intermediate calculation buffer unit 52-1 for image data Y is formed in the cache memory 111-3, the intermediate calculation buffer unit 52-2 for image data C is formed in the cache memory 111-4, and both the coefficient rearranging buffer unit 53-1 for image data Y and the coefficient rearranging buffer unit 53-2 for image data C are formed in the RAM 103.

That is, in this case, two encoding units 14 are realized by the CPU 101-1 through CPU 101-4. To the encoding units 14, for example, encoding processing is assigned for each picture of moving image data to be encoded. For example, the CPU 101-1 and the CPU 101-2 are configured to perform encoding processing of odd-numbered pictures, and the CPU 101-3 and the CPU 101-4 are configured to perform encoding processing of even-numbered pictures. The flow of processing in that case is shown in FIG. 23.

Figure 23:
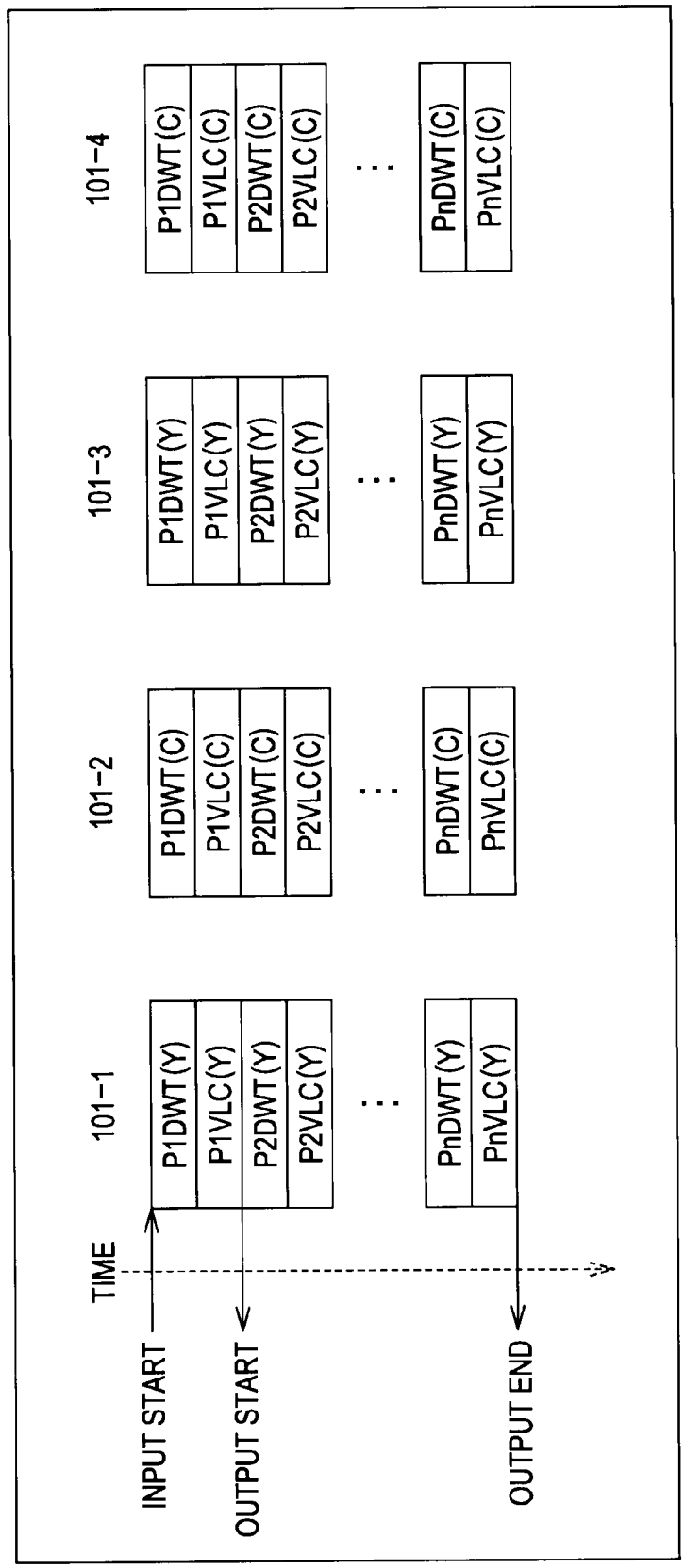
FIG. 23 is a schematic diagram showing the flow of processing in the case of the example in FIG. 22.

In the example in FIG. 23, the CPU 101-1 reads from the RAM 103 image data Y of the first precinct (P1) of the first picture, performs a wavelet transform (P1DWT(Y)) with respect to the image data Y while causing the cache memory 111-1 to hold intermediate data, and after causing the RAM 103 to hold the obtained coefficient data, performs rearranging of order and entropy encoding with respect to the coefficient data (P1VLC(Y)). The encoded data Y generated by this entropy encoding is accumulated in the RAM 103. In parallel with the processing in the CPU 101-1, the CPU 101-2 reads from the RAM 103 the image data C of the first precinct (P1) of the first picture, performs a wavelet transform (P1DWT(C)) with respect to the image data C while causing the cache memory 111-2 to hold intermediate data, and after causing the RAM 103 to hold the obtained coefficient data, performs rearranging of order and entropy encoding with respect to the coefficient data (P1VLC(C)). The encoded data C generated by this entropy encoding is also accumulated in the RAM 103.

Therefore, with the encoding unit 14 in this case, at the point in time when the CPU 101-1 and the CPU 101-2 finish entropy encoding with respect to the first precinct, encoded data (encoded data Y and encoded data C) equivalent to one precinct or more is accumulated in the RAM 103, so outputting of encoded data can be started.

Similarly, with respect to the second precinct and onward, image data Y is encoded by the CPU 101-1, and in parallel with that, image data C is encoded by the CPU 101-2. When the image data Y and image data C of the last n-th precinct (Pn) are encoded, and the encoded data Y and the encoded data C are outputted, since all of the encoded data of the first picture have been outputted, the outputting of encoded data is terminated with respect to the first picture.

In parallel with the processing in the CPU 101-1 and CPU 101-2, as shown in FIG. 23, encoding processing similar to the processing in the CPU 101-1 and CPU 101-2 can be performed with respect to the second picture by the CPU 101-3 and the CPU 101-4. That is, in this case, the CPU 101-3 performs encoding with respect to the image data Y of the second picture, and the CPU 101-4 performs encoding with respect to the image data C of the second picture.

In this case, after finishing processing with respect to the first picture, then, the CPU 101-1 and the CPU 101-2 perform decoding processing with respect to the third picture. In parallel with the processing in the CPU 101-1 and the CPU 101-2, the CPU 101-3 and the CPU 101-4 similarly performs decoding processing with respect to the fourth picture. The fifth picture and onward are processed similarly.

As described above, in the case of the example of assignment shown in FIG. 22, by encoding image data Y and image data C in parallel, the output start timing of encoded data, that is, the output timing of the encoded data Y and encoded data C of the first precinct can be made earlier than in the case of the example in FIG. 19 or FIG. 21, so the delay time in encoding processing can be reduced. On an additional note, for the same reason, encoding of the first picture can be completed faster in the case of the example of assignment shown in FIG. 22 than in the case of the example in FIG. 19 or FIG. 21.

Therefore, in a case where encoded data encoded in the encoding unit 14 is sequentially decoded in the decoding unit 36, and the image of reconstructed image data is displayed on the monitor, the delay time from when encoding is started to when the first picture is displayed becomes shorter in the case of the example of assignment shown in FIG. 22 than in the case of the example in FIG. 19 or FIG. 21.

Further, as in the case of the example in FIG. 21, the intermediate calculation buffer unit 52 is formed in the cache memory 111, and the coefficient rearranging buffer unit 53 is formed in the RAM 103. Thus, the capacities of the intermediate calculation buffer unit 52 and coefficient rearranging buffer unit 53 can be made larger, occurrence of a buffer overflow can be suppressed more, and further, a decrease in throughput can be made smaller, than in the case of the example in FIG. 19.

Incidentally, in the case of the example in FIG. 22, since intermediate data of a wavelet transform on image data Y, and intermediate data of a wavelet transform on image data C are accumulated in mutually different cache memories 111, the capacity of the intermediate calculation buffer unit 52 can be made even larger, and occurrence of a buffer overflow can be suppressed more, than in the case of the example in FIG. 21.

It should be noted, however, that in actuality, since image data Y contains a greater amount of information and is more graphically complex than image data C, the time required for encoding processing is longer. Therefore, since a stand-by time occurs in the CPU 101-2, the usage efficiency of the CPU 101 drops lower than in the case of FIG. 21, and the throughput also drops lower than in the case of FIG. 21.

Figure 24:
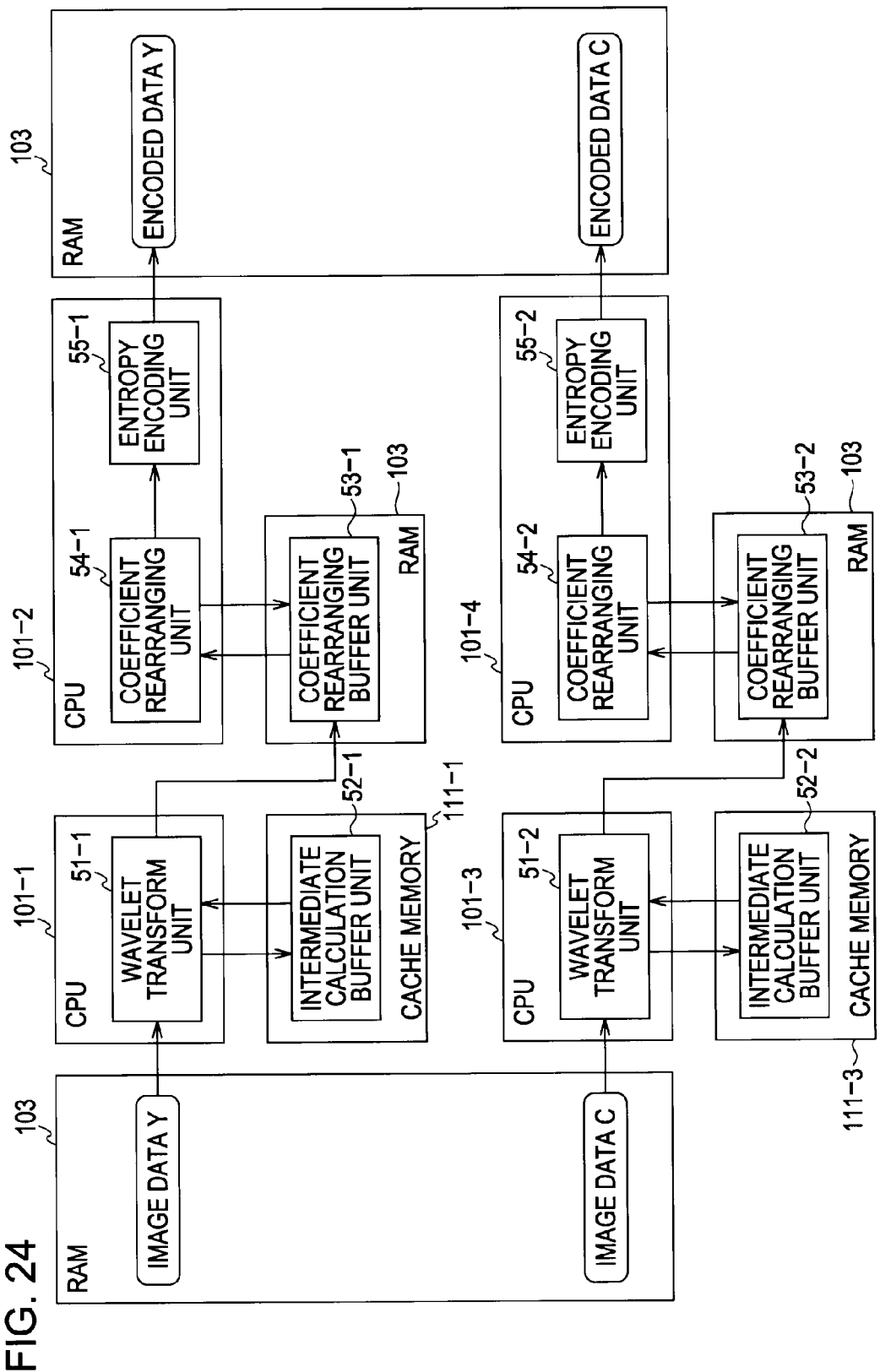
FIG. 24 is a diagram showing still another example of assignment of hardware resources to an encoding unit.

FIG. 24 shows still another example of assignment of hardware resources to the encoding unit 14 in FIG. 3. In the example shown in FIG. 24, in addition to the example of assignment in FIG. 22, mutually different CPUs 101 are assigned respectively to the wavelet transform unit 51, the coefficient rearranging unit 54, and the entropy encoding unit 55.

That is, the CPU 101-1 is assigned to the wavelet transform unit 51-1 that performs a wavelet transform process on image data Y, and the CPU 101-2 is assigned to the coefficient rearranging unit 54-1 that performs coefficient rearranging of the coefficient data of image data Y, and the entropy encoding unit 55-1 that performs entropy encoding of the coefficient data of image data Y. The intermediate calculation buffer unit 52-1 is formed in the cache memory 111-1 of the CPU 101-1, and the coefficient rearranging buffer unit 53-1 is formed in the RAM 103.

Similarly, the CPU 101-3 is assigned to the wavelet transform unit 51-2 that performs a wavelet transform process on image data C, and the CPU 101-4 is assigned to the coefficient rearranging unit 54-2 that performs coefficient rearranging of the coefficient data of image data C, and the entropy encoding unit 55-2 that performs entropy encoding of the coefficient data of image data C. The intermediate calculation buffer unit 52-2 is formed in the cache memory 111-3 of the CPU 101-3, and the coefficient rearranging buffer unit 53-2 is formed in the RAM 103.

At this time, a software program that realizes the feature of the wavelet transform unit 51 is loaded into the cache memory 111-1 and the cache memory 111-3, and a software program that realizes the respective features of the coefficient rearranging unit 54 and entropy encoding unit 55 is loaded into the cache memory 111-2 and the cache memory 111-4. The CPU 101-1 through CPU 101-4 respectively read and execute functions of those software programs as required from the respective cache memories 111.

In the case of the example in FIG. 24, image data Y is encoded in the CPU 101-1 and the CPU 101-2, and image data C is encoded in the CPU 101-3 and the CPU 101-4. That is, with respect to the image data Y, by executing the process of the wavelet transform unit 51-1, the CPU 101-1 reads the image data Y from the RAM 103 and performs a wavelet transform process. At that time, the CPU 101-1 uses a part of the storage area of the cache memory 111-1 as the intermediate calculation buffer unit 52, and causes the intermediate calculation buffer unit 52 to hold intermediate data generated in the analysis filtering process in the vertical direction and horizontal direction of the wavelet transform process.

As in the case of the example in FIG. 22, the CPU 101-1 uses a part of the storage area of the RAM 103 as the coefficient rearranging buffer unit 53, and causes the coefficient rearranging buffer unit 53 to hold coefficient data generated by the wavelet transform.

It should be noted, however, that in the case of the example in FIG. 24, unlike in the case of the example in FIG. 22, by executing the process of the coefficient rearranging unit 54, the CPU 101-2 reads coefficient data generated by the CPU 101-1 and held in the coefficient rearranging buffer unit 53 of the RAM 103, while rearranging the coefficient data in a predetermined order. By executing the process of the entropy encoding unit 55, the CPU 101-2 encodes the coefficient data read from the RAM 103 while being rearranged in order by the process in the coefficient rearranging unit 54, and generates encoded data Y. The CPU 101-2 supplies the generated encoded data Y to the RAM 103 to be stored therein.

In parallel with this processing of the CPU 101-1 and the CPU 101-2, the CPU 101-3 and the CPU 101-4 perform a wavelet transform, coefficient rearranging, and entropy encoding with respect to image data C, as in the case of the example in FIG. 22.

In a case where the encoding unit 14 is implemented in the personal computer 100 as shown in FIG. 24, encoding processing is performed with four CPUs, the CPU 101-1 through CPU 101-4, as one set. Therefore, in this case, one encoding unit 14 is realized by the CPU 101-1 through CPU 101-4. Naturally, the encoding unit 14 is configured to perform encoding processing of all of the pictures of moving image data to be encoded. The flow of processing in that case is shown in FIG. 25.

Figure 25:
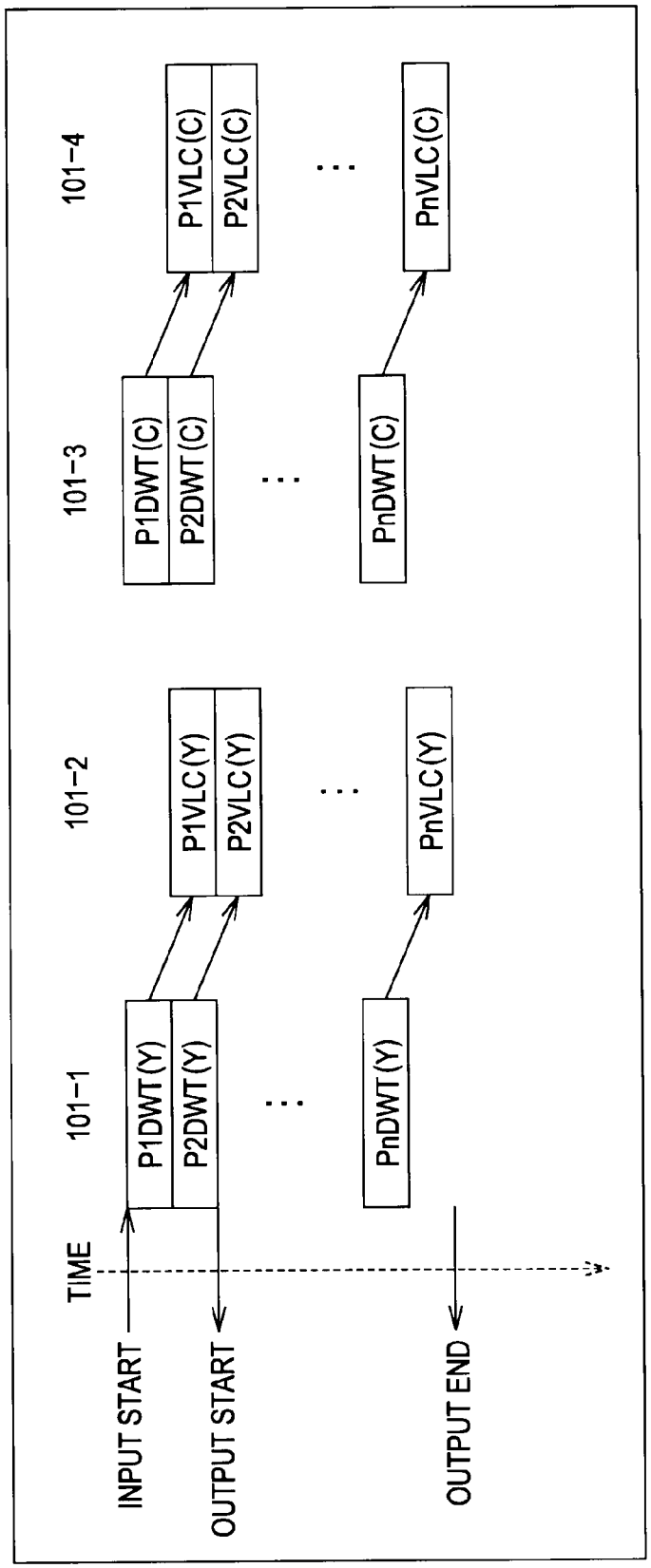
FIG. 25 is a schematic diagram showing the flow of processing in the case of the example in FIG. 24.

Since the CPU 101-1 through CPU 101-4 operate independently from each other, as in the example shown in FIG. 25, individual processes can be executed in parallel.

In the example shown in FIG. 25, the CPU 101-1 reads the image data Y of the first precinct (P1) of the first picture from the RAM 103, performs a wavelet transform (P1DWT(Y)) with respect to the image data Y while causing the cache memory 111-1 to hold intermediate data, and stores the obtained coefficient data into the RAM 103.

Upon storing the coefficient data into the RAM 103, the CPU 101-1 subsequently reads the image data Y of the second precinct (P1) of the first picture from the RAM 103, performs a wavelet transform (P2DWT(Y)) with respect to the image data Y while causing the cache memory 111-1 to hold intermediate data, and stores the obtained coefficient data into the RAM 103. At this time, in parallel with the process of P2DWT(Y) of the CPU 101-1, the CPU 101-2 reads the coefficient data of the first precinct (P1) stored in the RAM 103, and performs rearranging of order and entropy encoding (P1VLC(Y)). Upon storing the obtained encoded data Y into the RAM 103, the CPU 101-2 subsequently reads the coefficient data of the second precinct (P1) stored in the RAM 103, and performs rearranging of order and entropy encoding (P2VLC(Y)).

That is, the CPU 101-1 and the CPU 101-2 execute a wavelet transform, and coefficient rearranging and entropy encoding in parallel, with the processing targets shifted by one precinct from each other. Similarly, with respect to the third precinct and onward, a wavelet transform, and coefficient rearranging and entropy encoding are executed in parallel.

Incidentally, in parallel with encoding processing with respect to this image data Y, the CPU 101-3 and the CPU 101-4 perform processing similarly with respect to image data C. That is, in parallel with the execution of the process of P1DWT(Y) by the CPU 101-1, the CPU 101-3 executes the process of P1DWT(C), and in parallel with the execution of the process of P2DWT(Y) by the CPU 101-1, the CPU 101-3 executes the process of P2DWT(C), and the CPU 101-4 executes the process of P1VLC(C).

Therefore, with the encoding unit 14 in this case, at the point in time when the CPU 101-2 and the CPU 101-4 finish entropy encoding with respect to the first precinct, encoded data (encoded data Y and encoded data C) equivalent to one precinct or more is accumulated in the RAM 103, so outputting of encoded data can be started.

Similarly, with respect to the second precinct and onward, image data Y is encoded by the CPU 101-1 and the CPU 101-2, and in parallel with that, image data C is encoded by the CPU 101-3 and the CPU 101-4. When the image data Y and image data C of the last n-th precinct (Pn) are encoded, and the encoded data Y and the encoded data C are outputted, since all of the encoded data of the first picture have been outputted, the outputting of encoded data is terminated with respect to the first picture.

The second picture and onward are processed similarly.

As described above, in the case of the example of assignment shown in FIG. 24, as in the case of the example in FIG. 22, the output start timing for encoded data can be made earlier, and the delay time can be reduced. On an additional note, as shown in FIG. 25, in the case of the example of assignment shown in FIG. 24, the encoding unit 14 can perform encoding of the first picture faster than in the case of the example in FIG. 22. Therefore, in a case where encoded data encoded in the encoding unit 14 is sequentially decoded in the decoding unit 36, and the image of reconstructed image data is displayed on the monitor, the delay time from when encoding is started to when the first picture is displayed can be made shorter.

Further, as in the case of the example in FIG. 21, the intermediate calculation buffer unit 52 is formed in the cache memory ill, and the coefficient rearranging buffer unit 53 is formed in the RAM 103. Thus, the capacities of the intermediate calculation buffer unit 52 and coefficient rearranging buffer unit 53 can be made larger, occurrence of a buffer overflow can be suppressed more, and further, a decrease in throughput can be made smaller, than in the case of the example in FIG. 19.

Furthermore, in the case of the example in FIG. 24, as in the case of the example in FIG. 22, since intermediate data of a wavelet transform on image data Y, and intermediate data of a wavelet transform on image data C are accumulated in mutually different cache memories 111, the capacity of the intermediate calculation buffer unit 52 can be made even larger, and occurrence of a buffer overflow can be suppressed more, than in the case of the example in FIG. 21.

It should be noted, however, that in actuality, since image data Y contains a greater amount of information and is more graphically complex than image data C, the time required for encoding processing is longer. Therefore, a stand-by time occurs in the CPU 101-3 and the CPU 101-4. Furthermore, since the CPU 101 switches during encoding processing, the control becomes complex and also the processing time increases. Therefore, the usage efficiency of the CPU 101 drops lower than in the case of FIG. 22, and the throughput also drops lower than in the case of FIG. 22.

Since the respective processes of a wavelet transform, coefficient rearranging, and entropy encoding are each configured by a plurality of functions, it is also possible to change the CPU 101 to be assigned at a timing other than that between a wavelet transform and coefficient rearranging as described above. However, unless in the case of processes that can be executed in parallel, even if mutually different CPUs 101 are assigned, processing time cannot be shortened. In the encoding unit 14 shown in FIG. 3, it is difficult to make detailed processes included in the process in the wavelet transform unit 51 parallel to each other. Further, since coefficient rearranging is reading of coefficient data from the coefficient rearranging buffer unit 53, if mutually different CPUs 101 are assigned to this coefficient rearranging and entropy encoding, transfer of coefficient data is further required between the CPUs 101, which makes the processing inefficient. Therefore, in the encoding unit 14, as described above, it is ideal to divide between a wavelet transform, and coefficient rearranging and entropy encoding.

In a case where, like a conventional computer, a computer automatically assigns CPUs that execute processing, the assignment is performed in accordance with the load condition or the like. Thus, processing may not always be split at an optimum position and assigned to mutually different CPUs in this way. Depending on the case, there is a fear that the efficiency of encoding processing is significantly reduced. By splitting processing between a wavelet transform, and coefficient rearranging and entropy encoding in advance as in the example in FIG. 25, the encoding unit 14 can execute encoding processing with good efficiency.

Figure 26:
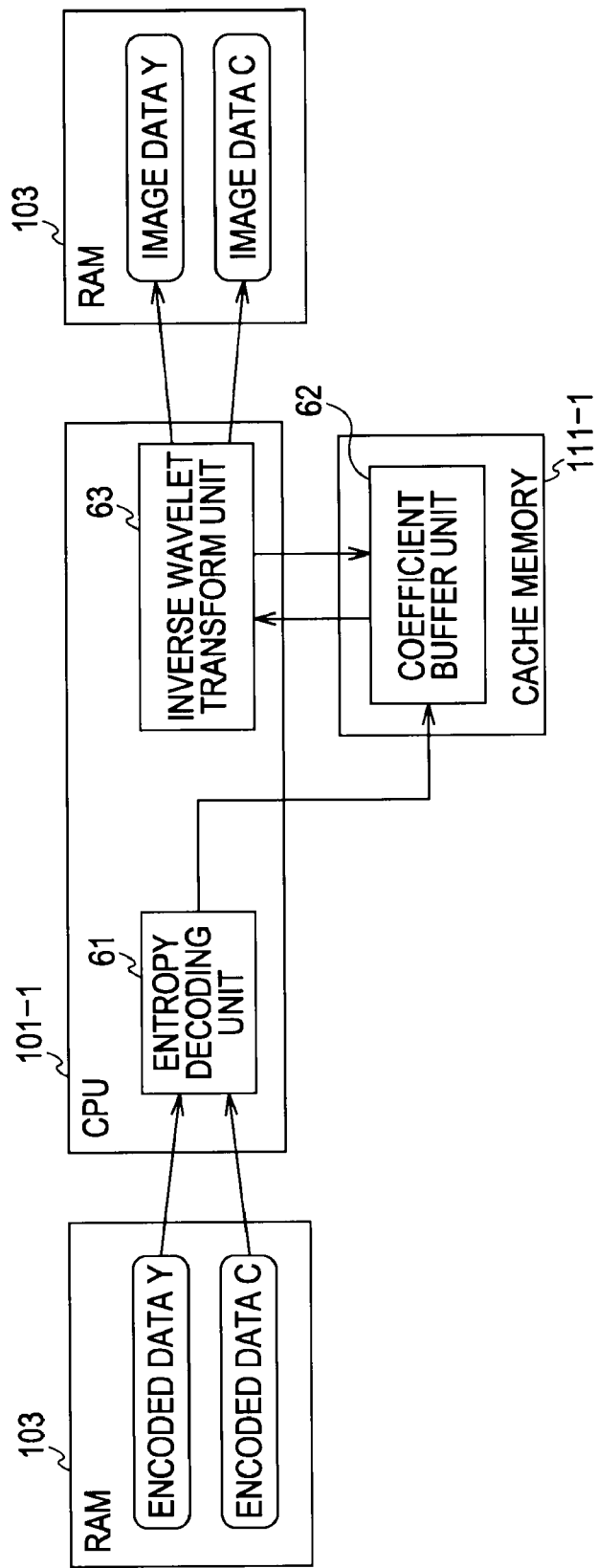
FIG. 26 is a diagram showing an example of assignment of hardware resources to a decoding unit.

FIG. 26 is a diagram showing an example of assignment of hardware resources to the decoding unit 36 in FIG. 12. In the example shown in FIG. 26, as in the case of the example of the encoding unit 14 in FIG. 19, the CPU 101-1 is assigned to all the processes of the entropy decoding unit 61 and inverse wavelet transform unit 63 of the decoding unit 36, and the coefficient buffer unit 62 is formed in the cache memory 111-1.

At this time, a software program that realizes the respective features of the entropy decoding unit 61 and inverse wavelet transform unit 63 is loaded into the cache memory 111-1. The CPU 101-1 reads and executes functions of the software program from the cache memory 111-1 as required.

Encoded data Y and encoded data C to be decoded are held in the RAM 103.

In the case of the example in FIG. 26, both the encoded data Y and the encoded data C are decoded in the CPU 101-1. That is, by executing the process of the entropy decoding unit 61, the CPU 101-1 reads encoded data Y from the RAM 103 and performs entropy decoding. The CPU 101-1 uses a part or all of the storage area of the cache memory 111-1 as the coefficient buffer unit 62, and causes the coefficient buffer unit 62 to hold coefficient data generated by entropy decoding.

By executing the process of the inverse wavelet transform unit 63, the CPU 101-1 reads coefficient data held in the coefficient buffer unit 62 of the cache memory 111-1, performs an inverse wavelet transform process, and reconstructs image data Y. The CPU 101-1 supplies the reconstructed image data Y to the RAM 103 to be stored therein.

The CPU 101-1 performs processing similarly with respect to the image data C as in the case of the image data Y.

In a case where the encoding unit 14 is implemented in the personal computer 100 as shown in FIG. 26, all of the processes in the decoding unit 36 are executed by one CPU 101, and coefficient data generated by entropy decoding processing is stored into the cache memory 111 of the CPU 101.

At this time, for example, the other CPU 101-2 through CPU 101-4 may be also assigned to the decoding unit 36, like the CPU 101-1. That is, as in the case of the CPU 101-1 shown in FIG. 26, a software program that realizes the respective features of the entropy decoding unit 61 and inverse wavelet transform unit 63 is also loaded into each of the cache memory 111-2 through cache memory 111-4. The CPU 101-2 through CPU 101-4 read and execute those software programs from the respective cache memories 111, and execute the entropy decoding unit 61 and inverse wavelet transform unit 63 of the decoding unit 36. At this time, as in the cache memory 111-1, the coefficient buffer unit 62 is formed in each of the cache memory 111-2 through cache memory 111-4.

That is, in this case, four decoding units 36 are realized by the CPU 101-1 through CPU 101-4. The decoding units 36 are assigned for each picture of the image data of encoded data prior to encoding, for example. That is, in this case, the CPU 101-1 through CPU 101-4 perform decoding processing with respect to mutually different pictures in parallel to each other. The flow of processing in that case is schematically shown in FIG. 27.

Figure 27:
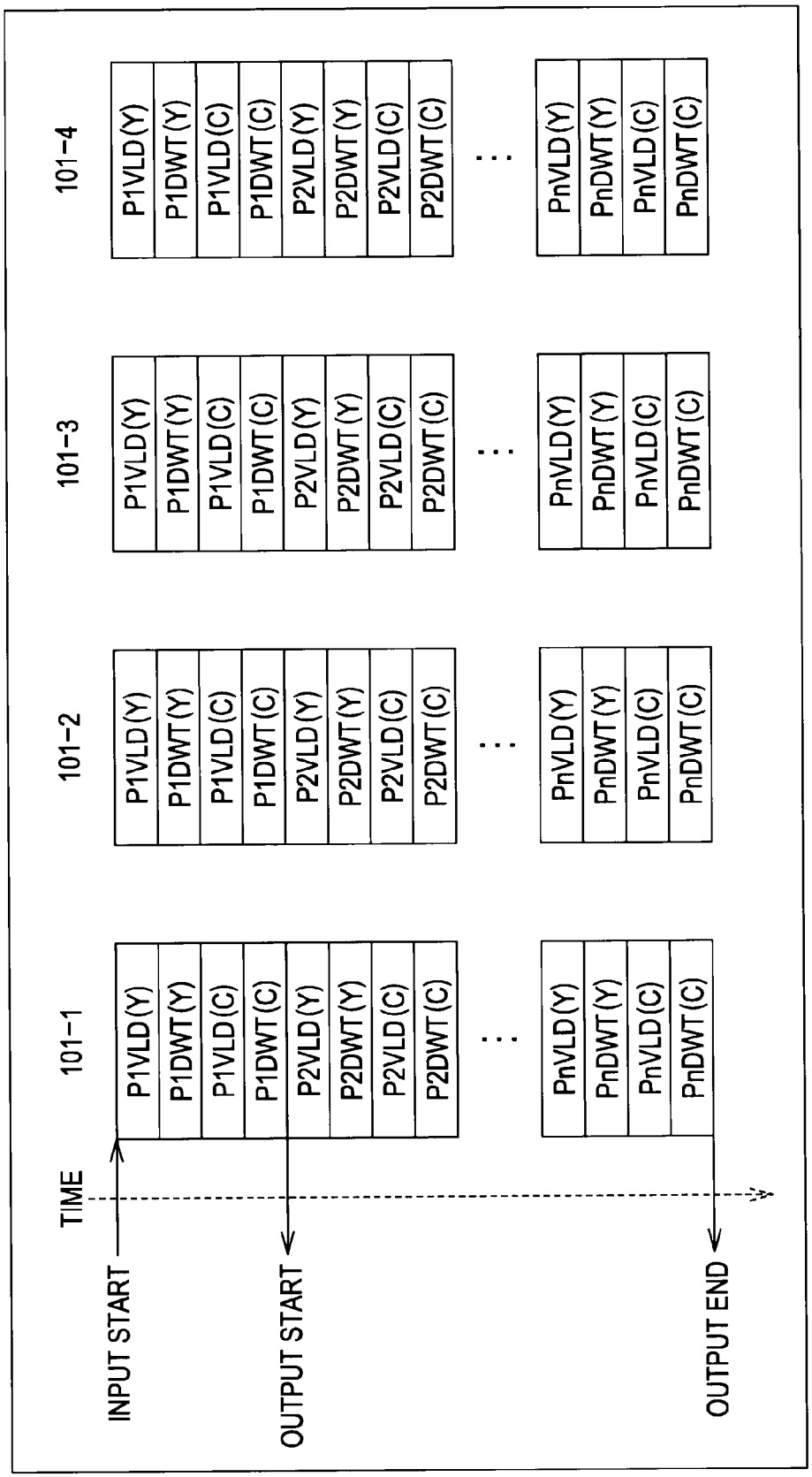
FIG. 27 is a schematic diagram showing the flow of processing in the case of the example in FIG. 26.

As shown in FIG. 27, the CPU 101-1 that executes the process of the entropy decoding unit 61 reads the encoded data Y of the first precinct of the first picture from the RAM 103 to perform entropy decoding (P1VLD(Y)), and stores the obtained coefficient data into the coefficient buffer unit 62 of the cache memory 111-1. Next, the CPU 101-1 that executes the process of the inverse wavelet transform unit 63 reads coefficient data from the coefficient buffer unit 62, performs an inverse wavelet transform (P1DWT(Y)), and supplies the obtained image data Y to the RAM 103 to be held therein. Upon finishing processing with respect to the image data Y, the CPU 101-1 then performs similar processing with respect to encoded data C (P1VLD(C), P1DWT(C)).

Since image data Y and image data C equivalent to at least one precinct or more are accumulated in the RAM 103 at this point in time, outputting of the image data Y and image data C is started.

Upon finishing decoding processing with respect to the first precinct, the CPU 101-1 similarly performs decoding processing with respect to the second precinct and onward (P2VLD(Y), P2DWT(Y), P2VLD(C), P2DWT(C), . . . ).

As shown in FIG. 27, in parallel with this processing of the CPU 101-1, similar decoding processing can be also performed with respect to the second picture by the CPU 101-2, with respect to the third by the CPU 101-3, and with respect to the fourth picture by the CPU 101-4. In this case, upon finishing processing with respect to the first picture, the CPU 101-1 then performs decoding processing with respect to the fifth picture. In parallel with the processing in the CPU 101-1, the CPU 101-2 through CPU 101-4 also similarly perform decoding processing with respect to the sixth through eighth pictures, respectively. Incidentally, the ninth picture and onward are similarly processed.

That is, in this way, in the case of assignment shown in FIG. 26, the decoding unit 36 can perform decoding processing on four pictures simultaneously in parallel. Furthermore, in this case, there is no need to switch CPUs during the series of decoding processing. Further, since processing can be performed by employing only the cache memory 111 without using the RAM 103, the decoding unit 36 can decode encoded data at high speed. That is, the decoding unit 36 can perform decoding processing with high throughput.

Further, the personal computer 100 can implement the decoding unit 36 irrespective of the number of its CPUs 101 (for example, even when it is one).

However, since the cache memory 111 has a small capacity, there is a limit on the amount of data that can be accumulated at the same time, and depending on the data amount or contents of encoded data to be decoded, there is a fear that the capacity of the cache memory 111 may become short, causing an overflow, so it is often impossible to apply the example of assignment shown in FIG. 26 to cases where the amount of buffer required for the execution of decoding is large.

Figure 28:
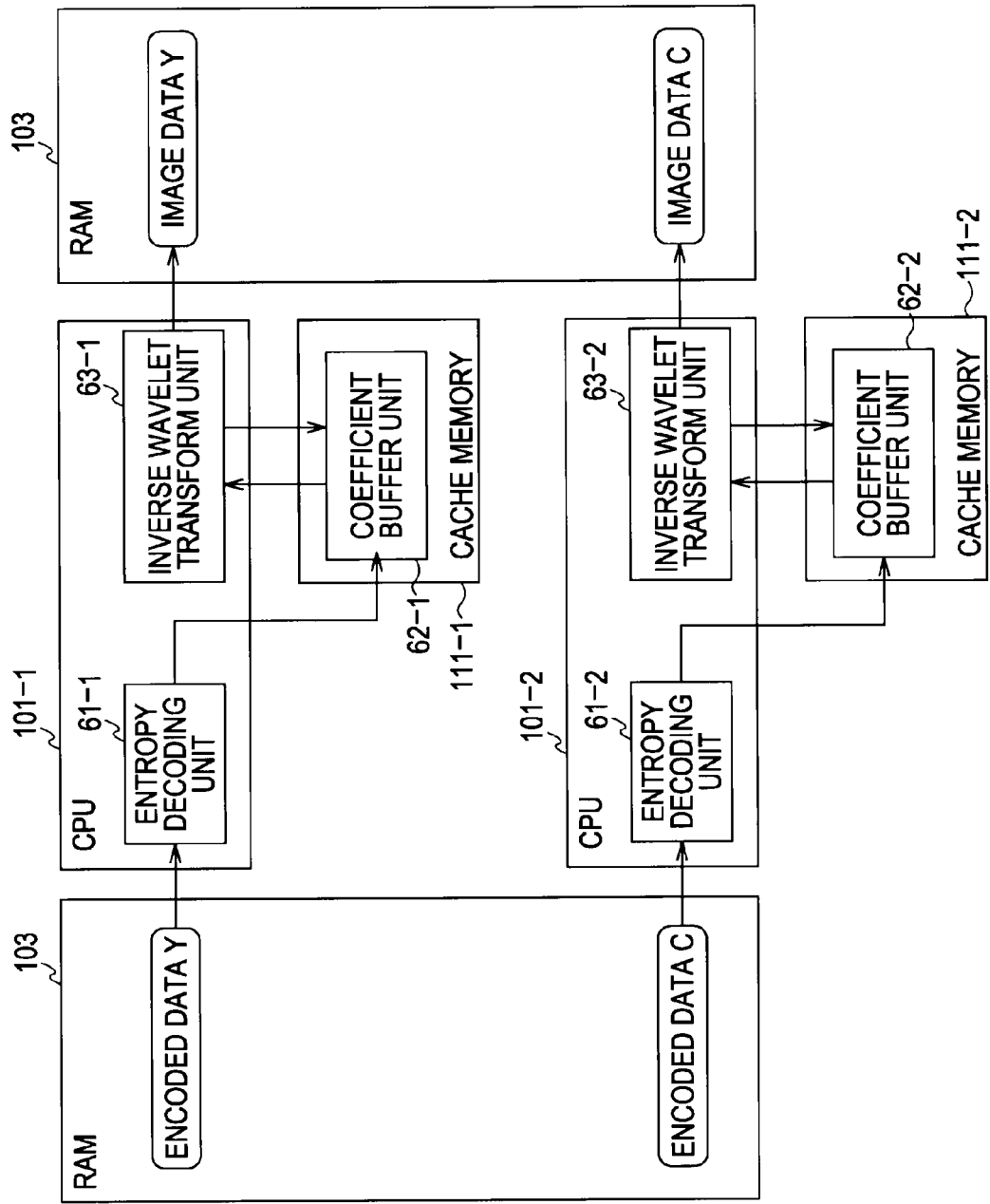
FIG. 28 is a diagram showing another example of assignment of hardware resources to a decoding unit.

FIG. 28 shows another example of assignment of hardware resources to the decoding unit 36 in FIG. 12. In the example shown in FIG. 28, mutually different CPUs are assigned respectively to a decoding unit that performs decoding of encoded data Y and a decoding unit that performs decoding of encoded data C.

That is, the CPU 101-1 is assigned to all the processes of an entropy decoding unit 61-1 and inverse wavelet transform unit 63-1 of the decoding unit that performs decoding of the encoded data Y, and a coefficient buffer unit 62-1 is formed in the cache memory 111-1. Further, the CPU 101-2 is assigned to all the processes of an entropy decoding unit 61-2 and inverse wavelet transform unit 63-2 of the decoding unit that performs decoding of the encoded data C, and a coefficient buffer unit 62-2 is formed in the cache memory 111-2.

At this time, a software program that realizes the respective features of the entropy decoding unit 61 and inverse wavelet transform unit 63 is loaded into the cache memory 111-1 and the cache memory 111-2. The CPU 101-1 and the CPU 101-2 each read and execute functions of the software program from the cache memory 111-1 or the cache memory 111-2 as required.

In the case of the example in FIG. 28, encoded data Y is decoded in the CPU 101-1, and encoded data C is decoded in the CPU 101-2. That is, by executing the process of the entropy decoding unit 61-1, the CPU 101-1 reads encoded data Y from the RAM 103 and performs entropy decoding. The CPU 101-1 uses a part or all of the storage area of the cache memory 111-1 as the coefficient buffer unit 62-1, and causes the coefficient buffer unit 62-1 to hold coefficient data generated by entropy decoding.

By executing the process of the inverse wavelet transform unit 63-1, the CPU 101-1 reads coefficient data held in the coefficient buffer unit 62-1 of the cache memory 111-1, performs an inverse wavelet transform process, and reconstructs image data Y. The CPU 101-1 supplies the reconstructed image data Y to the RAM 103 to be stored therein.

By executing the process of the entropy decoding unit 61-2, the CPU 101-2 reads encoded data C from the RAM 103 and performs entropy decoding. The CPU 101-2 uses a part or all of the storage area of the cache memory 111-2 as the coefficient buffer unit 62-2, and causes the coefficient buffer unit 62-2 to hold coefficient data generated by entropy decoding.

By executing the process of the inverse wavelet transform unit 63-2, the CPU 101-2 reads coefficient data held in the coefficient buffer unit 62-2 of the cache memory 111-2, performs an inverse wavelet transform process, and reconstructs image data C. The CPU 101-2 supplies the reconstructed image data C to the RAM 103 to be stored therein.

In a case where the encoding unit 14 is implemented in the personal computer 100 as shown in FIG. 28, all of the processes in the decoding unit 36 with respect to image data Y and image data C are executed by mutually different single CPUs 101, coefficient data generated by entropy decoding is stored into the cache memory 111 built in each of the CPUs 101, and image data Y and image data C reconstructed by an inverse wavelet transform are both stored into the RAM 103. That is, encoding processing is performed with two CPUs as a set.

At this time, for example, the other CPU 101-3 and CPU 101-4 may be also assigned to the decoding unit 36, like the CPU 101-1 and the CPU 101-2. That is, as in the case of the CPU 101-1 and the CPU 101-2 in FIG. 28, a software program that realizes the respective features of the entropy decoding unit 61 and inverse wavelet transform unit 63 is also loaded into each of the cache memory 111-3 and the cache memory 111-4. The CPU 101-3 and the CPU 101-4 read and execute those software programs from the respective cache memories 111, and execute the respective processes of the entropy decoding unit 61 and inverse wavelet transform unit 63 of the decoding unit 36. At this time, the coefficient buffer unit 62-1 for encoded data Y is formed in the cache memory 111-3, and the coefficient buffer unit 62-2 for encoded data C is formed in the cache memory 111-4.

That is, in this case, two decoding units 36 are realized by the CPU 101-1 through CPU 101-4. The decoding units 36 are assigned for each picture of the image data of encoded data prior to encoding, for example. For example, the CPU 101-1 and the CPU 101-2 are configured to perform decoding processing of odd-numbered pictures, and the CPU 101-3 and the CPU 101-4 are configured to perform decoding processing of even-numbered pictures. The flow of processing in that case is shown in FIG. 29.

Figure 29:
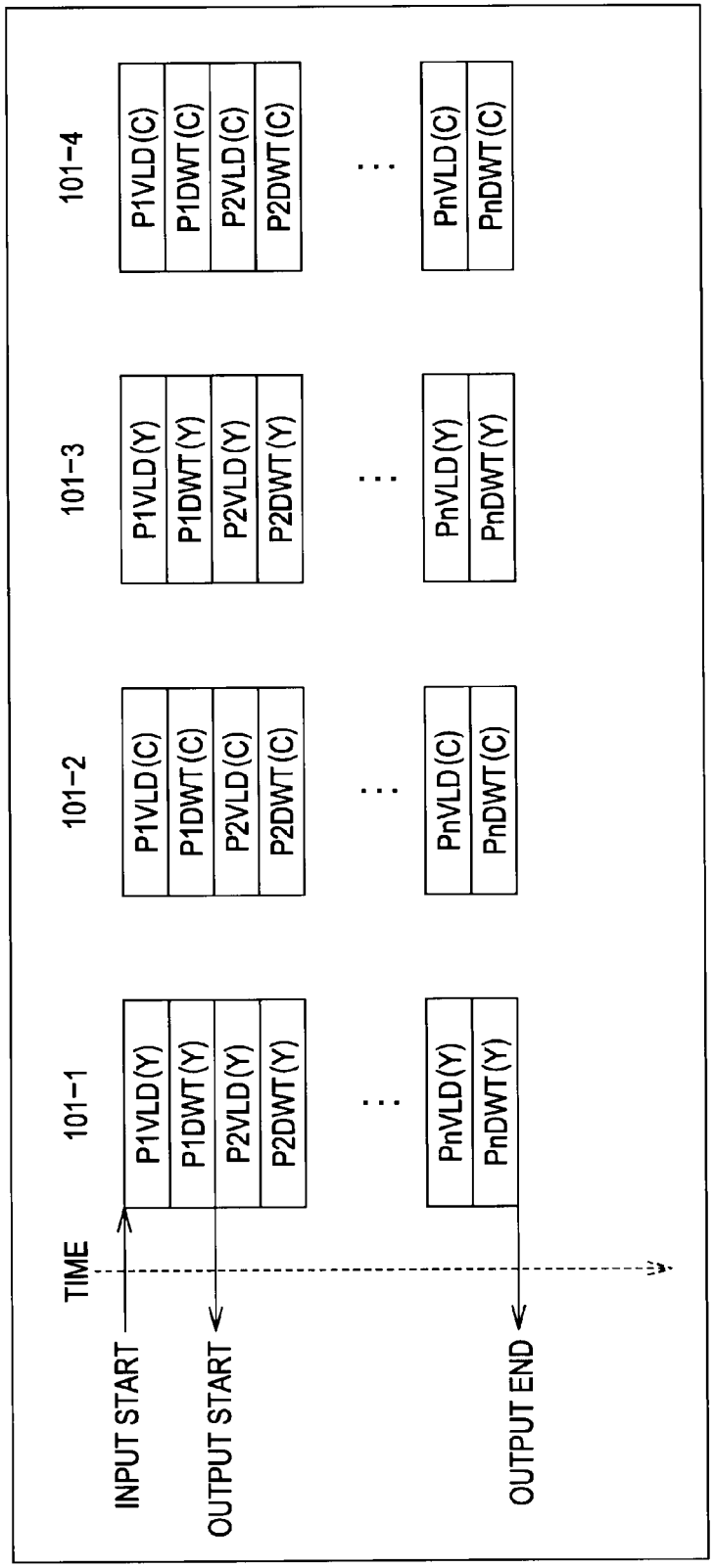
FIG. 29 is a schematic diagram showing the flow of processing in the case of the example in FIG. 28.

In this case, as shown in FIG. 29, the CPU 101-1 that executes the process of the entropy decoding unit 61-1 reads the encoded data Y of the first precinct of the first picture from the RAM 103 to perform entropy decoding (P1VLD(Y)), and stores the obtained coefficient data into the coefficient buffer unit 62-1 of the cache memory 111-1. Next, the CPU 101-1 that executes the process of the inverse wavelet transform unit 63-1 reads coefficient data from the coefficient buffer unit 62-1, performs an inverse wavelet transform (P1DWT(Y)), and supplies the obtained image data Y to the RAM 103 to be held therein.

In parallel with this processing, the CPU 101-2 that executes the process of the entropy decoding unit 61-2 reads the encoded data C of the first precinct of the first picture from the RAM 103 to perform entropy decoding (P1VLD(C)), and stores the obtained coefficient data into the coefficient buffer unit 62-2 of the cache memory 111-2. Next, the CPU 101-1 that executes the process of the inverse wavelet transform unit 63-2 reads coefficient data from the coefficient buffer unit 62-2, performs an inverse wavelet transform (P1DWT(C)), and supplies the obtained image data C to the RAM 103 to be held therein.

Therefore, with the decoding unit 36 in this case, at the point in time when the CPU 101-1 and the CPU 101-2 finish an inverse wavelet transform with respect to the first precinct, image data (image data Y and image data C) equivalent to one precinct or more is accumulated in the RAM 103, so outputting of image data can be started.

Similarly, with respect to the second precinct and onward, encoded data Y and encoded data C are decoded, respectively by the CPU 101-1 and the CPU 101-2, in parallel with each other.

In parallel with this processing of the CPU 101-1 and the CPU 101-2, decoding processing similar to the processing in the CPU 101-1 and the CPU 101-2 can be performed with respect to the second picture by the CPU 101-3 and the CPU 101-4. In this case, the CPU 101-3 performs decoding with respect to the encoded data Y of the second picture, and the CPU 101-4 performs decoding with respect to the encoded data C of the second picture.

In this case, upon finishing processing with respect to the first picture, the CPU 101-1 and the CPU 101-2 then perform decoding processing with respect to the third picture. In parallel with the processing in the CPU 101-1 and the CPU 101-2, the CPU 101-3 and the CPU 101-4 similarly perform decoding processing with respect to the fourth picture. The fifth picture and onward are processed similarly.

Therefore, in the case of the example of assignment shown in FIG. 28, by decoding encoded data Y and encoded data C in parallel, the output timing of reconstructed image data, that is, the output timing of the image data Y and image data C of the first precinct can be made earlier than in the case of the example in FIG. 26, so the delay time in decoding processing can be reduced.

On an additional note, for the same reason, decoding of the first picture can be completed faster in the case of the example of assignment shown in FIG. 28 than in the case of the example in FIG. 26. Therefore, in a case where the image of image data reconstructed in the decoding unit 36 is displayed on the monitor, the delay time from when decoding processing is started to when the first picture is displayed becomes shorter in the case of the example of assignment shown in FIG. 28 than in the case of the example in FIG. 26.

Further, since coefficient data obtained by decoding encoded data Y, and coefficient data obtained by decoding encoded data C are accumulated in mutually different cache memories 111, the capacity of the coefficient buffer unit 62 can be made larger, and occurrence of a buffer overflow can be suppressed more, than in the case of the example in FIG. 26.

Incidentally, since image data Y contains a greater amount of information and is more graphically complex than image data C, the time required for decoding processing is longer. Therefore, since a stand-by time occurs in the CPU 101-3 or the CPU 101-4, the usage efficiency of the CPU 101 drops lower than in the case of FIG. 26, and the throughput also drops lower than in the case of FIG. 26.

Figure 30:
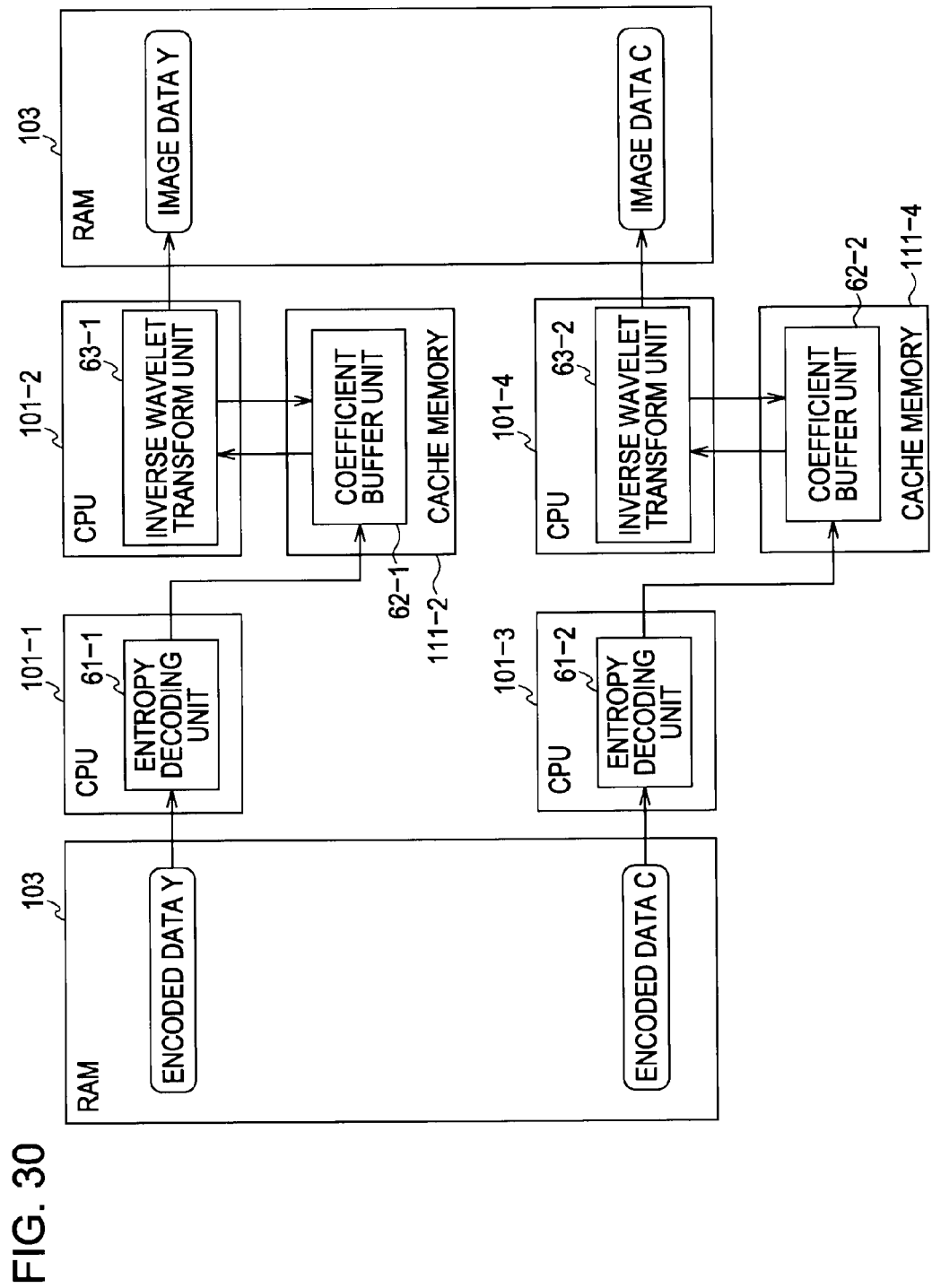
FIG. 30 is a diagram showing still another example of assignment of hardware resources to a decoding unit.

FIG. 30 shows still another example of assignment of the decoding unit 36 in FIG. 12. In the example shown in FIG. 30, in addition to the example of assignment in FIG. 28, mutually different CPUs 101 are assigned respectively to the entropy decoding unit 61 and the inverse wavelet transform unit 63.

That is, the CPU 101-1 is assigned to the entropy decoding unit 61-1 that decodes encoded data Y, and the CPU 101-2 is assigned to the inverse wavelet transform unit 63-1 that performs an inverse wavelet transform process on coefficient data generated in the entropy decoding unit 61-1. The coefficient buffer unit 62-1 is formed in the cache memory 111-2.

Similarly, the CPU 101-3 is assigned to the entropy decoding unit 61-2 that decodes encoded data C, and the CPU 101-4 is assigned to the inverse wavelet transform unit 63-2 that performs an inverse wavelet transform process on coefficient data generated in the entropy decoding unit 61-2. The coefficient buffer unit 62-2 is formed in the cache memory 111-4.

At this time, a software program that realizes the feature of the entropy decoding unit 61 is loaded into the cache memory 111-1 and the cache memory 111-3, and a software program that realizes each feature of the inverse wavelet transform unit 63 is loaded into the cache memory 111-2 and the cache memory 111-4. The CPUs 101-1 through CPU 101-4 respectively read and execute functions of those software programs from the respective cache memories 111 as required.

In the case of the example in FIG. 30, encoded data Y is decoded in the CPU 101-1 and the CPU 101-2, and encoded data C is decoded in the CPU 101-3 and the CPU 101-4. That is, by executing the process of the entropy decoding unit 61-1, with respect to the encoded data Y, the CPU 101-1 reads the encoded data Y from the RAM 103 and performs entropy decoding processing. At that time, the CPU 101-1 uses a part or all of the storage area of the cache memory 111-2 as the coefficient buffer unit 62, and causes the coefficient buffer unit 62 to hold the generated coefficient data.

By executing the process of the inverse wavelet transform unit 63-1, the CPU 101-2 reads coefficient data generated by the CPU 101-1 and held in the coefficient buffer unit 62 of the RAM 103, performs a synthesis filtering process hierarchically in the vertical direction and the horizontal direction as a wavelet transform process, and generates image data Y. The CPU 101-2 supplies the generated image data Y to the RAM 103 to be stored therein.

In parallel with this processing of the CPU 101-1 and the CPU 101-2, the CPU 101-3 and the CPU 101-4 perform an entropy decoding process and an inverse wavelet transform process with respect to image data C, as in the case of the example in FIG. 30.

In a case where the decoding unit 36 is implemented in the personal computer 100 as shown in FIG. 30, decoding processing is performed with four CPUs, the CPU 101-1 through CPU 101-4, as one set. Therefore, in this case, one decoding unit 36 is realized by the CPU 101-1 through CPU 101-4. Naturally, the decoding unit 36 is configured to perform decoding processing of all of the pictures of moving image data to be decoded and reconstructed. The flow of processing in that case is shown in FIG. 31.

Figure 31:
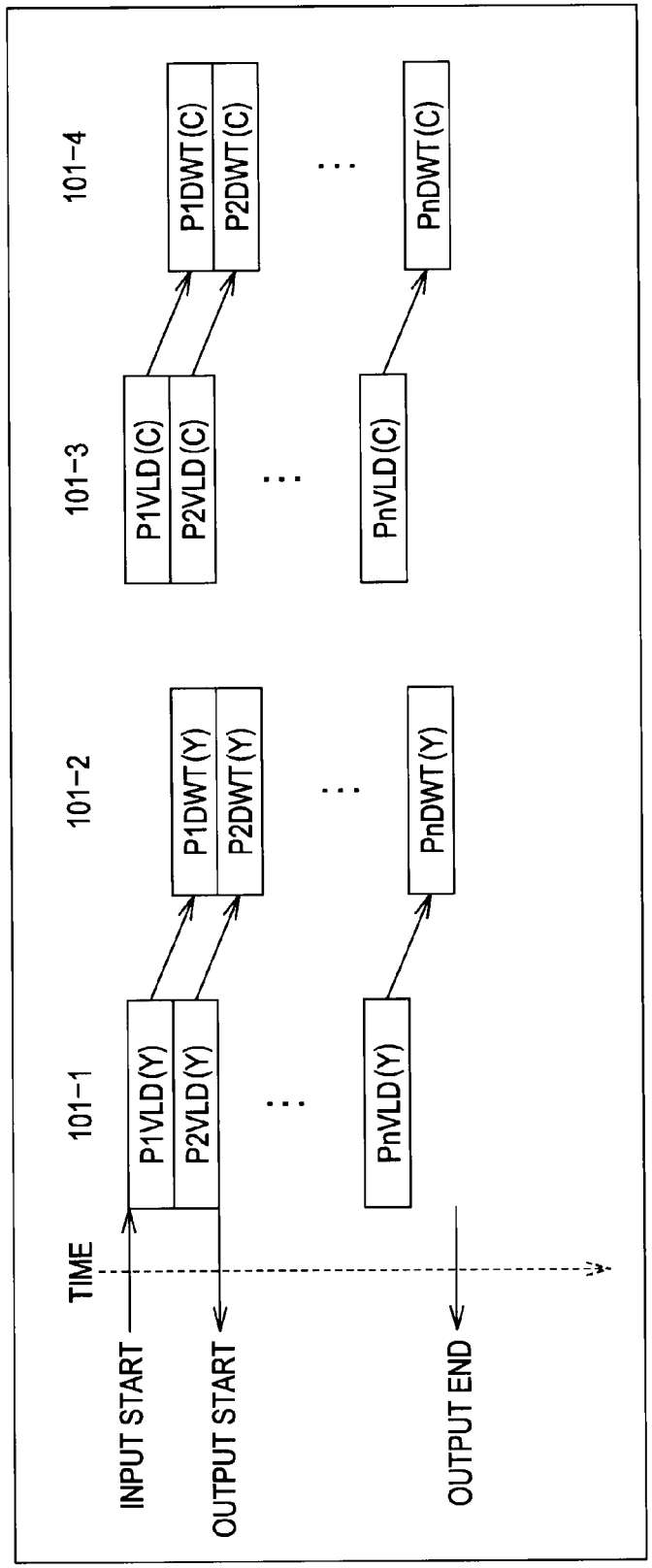
FIG. 31 is a schematic diagram showing the flow of processing in the case of the example in FIG. 30.

Since the CPU 101-1 through CPU 101-4 operate independently from each other, as in the example shown in FIG. 31, individual processes can be executed in parallel.

In this case, as shown in FIG. 31, the CPU 101-1 that executes the process of the entropy decoding unit 61-1 reads the encoded data Y of the first precinct of the first picture from the RAM 103 to perform entropy decoding (P1VLD(Y)), and stores the obtained coefficient data into the coefficient buffer unit 62-1 of the cache memory 111-2. The CPU 101-1 that executes the process of the entropy decoding unit 61-1 performs entropy decoding (P2VLD(Y)) similarly with respect to the encoded data Y of the second precinct.

In parallel with this P2VLD(Y), the CPU 101-2 that executes the process of the inverse wavelet transform unit 63-1 reads the coefficient data of the first precinct of the first picture from the coefficient buffer unit 62-1, performs an inverse wavelet transform (P1DWT(Y)), and causes the obtained image data Y to be outputted after being held in the RAM 103. The CPU 101-2 that executes the process of the inverse wavelet transform unit 63-1 performs an inverse wavelet transform (P2DWT(Y)) similarly with respect to the coefficient data of the second precinct.

That is, similarly with respect to the third precinct and onward, the CPU 101-1 and the CPU 101-2 execute entropy decoding, and an inverse wavelet transform in parallel, with the processing targets shifted by one precinct from each other.

Incidentally, in parallel with this encoding processing with respect to image data Y, the CPU 101-3 and the CPU 101-4 perform processing similarly with respect to image data C. That is, in parallel with the execution of the process of P1DWT(Y) by the CPU 101-1, the CPU 101-3 executes the process of P1DWT(C), and in parallel with the execution of the process of P2DWT(Y) by the CPU 101-1, the CPU 101-3 executes the process of P2DWT(C), and the CPU 101-4 executes the process of P1VLC(C).

Therefore, with the decoding unit 36 in this case, at the point in time when the CPU 101-2 and the CPU 101-4 finish an inverse wavelet transform with respect to the first precinct, image data (image data Y and image data C) equivalent to one precinct or more is accumulated in the RAM 103, so outputting of image data can be started.

Similarly, with respect to the second precinct and onward, encoded data Y is decoded by the CPU 101-1 and the CPU 101-2, and in parallel with that, encoded data C is decoded by the CPU 101-3 and the CPU 101-4. When the encoded data Y and encoded data C of the last n-th precinct (Pn) are decoded, and image data Y and image data C are outputted, since all of the image data of the first picture have been outputted, the outputting of image data is terminated with respect to the first picture.

The second picture and onward are also processed similarly.

As described above, in the case of the example of assignment shown in FIG. 30, by performing an entropy decoding process and an inverse wavelet transform process in parallel, the output start timing of reconstructed image data, that is, the output timing of the image data Y and image data C of the first precinct can be made earlier than in the case of the example in FIG. 28, so the delay time in decoding processing can be reduced. On an additional note, for the same reason, decoding of the first picture can be completed faster in the case of the example of assignment shown in FIG. 30 than in the case of the example in FIG. 28.

Therefore, in a case where the image of image data reconstructed in the decoding unit 36 is displayed on the monitor, the delay time from when decoding processing is started to when the first picture is displayed becomes shorter in the case of the example of assignment shown in FIG. 30 than in the case of the example in FIG. 28.

Further, as in the case of the example in FIG. 28, since coefficient data obtained by decoding encoded data Y, and coefficient data obtained by decoding encoded data C are accumulated in mutually different cache memories 111, the capacity of the coefficient buffer unit 62 can be made larger, and occurrence of a buffer overflow can be suppressed more, than in the case of the example in FIG. 26.

It should be noted, however, that in actuality, since image data Y contains a greater amount of information and is more graphically complex than image data C, the time required for decoding processing is longer. Therefore, a stand-by time occurs in the CPU 101-3 and the CPU 101-4. Furthermore, since the CPU 101 switches during decoding processing, the control becomes complex and also the processing time increases. Therefore, the usage efficiency of the CPU 101 drops lower than in the case of FIG. 28, and the throughput also drops lower than in the case of FIG. 28.

Since the respective processes of entropy decoding and inverse wavelet transform are each configured by a plurality of functions, it is also possible to change the CPU 101 to be assigned at a timing other than that between entropy decoding and an inverse wavelet transform as described above. However, unless in the case of processes that can be executed in parallel, even if mutually different CPUs 101 are assigned, processing time cannot be shortened. In the decoding unit 36 shown in FIG. 12, it is difficult to make detailed processes included in the process of entropy decoding or inverse wavelet transform parallel to each other. Therefore, in the decoding unit 36, as described above, it is ideal to divide between entropy decoding and an inverse wavelet transform.

In a case where, like a conventional computer, a computer automatically assigns CPUs that execute processing, the assignment is performed in accordance with the load condition or the like. Thus, processing may not always be split at an optimum position and assigned to mutually different CPUs in this way. Depending on the case, there is a fear that the efficiency of decoding processing is significantly reduced. By splitting processing between entropy decoding and an inverse wavelet transform in advance as in the example in FIG. 30, the decoding unit 36 can execute decoding processing with good efficiency.

By the way, while it is has been described in FIG. 3 that rearranging of coefficients is performed immediately after a wavelet transform (before entropy encoding), it suffices that encoded data be supplied to the inverse wavelet transform unit 63 of the decoding unit 36 (FIG. 12) in the order from low frequencies to high frequencies (that is, it suffices that encoded data be supplied in the order from encoded data obtained by encoding coefficient data belonging to low-frequency subbands, to encoded data obtained by encoding coefficient data belonging to high-frequency subbands), and the timing of rearranging may be other than immediately after a wavelet transform.

Figure 32:
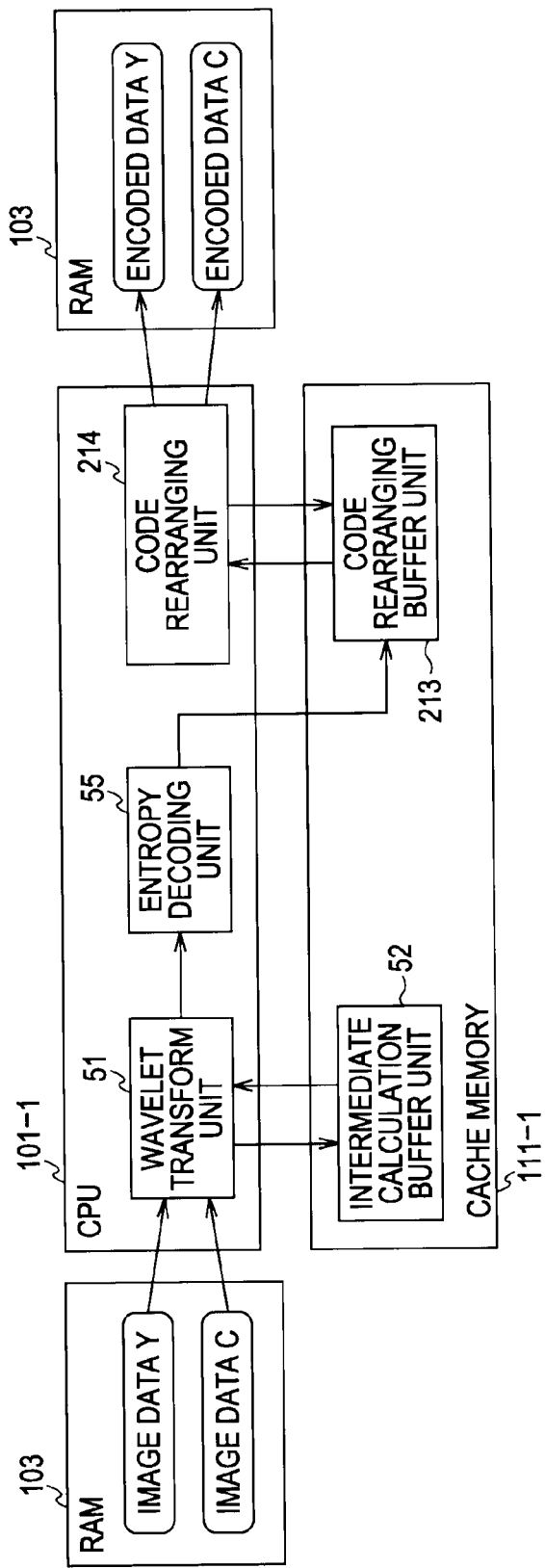
FIG. 32 is a block diagram showing another configuration example of an encoding unit.

For example, as shown in FIG. 32, the order of encoded data obtained by entropy encoding may be rearranged. The encoding unit 14 in the case of FIG. 32 has, as in the case of FIG. 3, the wavelet transform unit 51, the intermediate calculation buffer unit 52, and the entropy encoding unit 55 but has, instead of the coefficient rearranging buffer unit 53 and the coefficient rearranging unit 54 in FIG. 3, a code rearranging buffer unit 213 and a code rearranging unit 214.

Coefficient data outputted from the wavelet transform unit 51 is supplied to the entropy encoding unit 55. The entropy encoding unit 55 encodes the supplied coefficient data in the supplied order, and causes the code rearranging buffer unit 213 to hold the encoded data obtained by the encoding. That is, encoded data is supplied to the code rearranging buffer unit 213 in the order from high frequencies to low frequencies. The code rearranging unit 214 performs rearranging of encoded data by reading the encoded data held in the code rearranging buffer unit 213 in the order in which an inverse wavelet transform process is performed, that is, in the order from low frequencies to high frequencies, and causes the encoded data to be outputted in that order after being held in the RAM 103.

In FIG. 32, an example of assignment of hardware resources to such an encoding unit 14 is also shown. In the case of the example in FIG. 32, assignment is performed in such a way that all of the individual processes of encoding processing are performed in one CPU 101. That is, in the case of rearranging the order of encoded data as well, hardware resources can be assigned as in the case of rearranging coefficient data described above with reference to FIG. 19. Similarly, hardware resources can also be assigned as in the example in FIG. 21, FIG. 22, or FIG. 24. The manner in which hardware resources are assigned as in the example in FIG. 24 is shown in FIG. 33.

Figure 33:
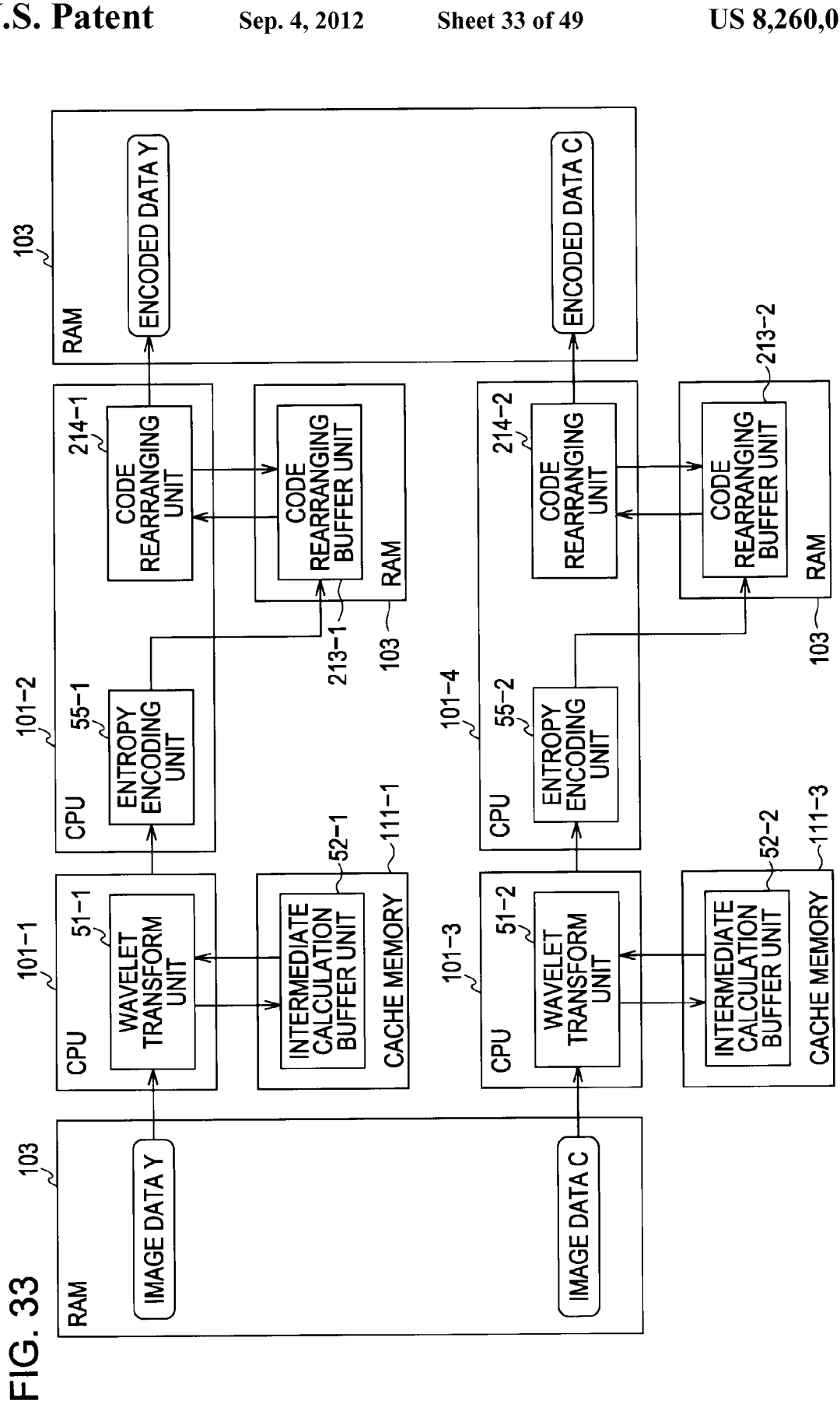
FIG. 33 is a diagram showing another example of assignment of hardware resources to the encoding unit in FIG. 32.

As shown in FIG. 33, in this case, the CPU 101-1 is assigned to the wavelet transform unit 51-1 that performs a wavelet transform process on image data Y, and the CPU 101-2 is assigned to the entropy encoding unit 55-1 that performs entropy encoding on the coefficient data of image data Y, and a code rearranging unit 214-1 that performs rearranging of encoded data Y. The intermediate calculation buffer unit 52-1 is formed in the cache memory 111-1 of the CPU 101-1, and a code rearranging buffer unit 213-1 is formed in the RAM 103.

Similarly, the CPU 101-3 is assigned to the wavelet transform unit 51-2 that performs a wavelet transform process on image data C, and the CPU 101-4 is assigned to the entropy encoding unit 55-2 that performs entropy encoding of the coefficient data of image data C, and a code rearranging unit 214-2 that performs rearranging of the coefficient data of encoded data C. The intermediate calculation buffer unit 52-2 is formed in the cache memory 111-3 of the CPU 101-3, and a code rearranging buffer unit 213-2 is formed in the RAM 103.

In this way, by performing assignment of hardware resources appropriately also in the case of rearranging the order of encoded data as in the case of rearranging coefficient data, the encoding unit 14 can execute encoding processing with good efficiency. Incidentally, in the case of rearranging the order of encoded data as well, when a plurality of CPUs 101 are to be assigned to the wavelet transform unit 51-1, the entropy encoding unit 55-1, and the code rearranging unit 214-1 (or the wavelet transform unit 51-2, the entropy encoding unit 55-2, and the code rearranging unit 214-2) as shown in FIG. 33, the switching positions of the CPUs 101 are determined in advance, thereby making it possible to suppress inappropriate assignment of hardware resources.

Incidentally, the assignment method of hardware resources may be other than those described above. For example, in the example in FIG. 33, the code rearranging buffer unit 213-1 may be formed in the cache memory 111-2 and the code rearranging buffer unit 213-2 may be formed in the cache memory 111-4, the CPU 101-1 may be assigned to the entropy encoding unit 55-1 and the CPU 101-3 may be assigned to the entropy encoding unit 55-2, or mutually different CPUs 101 may be assigned to the wavelet transform unit 51-1, the entropy encoding unit 55-1, and the code rearranging unit 214-1 and mutually different CPUs 101 may be assigned to the wavelet transform unit 51-2, the entropy encoding unit 55-2, and the code rearranging unit 214-2.

Incidentally, in this case, the configuration of the decoding unit 36 and the assignment method of hardware resources are similar to those in the cases described above with reference to FIG. 26 through FIG. 31.

Figure 34:
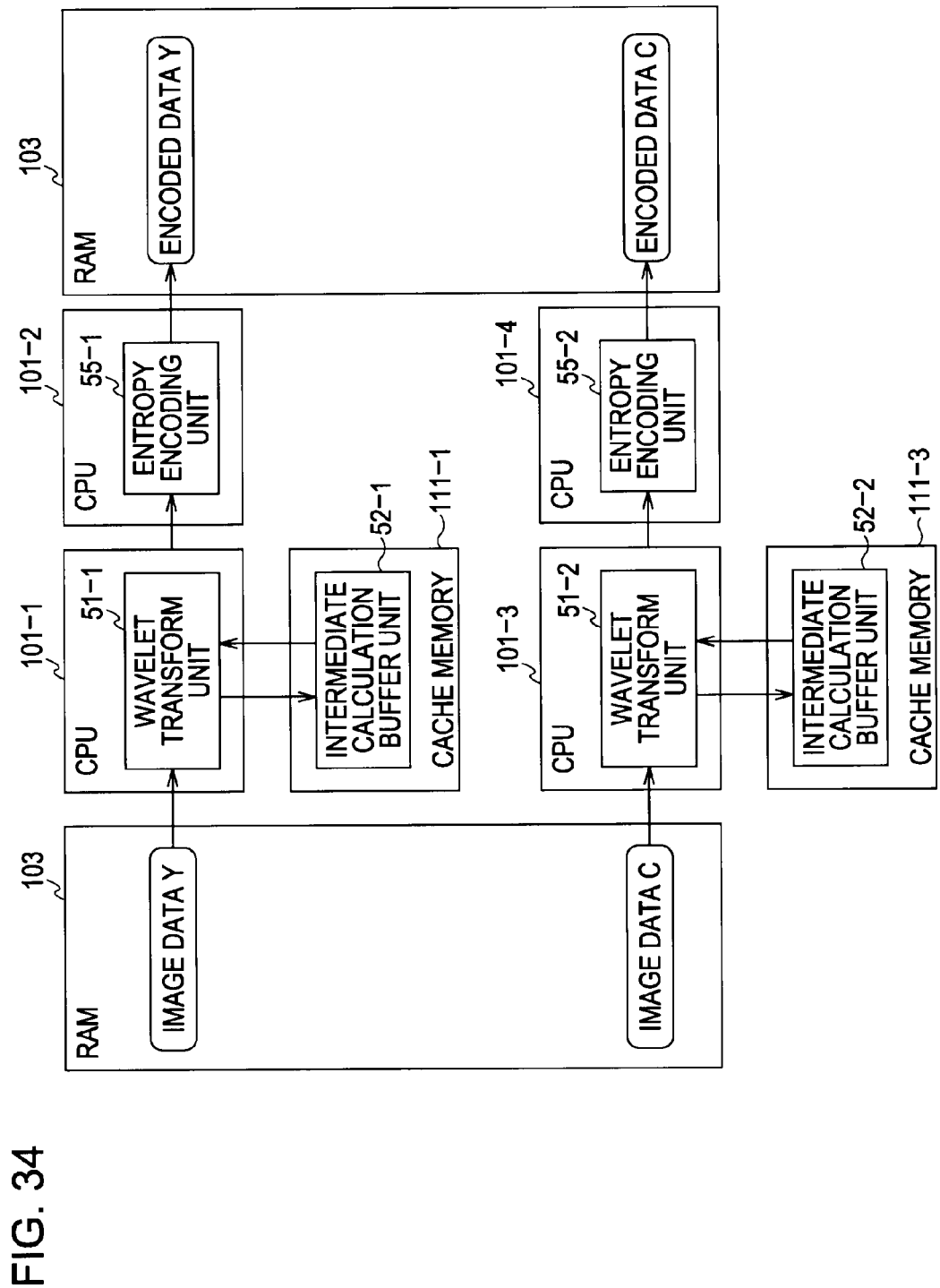
FIG. 34 is a block diagram showing still another configuration example of an encoding unit.

Rearranging may be performed on the decoding unit 36 side. In that case, as shown in FIG. 34, the encoding unit 14 has the wavelet transform unit 51, the intermediate calculation buffer unit 52, and the entropy encoding unit 55, and does not have the coefficient rearranging buffer unit 53 and the coefficient rearranging unit 54 as shown in FIG. 3.

Of course, the assignment to the CPU 101 in the encoding unit 14 can be performed similarly to the case of rearranging coefficient data described above with reference to FIG. 20 through FIG. 25. That is, in this case as well, by performing assignment of hardware resources appropriately, the encoding unit 14 can execute encoding processing with good efficiency. As an example, an example corresponding to the example in FIG. 24 is shown in FIG. 34.

Figure 35:
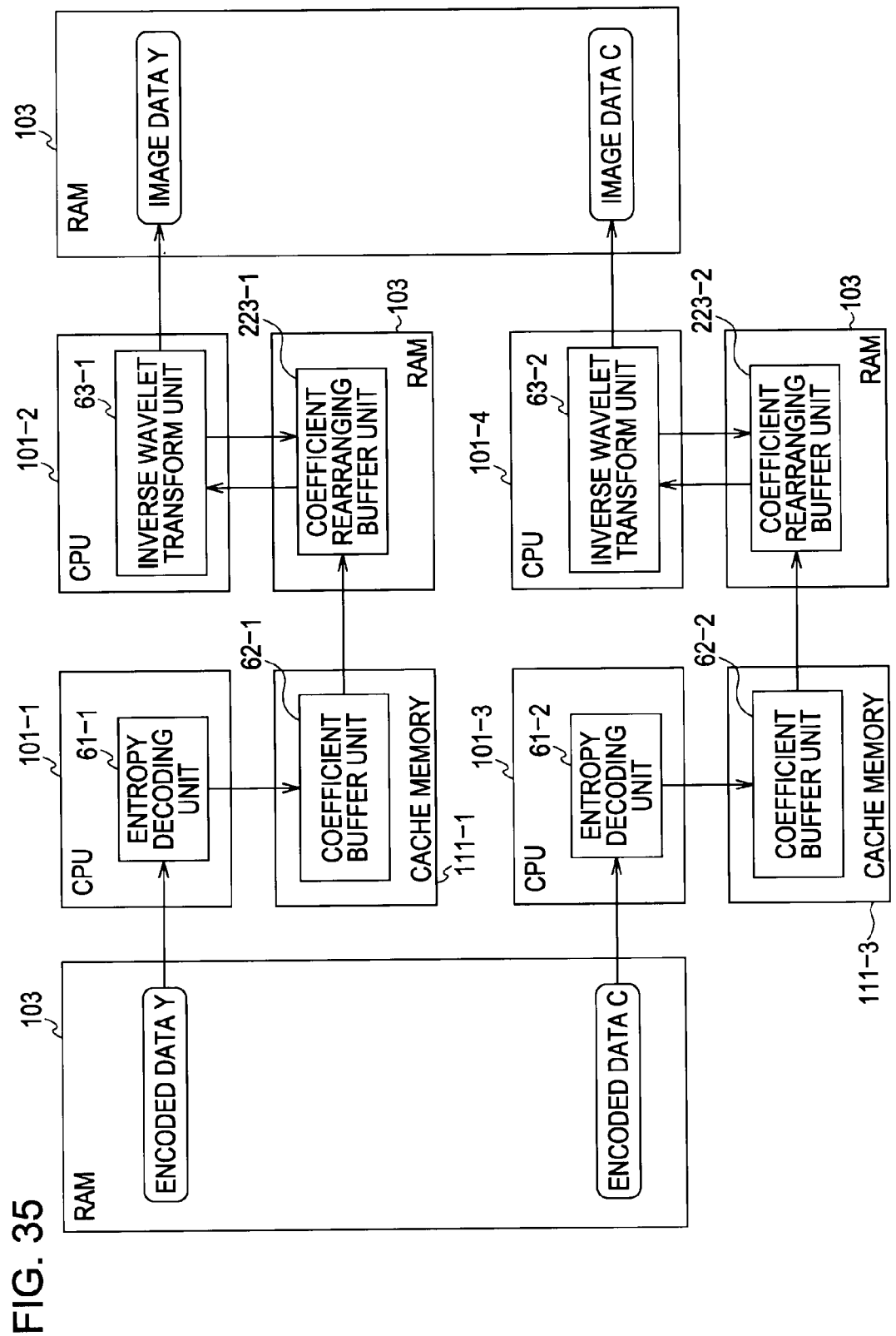
FIG. 35 is a block diagram showing a configuration example of a decoding unit corresponding to the encoding unit in FIG. 34.

The configuration of the decoding unit 36 corresponding to the encoding unit 14 at this time is as shown in FIG. 35. That is, the decoding unit 36 has a coefficient rearranging buffer unit 223 for rearranging the order of coefficient data, between the coefficient buffer unit 62 and the inverse wavelet transform unit 63. In the decoding unit 36 at this time, assignment to the CPU 101 can be performed as in the example described above with reference to FIG. 26 through FIG. 31. That is, in this case as well, by performing assignment of hardware resources appropriately, the decoding unit 36 can execute decoding processing with good efficiency. As an example, an example corresponding to the example in FIG. 30 is shown in FIG. 35.

In the case of the example in FIG. 35, a coefficient rearranging buffer unit 223-1 that holds the coefficient data of a luminance component Y outputted from the coefficient buffer unit 62-1, and a coefficient rearranging buffer unit 223-2 that holds the coefficient data of a chrominance component C outputted from the coefficient buffer unit 62-2 are formed in the RAM 103.

The CPU 101-2 that executes the process of the inverse wavelet transform unit 63-1 reads the coefficient data of the luminance component Y in the rearranged order, that is, in the order from low frequencies to high frequencies, from the coefficient rearranging buffer unit 223-1 of the RAM 103, and performs an inverse wavelet transform process on the coefficient data in that order. The CPU 101-2 causes the generated image data Y to be outputted after being held in the RAM 103.

Similarly, the CPU 101-4 that executes the process of the inverse wavelet transform unit 63-2 reads the coefficient data of the chrominance component C in the rearranged order, that is, in the order from low frequencies to high frequencies, from the coefficient rearranging buffer unit 223-2 of the RAM 103, and performs an inverse wavelet transform process on the coefficient data in that order. The CPU 101-4 causes the generated image data C to be outputted after being held in the RAM 103.

By appropriately assigning individual processes in the encoding unit 14 and the decoding unit 36 to the CPU 101 as described above, it is possible to enhance the processing efficiencies of the encoding unit 14 and decoding unit 36, and enhance throughput or reduce delay time.

Figure 36:
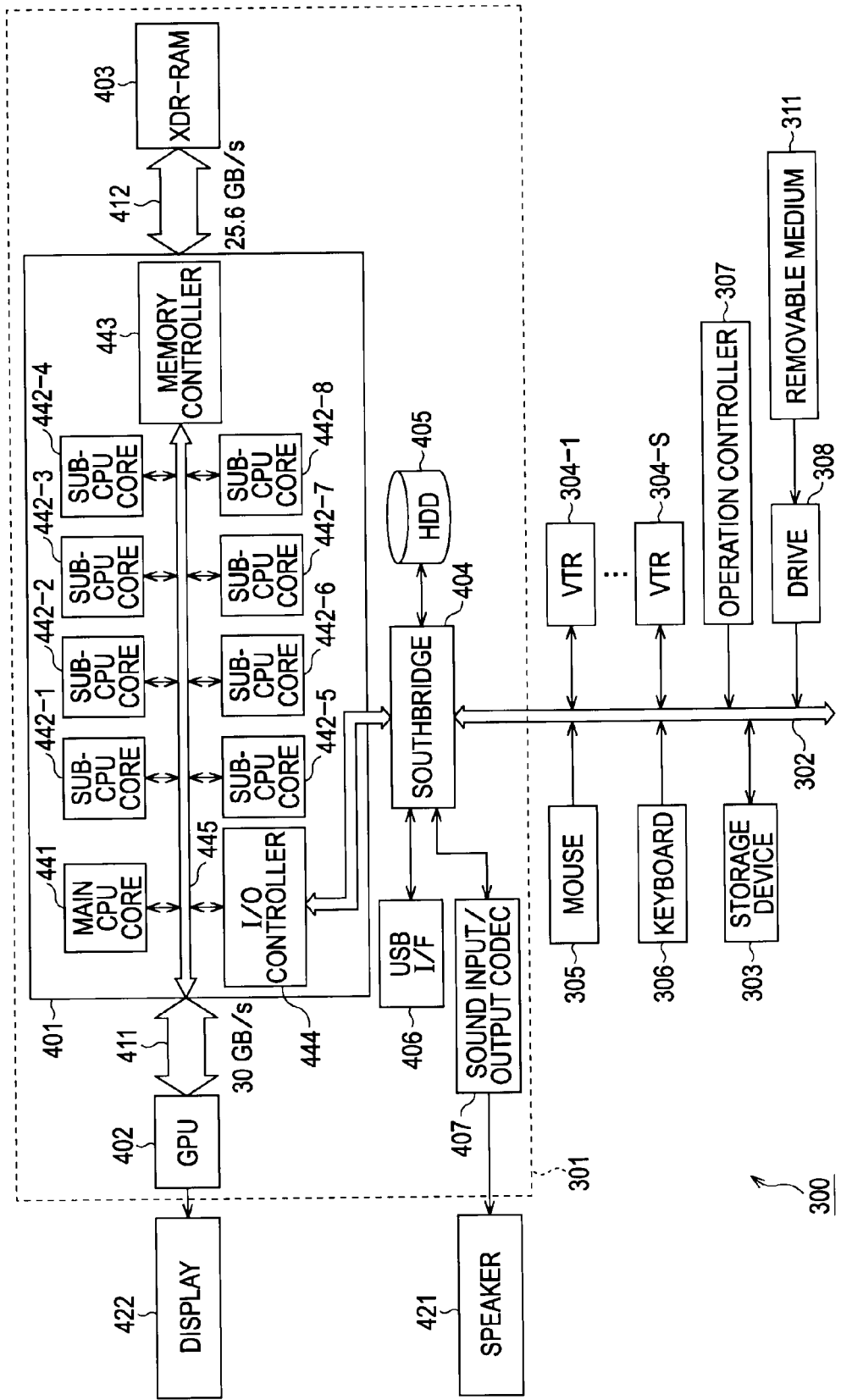
FIG. 36 is a block diagram showing a configuration example of an information processing system.

Incidentally, there are cases where characteristics required of the encoding unit 14 or the decoding unit 36 vary depending on the image. To allow appropriate adaptation to such a case as well, a plurality of assignment patterns as described above may be prepared in advance, and an assignment pattern may be selected as appropriate in accordance with conditions. A description will be given below of that case. First, a description will be given of hardware in which a software encoder or a software decoder is implemented. FIG. 36 is a block diagram showing a configuration example of an information processing system in which a software encoder or a software decoder is implemented.

As shown in FIG. 36, an information processing system 300 is a system configured by an information processing device 301, a storage device 303 connected to the information processing device 301 via a PCI bus 302, VTR 304-1 through VTR 304-S as a plurality of video tape recorders (VTRs), a mouse 305 for the user to perform an operation input with respect to these, a keyboard 306, and an operation controller 307, and is a system that performs the image encoding processing, image decoding processing, or the like described above by a program that is installed.

For example, the information processing device 301 of the information processing system 300 can cause the storage device 303 to store encoded data obtained by encoding moving image content stored in the storage device 303 with a large capacity made up of RAID (Redundant Arrays of Independent Disks), can cause the storage device 303 to store decoded image data (moving image content) obtained by decoding encoded data stored in the storage device 303, or cause encoded data or decoded image data to be recorded onto videotapes via the VTR 304-1 through VTR 304-S. Further, the information processing device 301 is also configured to be capable of capturing moving image content recorded on videotapes mounted on the VTR 304-1 through VTR 304-S, onto the storage device 303. At that time, the information processing device 301 may encode the moving image content.

The information processing device 301 has a microprocessor 401, a GPU (Graphics Processing Unit) 402, an XDR (Extreme Data Rate)-RAM 403, a southbridge 404, an HDD (Hard Disk Drive) 405, a USB interface (USB I/F) 406, and a sound input/output codec 407.

The GPU 402 is connected to the microprocessor 401 via a dedicated bus 411. The XDR-RAM 403 is connected to the microprocessor 401 via a dedicated bus 412. The southbridge 404 is connected to an I/O controller 444 of the microprocessor 401 via a dedicated bus. The HDD 405, the USB interface 406, and the sound input/output codec 407 are also connected to the southbridge 404. A speaker 421 is connected to the sound input/output codec 407. Further, a display 422 is connected to the GPU 402.

Further, the mouse 305, the keyboard 306, the VTR 304-1 through VTR 304-S, the storage device 303, and the operation controller 307 are further connected to the southbridge 404 via the PCI bus 302.

The mouse 305 and the keyboard 306 receive a user's operation input, and supply a signal indicating the contents of the user's operation input to the microprocessor 401, via the PCI bus 302 and the southbridge 404. The storage device 303 and the VTR 304-1 through VTR 304-S are configured to be capable of recording or playing back predetermined data.

A drive 308 is further connected to the PCI bus 302 as required, a removable medium 311 such as a magnetic disk, an optical disk, a magneto-optical disk, or a semiconductor memory is mounted as appropriate, and a software program read therefrom is installed into the HDD 405 as required.

The microprocessor 401 is of a multi-core configuration in which a general-purpose main CPU core 441 that executes a basis program such as the OS (Operating System), sub-CPU core 442-1 through sub-CPU core 442-8, which are a plurality of (in this case, eight) signal processing processors of the RISC (Reduced Instruction Set Computer) connected to the main CPU core 441 via a shared bus 445, a memory controller 443 that performs memory control with respect to the XDR-RAM 403 having a capacity of, for example, 256 [MByte], and the I/O (In/Out) controller 444 that manages the input and output of data to and from the southbridge 404, are integrated into one chip, and realizes an operation frequency of, for example, 4 [GHz].

Upon activation, on the basis of a control program stored in the HDD 405, the microprocessor 401 reads a necessary application program stored in the HDD 405 and expands the application program onto the XDR-RAM 403, and thereafter executes a necessary control process on the basis of this application program and an operator's operation.

Further, by executing software, the microprocessor 401 can, for example, realize the encoding processing or decoding processing described above, and cause the encoded stream obtained as a result of encoding to be supplied to the HDD 405 to be stored therein via the southbridge 404, or perform data transfer of a playback video of moving image content obtained as a result of decoding to the GPU 402 to be displayed on the display 422.

While the method of using individual CPU cores within the microprocessor 401 is arbitrary, for example, the main CPU core 441 may perform processing related to control of image encoding processing or image decoding processing, and the eight sub-CPU cores 442-1 through sub-CPU core 442-8 may be configured to execute individual processes such as a wavelet transform, coefficient rearranging, entropy encoding, entropy decoding, an inverse wavelet transform, quantization, and inverse quantization, for example, in a simultaneous, parallel fashion as described above with reference to FIG. 17. At that time, if the main CPU core 441 is configured to assign processes on a precinct-by-precinct basis to each of the eight sub-CPU cores 442-1 through sub-CPU core 442-8, encoding processing or decoding processing is executed in a simultaneous, parallel fashion on a precinct-by-precinct basis, as in the case described above with reference to FIG. 17. That is, it is possible to enhance the efficiency of encoding processing or decoding processing, shorten the delay time for the processing as a whole, and further, reduce the load, the processing time, and the memory capacity required for the processing. Of course, individual processes may be performed by a method other than this.

The GPU 402 is configured to govern the functions of performing, in addition to a final rendering process related to pasting of texture or the like when moving a playback video of moving image content to be displayed on the display 422, a coordinate transformation calculation process when displaying a plurality of playback images of moving image content and still images of still image content on the display 422 at once, an enlarging/reducing process with respect to a playback image of moving image content and a still image of still image content, and the like, thereby lightening the processing load on the microprocessor 401.

Under the control of the microprocessor 401, the GPU 402 applies predetermined signal processing on supplied video data of moving image content or image data of still image content, sends out the video data or image data obtained as a result to the display 422, and displays an image signal on the display 422.

By the way, playback videos for a plurality of moving image contents decoded in a simultaneous, parallel fashion by the eight sub-CPU core 442-1 through sub-CPU core 442-8 of the microprocessor 401 undergo data transfer to the GPU 402 via the bus 411. The transfer rate at this time is, for example, 30 [Gbyte/sec] at maximum, thus allowing even complex playback images with special effects to be displayed at high speed and smoothly.

Further, the microprocessor 401 can also apply an audio mixing process to audio data among the video data and audio data of moving image content, and sends out edited audio data obtained as a result to the speaker 421 via the southbridge 404 and the sound input/output codec 407, thereby making it possible to output audio based on an audio signal from the speaker 421.

Figure 37:
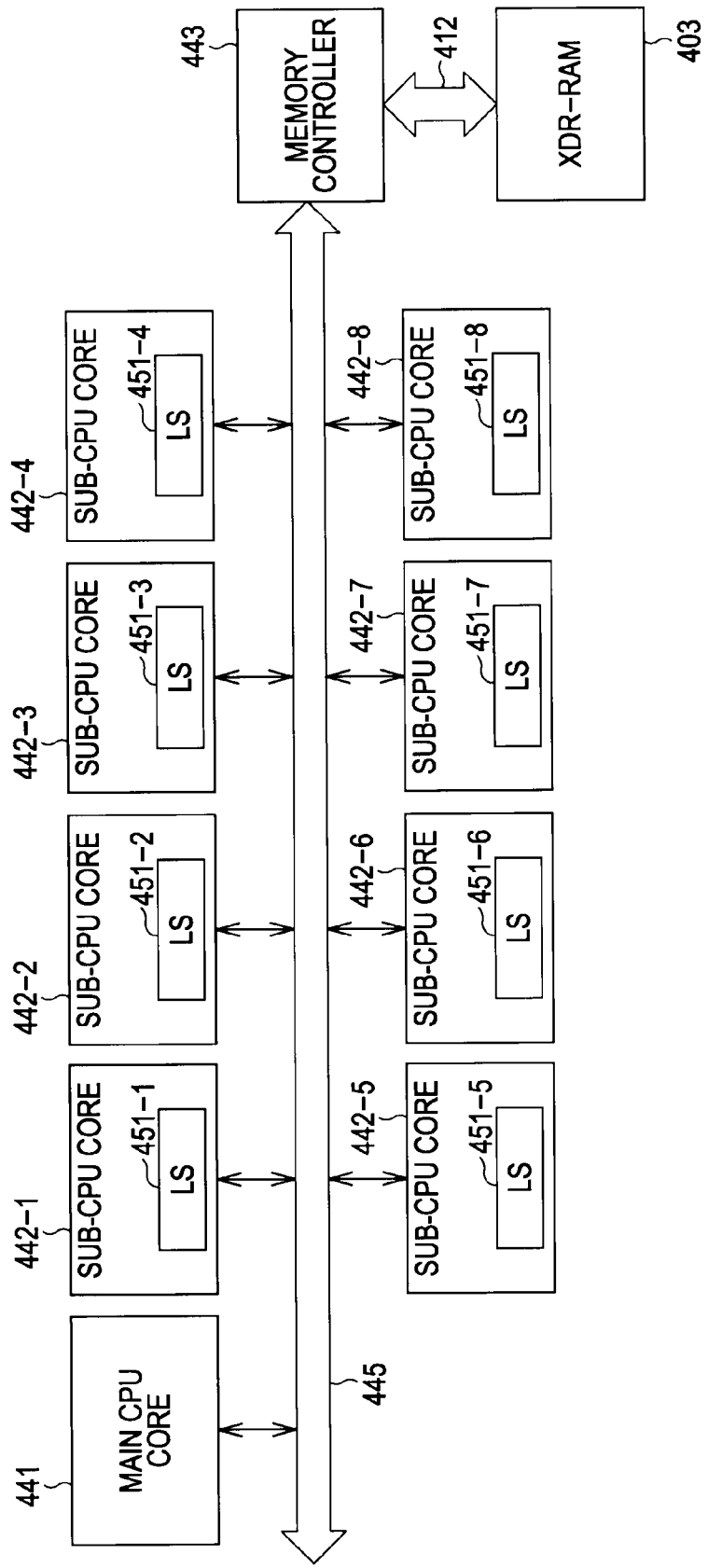
FIG. 37 is a block diagram showing a configuration example of sub-CPU cores.

As shown in FIG. 37, LS (Local Store) 451-1 through LS 451-8 as cache memories are respectively built in the eight sub-CPU core 442-1 through sub-CPU core 442-8 in the microprocessor 401 of the information processing system 300 described above. That is, the eight sub-CPU core 442-1 through sub-CPU core 442-8 can use the storage areas of the LS 451-1 through LS 451-8 built in themselves, and of the XDR-RAM 403.

As in the case of the cache memory 111 of the personal computer 100 in FIG. 18, the LS 451-1 through LS 451-8 can be exclusively used by the sub-CPU core 442-1 through sub-CPU core 442-8, respectively, and allow reading or writing of data to be performed without via the shared bus 445, and further, operate at higher speed than the XDR-RAM 403. Therefore, the LS 451-1 through LS 451-8 allow reading or writing of data at higher speed than the XDR-RAM 403. It should be noted, however, that as compared with the XDR-RAN 403, the unit price of the LS 451-1 through LS 451-8 per capacity is high, and their capacity is small.

Although, in actuality, the capacity of the XDR-RAM 403 is also finite, in the following, it is assumed that the capacity of the XDR-RAM 403 is sufficiently large and, conversely, the LS 451-1 through LS 451-8 have a small capacity and can hold only minimum required data.

In the following description, the sub-CPU core 442-1 through sub-CPU core 442-8 will be referred to as sub-CPU core 442 when there is no need to distinguish them from each other. Further, the LS 451-1 through LS 451-8 will be referred to as LS 451 when there is no need to distinguish them from each other.

For the sub-CPU core 441-1 through sub-CPU core 442-8, an optimum one is selected by the main core CPU core 441 from among the plurality of assignment methods described above that are prepared in advance, and individual processes in the encoding unit 14 and the decoding unit 36 are assigned in accordance with the assignment method.

Figure 38:
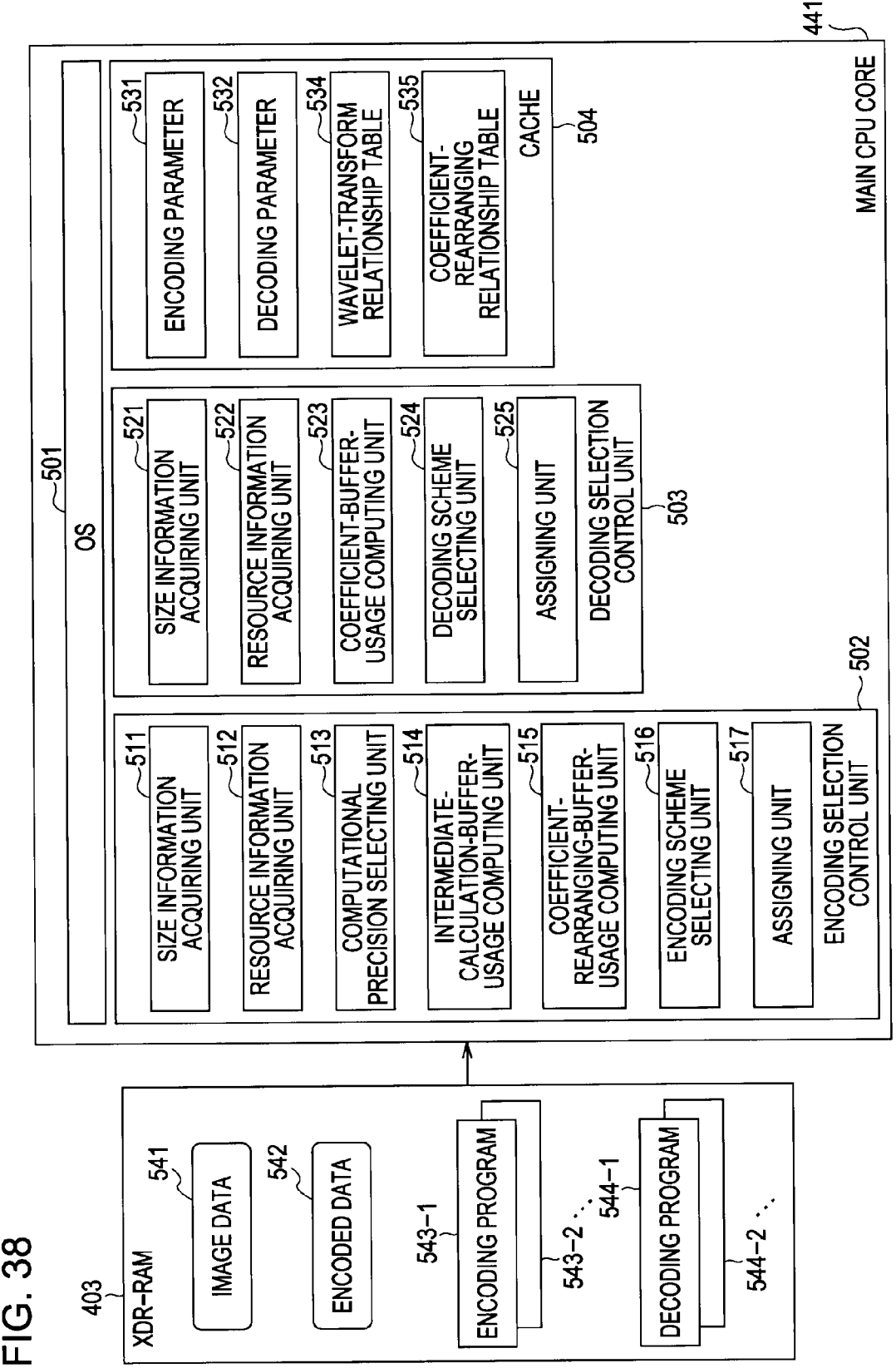
FIG. 38 is a block diagram showing a configuration example of a main CPU core.

Functional blocks that the main CPU core 441 has are shown in FIG. 38.

As shown in FIG. 38, the main CPU core 441 has an OS 501, which is basic software that performs control of the information processing system 300 as a whole and causes hardware to execute the processing of a software program, an encoding selection control unit 502 that performs selection of an assignment method at the time of implementing the encoding unit 14, a decoding selection control unit 503 that performs selection of an assignment method at the time of implementing the decoding unit 36, and a cache 504 that is a local cache memory of the main CPU core 441.

The OS 501 manages the hardware resources of the information processing system 300, and on the basis of a request from the encoding selection control unit 502 or the decoding selection control unit 503, provides resource information as information related to hardware resources, or assign hardware resources to processes.

For example, the OS 501 reads an encoding program or a decoding program from the HDD 405 and assigns it to the LS 451 or the XDR-RAM 403, or causes the sub-CPU core 442 to execute processing. Further, the OS 501 secures an area for a capacity required for the XDR-RAM 403, for example.

The encoding selection control unit 502 has a size information acquiring unit 511, a resource information acquiring unit 512, a computational precision selecting unit 513, an intermediate-calculation-buffer-usage computing unit 514, a coefficient-rearranging-buffer-usage computing unit 515, an encoding scheme selecting unit 516, and an assigning unit 517.

The size information acquiring unit 511 acquires, from the XDR-RAM 403, size information of image data 541 as a processing target held in the XDR-RAM 403, which includes at least one of information such as the vertical and horizontal size of an image, the bit depth, the kind of a wavelet filter, and the number of decompositions of a wavelet transform. The resource information acquiring unit 512 acquires resource information including at least one of information such as the number of sub-CPU cores currently available and the capacity of the LS 451, via the OS 501. The computational precision selecting unit 513 performs computational selection in entropy encoding, on the basis of an encoding parameter 531 as pre-defined setting information related to encoding, such as whether encoding is reversible or not, whether the priority is on latency or not, whether the priority is on throughput or not, or whether the priority is on precision or not.

The intermediate-calculation-buffer-usage computing unit 514 computes an intermediate calculation buffer usage indicating a capacity required for the intermediate calculation buffer unit 52, with respect to each component. The coefficient-rearranging-buffer-usage computing unit 515 computes a coefficient rearranging buffer usage indicating a capacity required for the coefficient rearranging buffer unit 53, with respect to each component.

The encoding scheme selecting unit 516 selects one program to be executed, from among an encoding program 543-1, an encoding program 543-2, . . . held in the XDR-RAM 403, in accordance with various conditions. The encoding program 543-1, the encoding program 543-2, . . . are each a software program for realizing the encoding unit 14 in FIG. 3, and the method of assigning hardware to the program itself is defined in advance. It should be noted, however, that the assignment method differs for each software program. Incidentally, in the following description, the encoding program 543-1, the encoding program 543-2, . . . will be referred to as encoding program 543 when there is no need to differentiate them from each other. The assigning unit 517 assigns hardware resources such as the sub-CPU core 442-1 through sub-CPU core 442-8 to the encoding program 543 selected by the encoding scheme selecting unit 516, in accordance with the assignment method of the encoding program 543.

The decoding selection control unit 503 has a size information acquiring unit 521, a resource information acquiring unit 522, a coefficient-buffer-usage computing unit 523, a decoding scheme selecting unit 524, and an assigning unit 525.

The size information acquiring unit 521 acquires size information of encoded data 542 as a processing target held in the XDR-RAM 403, which includes at least one of information such as the vertical and horizontal size of an image, the bit depth, the kind of a wavelet filter, and the number of decompositions of a wavelet transform. The resource information acquiring unit 522 acquires the resource information of the information processing system 300 via the OS 501.

The coefficient-buffer-usage computing unit 523 computes a coefficient buffer usage indicating a capacity required for the coefficient buffer unit 62, with respect to each component.

The decoding scheme selecting unit 524 selects one program to be executed, from among a decoding program 544-1, a decoding program 544-2, ... held in the XDR-RAM 403, in accordance with various conditions. The decoding program 544-1, the decoding program 544-2, ... are each a software program for realizing the decoding unit 36 in FIG. 12, and the method of assigning hardware to the program itself is defined in advance. It should be noted, however, that the assignment method differs for each software program. Incidentally, in the following description, the decoding program 544-1, the decoding program 544-2, ... will be referred to as decoding program 544 when there is no need to differentiate them from each other. The assigning unit 525 assigns hardware resources such as the sub-CPU core 442-1 through sub-CPU core 442-8 to the decoding program 544 selected by the decoding scheme selecting unit 524, in accordance with the assignment method of the decoding program 544.

The encoding parameter 531 indicating preset encoding conditions, and a decoding parameter 532 indicating preset decoding conditions are stored in the cache 504. Further, a wavelet-transform relationship table 533 used for the selection of an encoding scheme, and a coefficient-rearranging relationship table 534 are held in the cache 504.

As shown in FIG. 39, the wavelet-transform relationship table 533 is table information made up of the items of the number of decompositions, 5×3 filter, and 9×7 filter, and is table information for obtaining a relationship index for computing a capacity required for the intermediate calculation buffer unit 52 for wavelet transform.

Further, as shown in FIG. 40, the coefficient-rearranging relationship table 534 is table information made up of the items of the number of decompositions, 5×3 filter, and 9×7 filter, and is table information for obtaining a relationship index for computing a capacity required for the coefficient rearranging buffer unit 53.

Next, individual processes executed by the main CPU core 441 as described above will be described.

Figure 41:
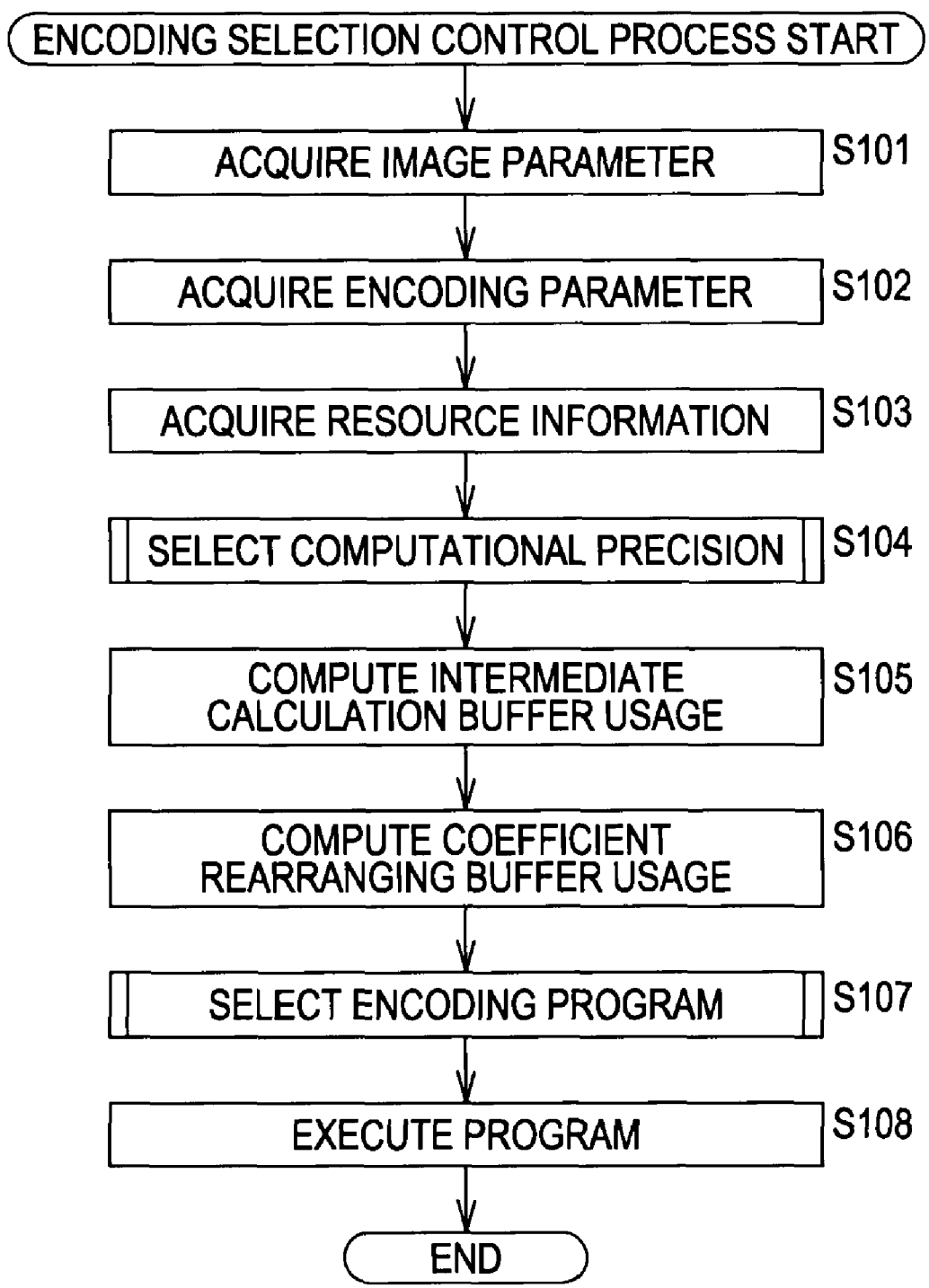
FIG. 41 is a flowchart illustrating an example of the flow of an encoding selection control process.

First, an example of the flow of an encoding selection control process executed by the encoding selection control unit 502 will be described with reference to the flowchart in FIG. 41. The encoding selection control process is a process executed for selecting one from among a plurality of encoding programs 543 that differ from each other in the way in which the sub-CPU core 442-1 through sub-CPU core 442-8 are assigned, at the time of performing encoding processing. For example, when instructed to execute encoding processing by the user, the encoding selection control unit 502 starts an encoding selection control process.

When an encoding selection control process is started, in step S101, the size information acquiring unit 511 acquires size information with respect to the image data 541 as a processing target held in the XDR-RAM 403. In step S102, the resource information acquiring unit 512 acquires resource information as information related to available hardware resources, via the OS 501. In step S103, the computational precision selecting unit 513 selects and sets the computational precision of encoding processing, on the basis of the encoding parameter 531, size information, and the like. The detailed flow of the computational precision selection processing will be described later.

When a computational precision is selected, the intermediate-calculation-buffer-usage computing unit 514 computes, in step S104, an intermediate calculation buffer usage indicating a capacity required for the intermediate calculation buffer unit 52, by using the wavelet-transform relationship table 533 or the like. The coefficient-rearranging-buffer-usage computing unit 515 computes, in step S105, a coefficient rearranging buffer usage indicating a capacity required for the coefficient rearranging buffer unit 53, by using the coefficient-rearranging relationship table 534 or the like.

In step S106, the encoding scheme selecting unit 516 selects an encoding scheme on the basis of various information, such as size information, resource information, the selected computational precision, and the computed intermediate calculation buffer usage and coefficient rearranging buffer usage. The details of the encoding scheme selecting process will be described later.

When an encoding scheme is selected, in step S107, the assigning unit 517 assigns the sub-CPU core 442-1 through sub-CPU core 442-8 to individual processes, in accordance with the assignment method of the selected encoding program 543.

When the process of step S107 is finished, the encoding selection control process is terminated.

Next, an example of the flow of the computational precision selecting process executed in step S103 in FIG. 41 will be described with reference to the flowchart in FIG. 42.

When the computational precision selecting process is started, in step S121, the computational precision selecting unit 513 determines whether the kind of a filter used in wavelet transform process is a 5×3 filter or a 9×7 filter, on the basis of size information. If it is determined to be a 5×3 filter, the processing proceeds to step S122.

In step S122, the computational precision selecting unit 513 determines whether or not to perform reversible encoding as entropy encoding, on the basis of the encoding parameter 531. If it is determined to perform reversible encoding, the processing proceeds to step S123. In step S123, the computational precision selecting unit 513 determines whether or not the bit depth of the image data 541 is 13 or less, on the basis of size information.

If it is determined that the bit depth is 13 or less, the processing proceeds to step S124. In step S124, the computational precision selecting unit 513 selects and sets a 16-bit fixed-point type as the computational precision. When the process of step S124 is finished, the computational precision selecting process is finished, the processing returns to step S103 in FIG. 41, and the processing from step S104 onward is executed.

Figure 42:
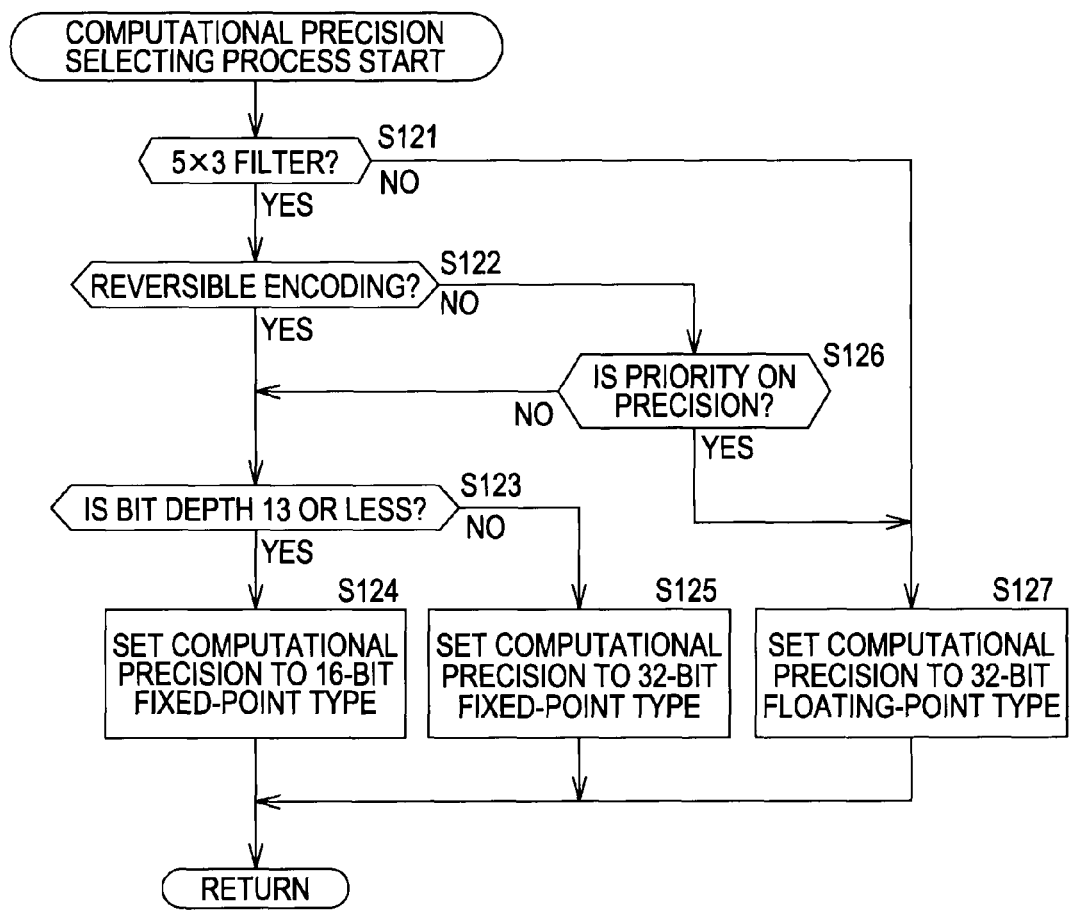
FIG. 42 is a flowchart illustrating an example of the flow of a computational precision selecting process.

Further, if it is determined in step S123 in FIG. 42 that the bit depth is larger than 13, the processing proceeds to step S125. In step S125, the computational precision selecting unit 513 selects and sets a 32-bit fixed-point type as the computational precision. When the process of step S125 is finished, the computational precision selecting process is finished, the processing returns to step S103 in FIG. 41, and the processing from step S104 onward is executed.

If it is determined in step S122 in FIG. 42 that irreversible encoding is performed as entropy encoding, the processing proceeds to step S126. In step S126, the computational precision selecting unit 513 determines whether or not the priority is on precision, on the basis of the encoding parameter 531. If it is determined that the priority is not on precision, the processing returns to step S123, and the processing thereafter is repeated.

Further, if it is determined in step S126 that the priority is on precision, the processing proceeds to step S127. Furthermore, if it is determined in step S121 on the basis of size information that the kind of a filter used in the wavelet transform process is a 9×7 filter, the processing proceeds to step S127.

In step S127, the computational precision selecting unit 513 selects and sets 32-bit floating-point type as the computational precision. When the process of step S127 is finished, the computational precision selecting process is finished, the processing returns to step S103 in FIG. 41, and the processing from step S104 onward is executed.

A computational precision is selected as described above.

Next, an example of the flow of the encoding scheme selecting process executed in step S106 in FIG. 41 will be described with reference to the flowchart in FIG. 43.

In step S141, on the basis of an intermediate calculation buffer usage computed by the intermediate-calculation-buffer-usage computing unit 514, and an available capacity indicating the available storage capacity of the LS 451 confirmed by the resource information acquiring unit 512, the encoding scheme selecting unit 516 determines whether or not the available capacity of the LS 451 is a sufficient capacity as the intermediate calculation buffer unit 52 for two components. That is, the encoding scheme selecting unit 516 determines whether or not the available capacity of the LS 451 is equal to or larger than the sum of the respective intermediate calculation buffer usages of the two components. If it is determined to be sufficient, the processing proceeds to step S142.

In step S142, on the basis of the intermediate calculation buffer usage computed by the intermediate-calculation-buffer-usage computing unit 514, the coefficient rearranging buffer usage computed by the coefficient-rearranging-buffer-usage computing unit 515, and the available capacity of the LS 451 confirmed by the resource information acquiring unit 512, the encoding scheme selecting unit 516 determines whether or not the available capacity of the LS 451 is a sufficient capacity as the intermediate calculation buffer unit 52 and the coefficient rearranging buffer unit 53 for two components. That is, the encoding scheme selecting unit 516 determines whether or not the available capacity of the LS 451 is equal to or larger than the sum of the respective intermediate calculation buffer usages and coefficient rearranging buffer usages of the two components. If it is determined to be sufficient, the processing proceeds to step S143.

In step S143, the encoding scheme selecting unit 516 determines on the basis of the encoding parameter 531 whether or not the priority is on throughput. If it is determined that the priority is on throughput, the processing proceeds to step S144.

In step S144, the encoding scheme selecting unit 516 selects an encoding scheme A that applies the assignment method described above with reference to FIG. 19. That is, in this case, as shown in FIG. 19, one sub-CPU core 442 is assigned to all of the processes on the encoding unit 14. Further, both the intermediate calculation buffer unit 52 and the coefficient rearranging buffer unit 53 are formed in the LS 451. When the process of step S144 is finished, the encoding scheme selecting process is finished, the processing returns to step S106 in FIG. 41, and the processing proceeds to step S107.

Figure 43:
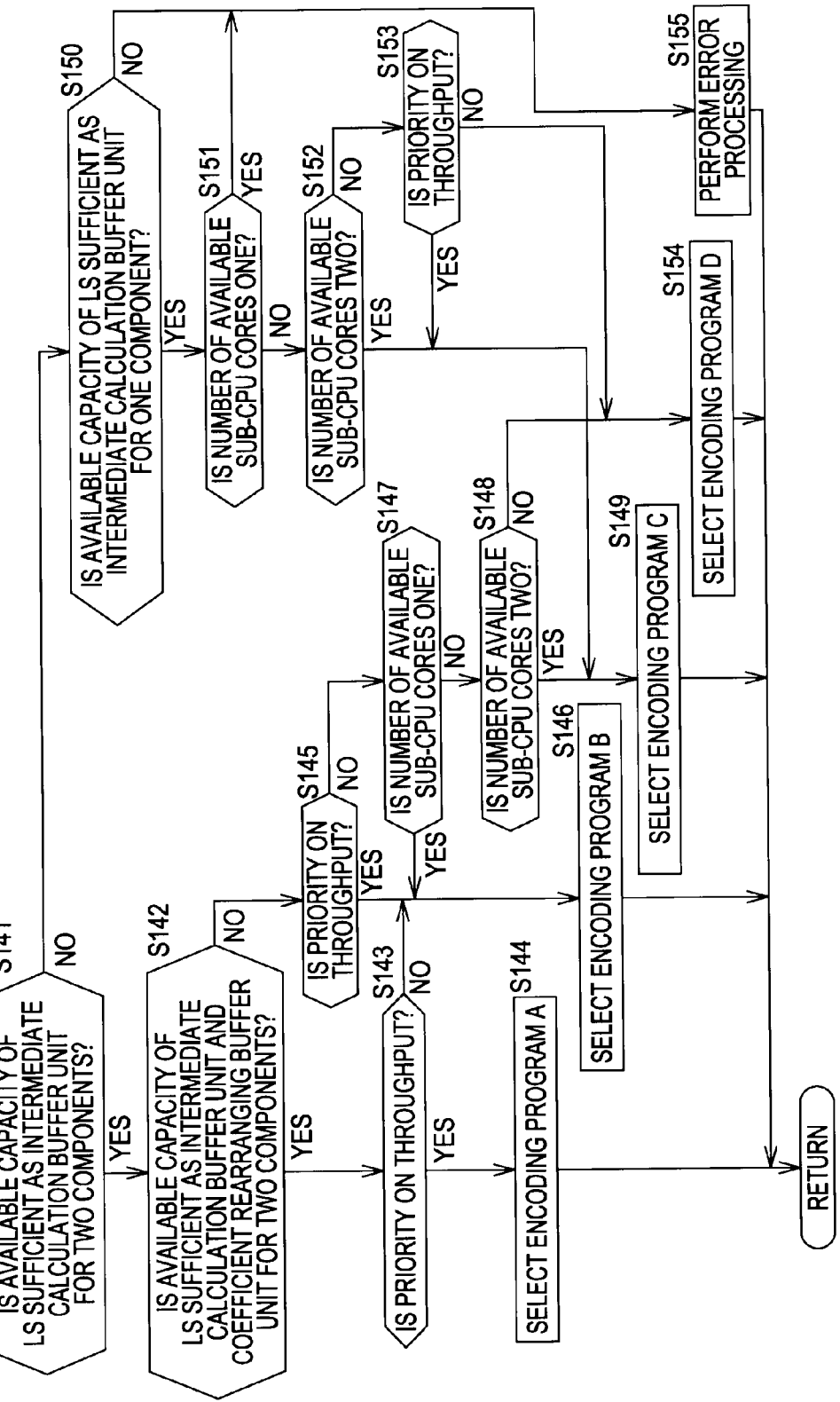
FIG. 43 is a flowchart illustrating an example of the flow of an encoding scheme selecting process.

If it is determined in step S142 in FIG. 43 that the available capacity of the LS 451 is not sufficient as the intermediate calculation buffer unit 52 and the coefficient rearranging buffer unit 53 for two components, the processing proceeds to step S145. In step S145, the encoding scheme selecting unit 516 determines on the basis of the encoding parameter 531 whether or not the priority is on throughput. If it is determined that the priority is on throughput, the processing proceeds to step S146. Further, if it is determined in step S143 that the priority is not on throughput, the processing proceeds to step S146.

In step S146, the encoding scheme selecting unit 516 selects an encoding scheme B that applies the assignment method described above with reference to FIG. 21. That is, in this case, as shown in FIG. 21, one sub-CPU core 442 is assigned to all of the processes in the encoding unit 14. Further, the intermediate calculation buffer unit 52 is formed in the LS 451, and the coefficient rearranging buffer unit 53 is formed in the XDR-RAM 403 that is a shared memory. When the process of step S146 is finished, the encoding scheme selecting process is finished, the processing returns to step S106 in FIG. 41, and the processing proceeds to step S107.

If it is determined in step S145 in FIG. 43 that the priority is not on throughput, the processing proceeds to step S147. In step S147, the encoding scheme selecting unit 516 determines whether or not the number of currently available sub-CPU cores 442 is one, on the basis of resource information acquired by the resource information acquiring unit 512. If it is determined to be one, the processing returns to step S146. Further, if it is determined in step S147 that a plurality of available sub-CPU cores 442 exist, the processing proceeds to step S148. In step S148, the encoding scheme selecting unit 516 determines whether or not the number of currently available sub-CPU cores 442 is two, on the basis of the resource information acquired by the resource information acquiring unit 512. If it is determined to be two, the processing proceeds to step S149.

In step S149, the encoding scheme selecting unit 516 selects an encoding scheme C that applies the assignment method described above with reference to FIG. 22. That is, in this case, as shown in FIG. 22, with two sub-CPU cores 442 as a set, one sub-CPU core 442 is assigned to all of the processes in the encoding unit 14 that encodes image data Y, and the other sub-CPU core 442 is assigned to all of the processes of the encoding unit 14 that encodes image data C. Further, the intermediate calculation buffer unit 52-1 used in the wavelet transform on the image data Y is formed in the LS 451 of the sub-CPU core 442 that encodes the image data Y, and the intermediate calculation buffer unit 52-2 used in the wavelet transform on the image data C is formed in the LS 451 of the sub-CPU core 442 that encodes the image data C. Further, the coefficient rearranging buffer unit 53-1 that holds coefficient data generated from the image data Y, and the coefficient rearranging buffer unit 53-2 that holds coefficient data generated from the image data C are both formed in the XDR-RAM 403 that is a shared memory. When the process of step S149 is finished, the encoding scheme selecting process is finished, the processing returns to step S106 in FIG. 41, and the processing proceeds to step S107.

If it is determined in step S141 in FIG. 43 that the available capacity of the LS 451 is not sufficient as the intermediate calculation buffer unit 52 for two components, the processing proceeds to step S150. In step S150, on the basis of the intermediate calculation buffer usage computed by the intermediate-calculation-buffer-usage computing unit 514, and the available capacity of the LS 451 confirmed by the resource information acquiring unit 512, the encoding scheme selecting unit 516 determines whether or not the available capacity of the LS 451 is a sufficient capacity as the intermediate calculation buffer unit 52 for one component. That is, the encoding scheme selecting unit 516 determines whether or not the available capacity of the LS 451 is equal to or larger than the intermediate calculation buffer usage of each component. If it is determined to be sufficient, the processing proceeds to step S151.

In step S151, the encoding scheme selecting unit 516 determines whether or not the number of currently available sub-CPU cores 442 is one, on the basis of resource information acquired by the resource information acquiring unit 512. If it is determined that a plurality of available sub-CPU cores 442 exist, the processing proceeds to step S152. In step S152, the encoding scheme selecting unit 516 determines whether or not the number of currently available sub-CPU cores 442 is two, on the basis of the resource information acquired by the resource information acquiring unit 512. If it is determined to be two, the processing returns to step S149.

If it is determined in step S152 that the number of currently available sub-CPU cores 442 is three or more, the processing proceeds to step S153. In step S153, the encoding scheme selecting unit 516 determines on the basis of the encoding parameter 531 whether or not the priority is on throughput. If it is determined that the priority is on throughput, the processing returns to step S149.

Further, if it is determined in step S153 that the priority is not on throughput, the processing proceeds to step S154. Further, if it is determined in step S148 that the number of currently available sub-CPU cores 442 is three or more, the processing proceeds to step S154.

In step S154, the encoding scheme selecting unit 516 selects an encoding scheme D that applies the assignment method described above with reference to FIG. 24. That is, in this case, as shown in FIG. 24, with four sub-CPU cores 442 as a set, mutually different sub-CPU cores 442 are assigned to the process of the wavelet transform unit 51-1 of the encoding unit 14 that encodes the image data Y, the process of the coefficient rearranging unit 54-1 and entropy encoding unit 55-1 of the encoding unit 14 that encodes the image data Y, the process of the wavelet transform unit 51-2 of the encoding unit 14 that encodes the image data C, and the respective processes of the coefficient rearranging unit 54-2 and entropy encoding unit 55-2 of the encoding unit 14 that encodes the image data C.

Further, the intermediate calculation buffer unit 52-1 of the encoding unit 14 that encodes the image data Y is formed in the LS 451 of the sub-CPU core 442 to which the process of the wavelet transform unit 51-1 is assigned, and the intermediate calculation buffer unit 52-2 of the encoding unit 14 that encodes the image data C is formed in the LS 451 of the sub-CPU core 442 to which the process of the wavelet transform unit 51-2 is assigned.

Further, the coefficient rearranging buffer unit 53-1 of the encoding unit 14 that encodes the image data Y, and the coefficient rearranging buffer unit 53-2 of the encoding unit 14 that encodes the image data C are both formed in the XDR-RAM 403 that is a shared memory. When the process of step S154 is finished, the encoding scheme selecting process is finished, the processing returns to step S106 in FIG. 41, and the processing proceeds to step S107.

If it is determined in step S150 in FIG. 43 that the available capacity of the LS 451 is not sufficient as the intermediate calculation buffer unit 52 for one component, the processing proceeds to step S155. Further, if it is determined in step S151 that the number of currently available sub-CPU cores is one, the processing proceeds to step S155. In this case, since any of the four encoding schemes prepared in advance cannot be selected (cannot be implemented), in step S155, the encoding scheme selecting unit 516 performs error processing such as, for example, providing notification to the user. When the process of step S155 is finished, the encoding scheme selecting process is finished, the processing returns to step S106 in FIG. 41, and the processing proceeds to step S107.

As described above, the encoding selection control unit 502 can appropriately perform assignment of hardware resources so that the encoding unit 14 can operate more efficiently under the actual conditions, on the basis of the size information of the image data 541, resource information, an encoding parameter, and the like.

Incidentally, this assignment may be performed in whatever units. For example, the assignment may be performed precinct by precinct, or may be performed picture by picture. Further, while it has been described above that four assignment methods are prepared in advance, and the encoding scheme selecting unit 516 selects one from them, there may be prepared any number of assignment methods of hardware resources. That is, the number of the encoding programs 543 is arbitrary. Furthermore, the assignment method of hardware resources is arbitrary, and may be a method other than the four assignment methods described above.

Further, by using an arbitrary sub-CPU core 442 among the eight sub-CPU core 442-1 through sub-CPU core 442-8, the above-described encoding scheme A through encoding scheme D may be used in combination (operated in a parallel fashion). That is, for example, the encoding selection control unit 502 can adopt mutually different encoding schemes for individual precincts or individual pictures, and change the way of assigning hardware resources. In this way, the encoding selection control unit 502 can assign hardware resources to individual processes in the encoding unit 14 in such a way as to use the hardware resources more effectively, thus allowing the encoding unit 14 to operate more efficiently.

Next, referring to the flowchart in FIG. 44, an example of the flow of a decoding selection control process executed by the decoding selection control unit 503 will be described. The decoding selection control process is a process that is executed for selecting one from among a plurality of decoding programs 544 that differ from each other in the way in which the sub-CPU core 442-1 through sub-CPU core 442-8 are assigned, at the time of performing decoding processing. For example, when instructed to execute decoding processing by the user, the decoding selection control unit 503 starts a decoding selection control process.

When a decoding selection control process is started, in step S201, the size information acquiring unit 521 acquires size information with respect to the encoded data 542 as a processing target held in the XDR-RAM 403. In step S202, the resource information acquiring unit 522 acquires resource information as information related to available hardware resources, via the OS 501.

In step S203, the coefficient-buffer-usage computing unit 523 computes a coefficient buffer usage indicating a capacity required for the coefficient buffer unit 62, by using the wavelet-transform relationship table 533 or the like.

In step S204, the decoding scheme selecting unit 524 selects a decoding scheme on the basis of various information, such as size information, resource information, the computed coefficient buffer usage, and the like. The details of the decoding scheme selecting process will be described later.

When a decoding scheme is selected, in step S205, the assigning unit 525 assigns the sub-CPU core 442-1 through sub-CPU core 442-8 to individual processes, in accordance with the assignment method of the selected decoding program 544.

When the process of step S205 is finished, the encoding selection control process is terminated.

Next, an example of the flow of the decoding scheme selecting process executed in step S204 in FIG. 44 will be described with reference to the flowchart in FIG. 45.

In step S221, on the basis of the coefficient buffer usage computed by the coefficient-buffer-usage computing unit 523, and the available capacity of the LS 451 confirmed by the resource information acquiring unit 512, the decoding scheme selecting unit 524 determines whether or not the available capacity of the LS 451 is a sufficient capacity as the coefficient buffer unit 62. That is, the decoding scheme selecting unit 524 determines whether or not the available capacity of the LS 451 is equal to or larger than the coefficient buffer usage of each component. If it is determined to be sufficient, the processing proceeds to step S222.

In step S222, the decoding scheme selecting unit 524 determines, on the basis of the decoding parameter 532, whether or not the priority is on throughput in the decoding processing. If it is determined that the priority is on throughput, the processing proceeds to step S223.

In step S223, on the basis of the coefficient buffer usage computed by the coefficient-buffer-usage computing unit 523, and the available capacity of the LS 451 confirmed by the resource information acquiring unit 512, the decoding scheme selecting unit 524 determines whether or not the available capacity of the LS 451 is a sufficient capacity as the coefficient buffer unit 62 for two components. That is, the decoding scheme selecting unit 524 determines whether or not the available capacity of the LS 451 is equal to or larger than the sum of the respective coefficient buffer usages of the two components. If it is determined to be sufficient, the processing proceeds to step S224.

In step S224, the decoding scheme selecting unit 524 selects a decoding scheme A that applies the assignment method described above with reference to FIG. 26. That is, in this case, as shown in FIG. 26, one sub-CPU core 442 is assigned to all of the processes in the decoding unit 36. Further, the coefficient buffer unit 62 is formed in the LS 451. When the process of step S224 is finished, the decoding scheme selecting process is finished, the processing returns to step S204 in FIG. 44, and the processing proceeds to step S205.

Figure 45:
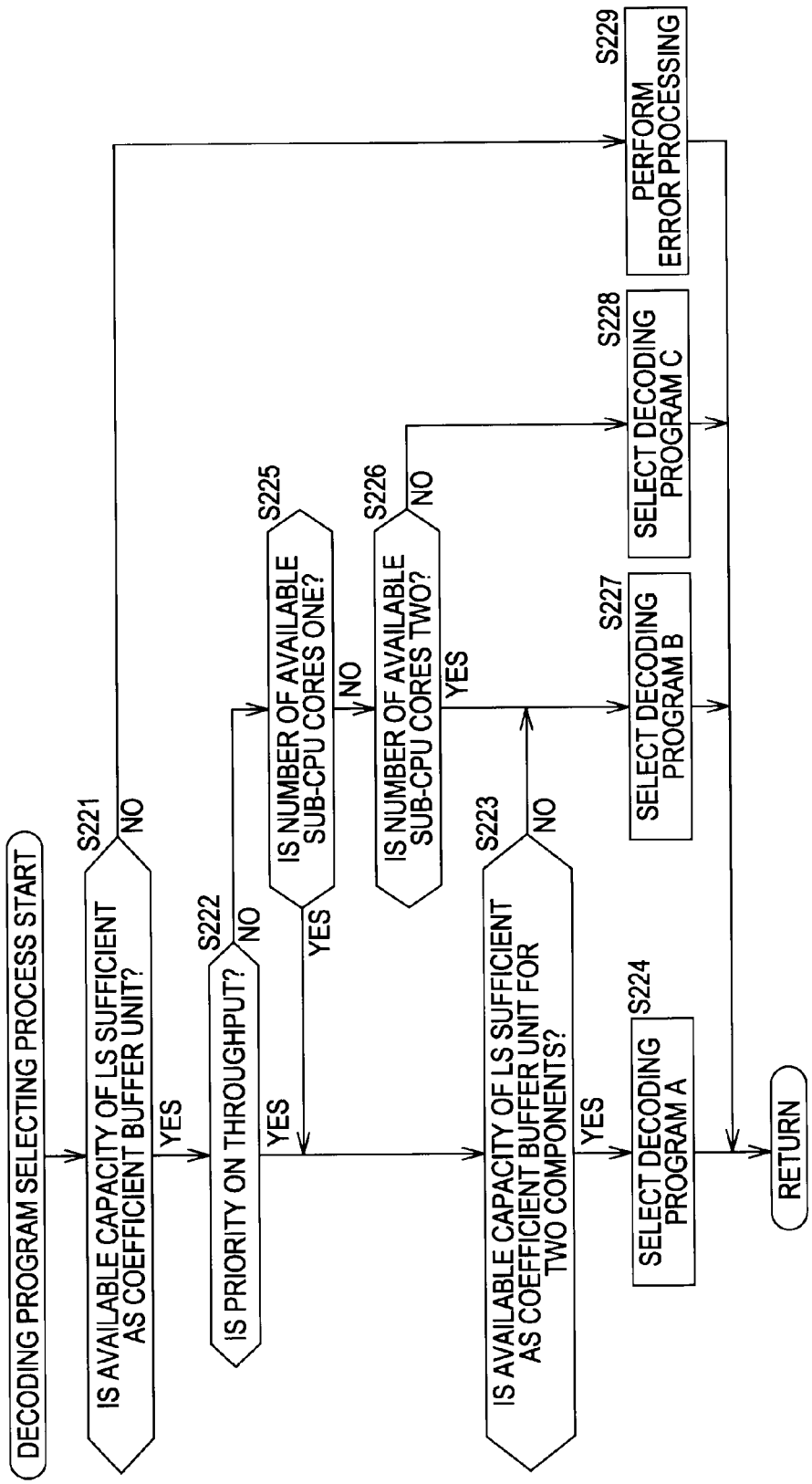
FIG. 45 is a flowchart illustrating an example of the flow of a decoding scheme selecting process.

If it is determined in step S222 in FIG. 45 that the priority is not on throughput in the decoding processing, the processing proceeds to step S225. In step S225, the decoding scheme selecting unit 524 determines whether or not the number of currently available sub-CPU cores 442 is one, on the basis of the resource information acquired by the resource information acquiring unit 522. If it is determined to be one, the processing returns to step S223, and subsequent processing is repeated. Further, if it is determined in step S225 that a plurality of available sub-CPU cores 442 exist, the processing proceeds to step S226.

In step S226, the decoding scheme selecting unit 524 determines whether or not the number of currently available sub-CPU cores 442 is two, on the basis of the resource information acquired by the resource information acquiring unit 522. If it is determined to be two, the processing returns to step S227. Further, if it is determined in step S223 that the available capacity of the LS 451 is not sufficient as the coefficient buffer unit 62 for two components, the processing proceeds to step S227.

In step S227, the decoding scheme selecting unit 524 selects a decoding scheme B that applies the assignment method described above with reference to FIG. 28. That is, in this case, as shown in FIG. 28, with two sub-CPU cores 442 as a set, one sub-CPU core 442 is assigned to all of the processes in the decoding unit 36 that decodes encoded data Y, and the other sub-CPU core 442 is assigned to all of the processes in the decoding unit 36 that decodes encoded data C. Further, the coefficient buffer unit 62-1 of the decoding unit 36 that decodes the encoded data Y is formed in the LS 451 of the sub-CPU core 442 to which the decoding unit 36 that decodes the encoded data Y is assigned, and the coefficient buffer unit 62-2 of the decoding unit 36 that decodes the encoded data C is formed in the LS 451 of the sub-CPU core 442 to which the decoding unit 36 that decodes the encoded data C is assigned. When the process of step S227 is finished, the decoding scheme selecting process is finished, the processing returns to step S204 in FIG. 44, and the processing proceeds to step S205.

If it is determined in step S226 in FIG. 45 that the number of currently available sub-CPU cores 442 is three or more, the processing proceeds to step S228.

In step S228, the decoding scheme selecting unit 524 selects a decoding scheme C that applies the assignment method described above with reference to FIG. 30. That is, in this case, as shown in FIG. 30, with four sub-CPU cores 442 as a set, mutually different sub-CPU cores 442 are assigned to the process of the entropy decoding unit 61-1 of the decoding unit 36 that decodes the encoded data Y, the process of the inverse wavelet transform unit 63-1 of the decoding unit 36 that decodes the encoded data Y, the process of the entropy decoding unit 61-2 of the decoding unit 36 that decodes the encoded data C, and the process of the inverse wavelet transform unit 63-2 of the decoding unit 36 that decodes the encoded data C.

Further, the coefficient buffer unit 62-1 of the decoding unit 36 that decodes the encoded data Y is formed in the LS 451 of the sub-CPU core 442 to which the process of the inverse wavelet transform unit 63-1 is assigned, and the coefficient buffer unit 62-2 of the decoding unit 36 that decodes the encoded data C is formed in the LS 451 of the sub-CPU core 442 to which the process of the inverse wavelet transform unit 63-2 is assigned.

Figure 44:
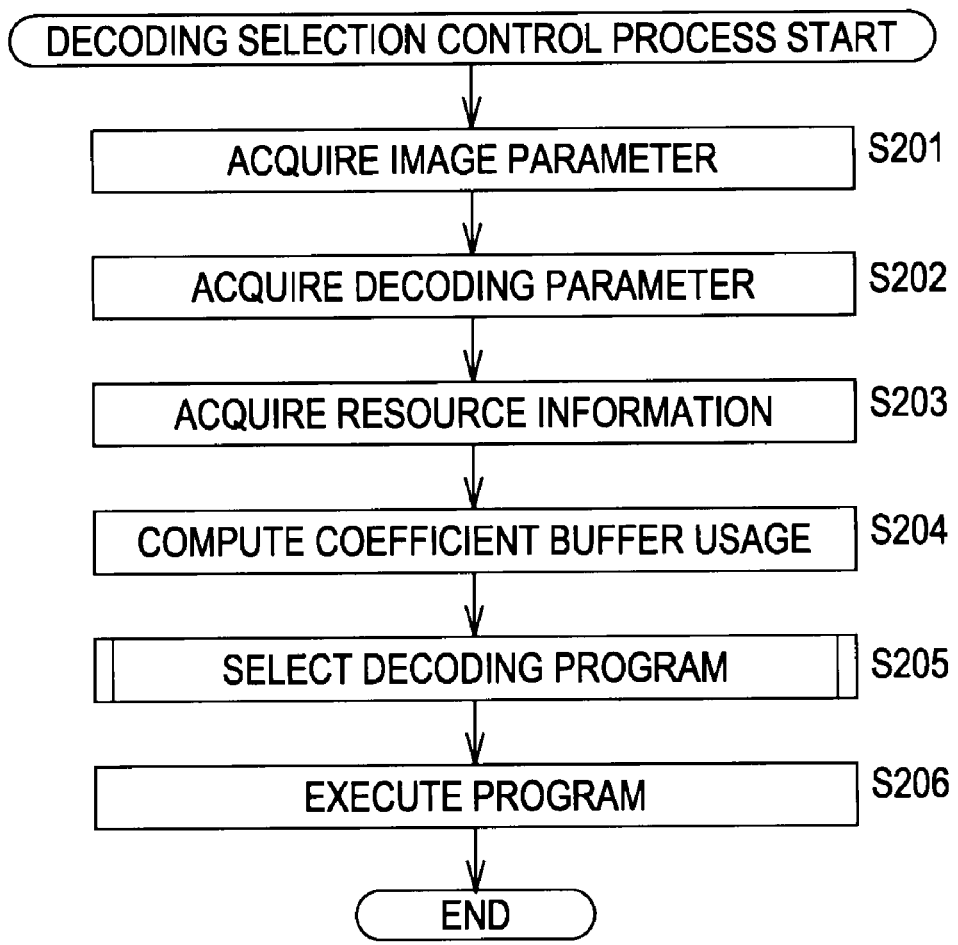
FIG. 44 is a flowchart illustrating an example of the flow of a decoding selection control process.

When the process of step S228 is finished, the decoding scheme selecting process is finished, the processing returns to step S204 in FIG. 44, and the processing proceeds to step S205.

If it is determined in step S221 in FIG. 45 that the available capacity of the LS 451 is not sufficient as the coefficient buffer unit 62, the processing proceeds to step S229. In this case, since any of the three decoding schemes prepared in advance cannot be selected (cannot be implemented), in step S229, the decoding scheme selecting unit 524 performs error processing such as, for example, providing notification to the user. When the process of step S229 is finished, the encoding scheme selecting process is finished, the processing returns to step S204 in FIG. 44, and the processing proceeds to step S205.

As described above, the decoding selection control unit 503 can appropriately perform assignment of hardware resources so that the decoding unit 36 can operate more efficiently under the actual conditions, on the basis of the size information of the encoded data 542, resource information, or the decoding parameter 532 or the like.

Incidentally, this assignment may be performed in whatever units. For example, the assignment may be performed precinct by precinct, or may be performed picture by picture.

Further, while it has been described above that four assignment methods are prepared in advance, and the decoding scheme selecting unit 524 selects one from them, there may be prepared any number of assignment methods of hardware resources. That is, the number of the decoding programs 544 is arbitrary. Furthermore, the assignment method of hardware resources is arbitrary, and may be a method other than the four assignment methods described above.

Further, by using an arbitrary sub-CPU core 442 among the eight sub-CPU core 442-1 through sub-CPU core 442-8, the above-described decoding scheme A through decoding scheme C may be used in combination (operated in a parallel fashion). That is, for example, the decoding selection control unit 503 can adopt mutually different decoding schemes for individual precincts or individual pictures, and change the way of assigning hardware resources. In this way, the decoding selection control unit 503 can assign hardware resources to respective processes of the decoding unit 36 in such a way as to use the hardware resources more effectively, thus allowing the decoding unit 36 to operate more efficiently.

Next, a specific example of assignment will be described.

As a first example, it is assumed that the image data 541 to be encoded is such that its image size is 1920 pixels×1080 pixels, its data configuration is component Y/C made up of a luminance component Y and a chrominance component C, and its bit depth is 12 bits, and that the filter used for a wavelet transform is a 5×3 filter, the decomposition level of the wavelet transform is 4, and a setting to give priority to precision has not been made. Further, it is assumed that the number of currently available sub-CPU cores 442 is four or more, and the capacity of the LS 451 of each sub-CPU core 442 is 256 [kByte].

Furthermore, for the encoding parameter 531, irreversible encoding and latency-priority are set as encoding conditions. Further, for the decoding parameter 532, latency-priority is set as a decoding condition.

In such a case, the computational precision selecting unit 513 performs the computational precision selecting process as in the flowchart shown in FIG. 42, and selects a 16-bit fixed-point type on the basis of the conditions of a 5×3 filter, reversible encoding, no precision-priority setting, and a bit depth of 13 or less. Further, by using the wavelet-transform relationship table 533, the intermediate-calculation-buffer-usage computing unit 514 sets "7.5" as the relationship index from the conditions of a 5×3 filter and the number of decompositions being four, and furthermore, computes an intermediate calculation buffer usage by multiplying the horizontal size (1920 pixels) of an input image, the computational precision (16 bits), and the relationship index (7.5).

Further, by using the coefficient-rearranging relationship table 534, the coefficient-rearranging-buffer-usage computing unit 515 sets "42.25" as the relationship index from the conditions of a 5×3 filter and the number of decompositions being four, and furthermore, computes a coefficient rearranging buffer usage by multiplying the horizontal size (1920 pixels) of an input image, the unit size, and the relationship index (42.25).

On the basis of the above computation results, resource information, and the like, the encoding scheme selecting unit 516 performs an encoding scheme selecting process as in the flowchart shown in FIG. 43. Since the available capacity of the LS 451 is sufficient as the intermediate calculation buffer unit 52 for two components but is not sufficient as the intermediate calculation buffer unit 52 and the coefficient rearranging buffer unit 53 for two components, the priority item is latency, and the number of available sub-CPU cores 442 is four, the encoding scheme selecting unit 516 selects the encoding scheme D that performs assignment as shown in FIG. 24.

Through such assignment, the encoding unit 14 can proceed with encoding processing as shown in FIG. 25. That is, through such assignment, the encoding unit 14 can perform encoding processing with low delay.

Incidentally, in a case where the decoding unit 36 is assigned under this condition, the decoding scheme selecting unit 524 performs the decoding scheme selecting process as in the flowchart shown in FIG. 45. Since the available capacity of the LS 451 is sufficient as the coefficient buffer unit 62, the priority item is latency, and the number of available sub-CPU cores 442 is four, the decoding scheme selecting unit 524 selects the decoding scheme C that performs assignment as shown in FIG. 30.

Through such assignment, the decoding unit 36 can proceed with decoding processing as shown in FIG. 31. That is, through such assignment, the decoding unit 36 can perform decoding processing with low delay.

For example, in systems required to perform exchange of data in real time, such as a television conference system, it is required to perform encoding processing or decoding processing with low delay. Even in such a case, the encoding selection control unit 502 and the decoding selection control unit 503 can assign hardware resources appropriately so that the encoding unit 14 and the decoding unit 36 can perform processing with low delay.

As a second example, it is assumed that the image data 541 to be encoded is such that its image size is 1280 pixels×720 pixels, its data configuration is component Y/C made up of a luminance component Y and a chrominance component C, and its bit depth is 12 bits, and that the filter used for a wavelet transform is a 9×7 filter, and the decomposition level of the wavelet transform is 4. Further, it is assumed that the number of currently available sub-CPU cores 442 is four or more, and the capacity of the LS 451 of each sub-CPU core 442 is 256 [kByte].

Furthermore, for the encoding parameter 531, throughput-priority is set as an encoding condition. Further, for the decoding parameter 532, throughput-priority is set as a decoding condition.

In such a case, the computational precision selecting unit 513 performs the computational precision selecting process as in the flowchart shown in FIG. 42, and selects a 32-bit floating-point type on the basis of the condition of a 9×7 filter. Further, by using the wavelet-transform relationship table 533, the intermediate-calculation-buffer-usage computing unit 514 sets "11.25" as the relationship index from the conditions of a 9×7 filter and the number of decompositions being four, and furthermore, computes an intermediate calculation buffer usage by multiplying the horizontal size (1280 pixels) of an input image, the computational precision (32 bits), and the relationship index (11.25).

Further, by using the coefficient-rearranging relationship table 534, the coefficient-rearranging-buffer-usage computing unit 515 sets "94.75" as the relationship index from the conditions of a 9×7 filter and the number of decompositions being four, and furthermore, computes a coefficient rearranging buffer usage by multiplying the horizontal size (1280 pixels) of an input image, the unit size, and the relationship index (94.75).

On the basis of the above computation results, resource information, and the like, the encoding scheme selecting unit 516 performs the encoding scheme selecting process as in the flowchart shown in FIG. 43. Since the available capacity of the LS 451 is sufficient as the intermediate calculation buffer unit 52 for two components but is not sufficient as the intermediate calculation buffer unit 52 and the coefficient rearranging buffer unit 53 for two components, and the priority item is throughput, the encoding scheme selecting unit 516 selects the encoding scheme B that performs assignment as shown in FIG. 21.

Through such assignment, the encoding unit 14 can proceed with encoding processing as shown in FIG. 20. That is, through such assignment, the encoding unit 14 can perform encoding processing with high throughput.

Incidentally, in a case where the decoding unit 36 is assigned under this condition, the decoding scheme selecting unit 524 performs the decoding scheme selecting process as in the flowchart shown in FIG. 45. Since the available capacity of the LS 451 is sufficient as the coefficient buffer unit 62, the priority item is throughput, and the available capacity of the LS 451 is also sufficient as the coefficient buffer unit 62 for two components, the decoding scheme selecting unit 524 selects the decoding scheme A that performs assignment as shown in FIG. 26.

Through such assignment, the decoding unit 36 can proceed with decoding processing as shown in FIG. 27. That is, through such assignment, the decoding unit 36 can perform decoding processing with high throughput.

For example, there are cases where, as in systems that process image data with high frame rate, it is required to perform encoding processing or decoding processing at high speed (high throughput). Even in such a case, the encoding selection control unit 502 and the decoding selection control unit 503 can assign hardware resources appropriately so that the encoding unit 14 and the decoding unit 36 can perform processing with high throughput.

As a third example, it is assumed that the image data 541 to be encoded is such that its image size is 4096 pixels×2160 pixels, its data configuration is component Y/C made up of a luminance component Y and a chrominance component C, and its bit depth is 12 bits, and that the filter used for a wavelet transform is a 9×7 filter, and the decomposition level of the wavelet transform is 4. Further, it is assumed that the number of currently available sub-CPU cores 442 is four or more, and the capacity of the LS 451 of each sub-CPU core 442 is 256 [kByte].

Furthermore, for the encoding parameter 531, throughput-priority is set as an encoding condition. Further, for the decoding parameter 532, throughput-priority is set as a decoding condition.

In such a case, the computational precision selecting unit 513 performs the computational precision selecting process as in the flowchart shown in FIG. 42, and selects a 32-bit floating-point type on the basis of the condition of a 9×7 filter. Further, by using the wavelet-transform relationship table 533, the intermediate-calculation-buffer-usage computing unit 514 sets "11.25" as the relationship index from the conditions of a 9×7 filter and the number of decompositions being four, and furthermore, computes an intermediate calculation buffer usage by multiplying the horizontal size (1280 pixels) of an input image, the computational precision (32 bits), and the relationship index (11.25).

Further, by using the coefficient-rearranging relationship table 534, the coefficient-rearranging-buffer-usage computing unit 515 sets "94.75" as the relationship index from the conditions of a 9×7 filter and the number of decompositions being four, and furthermore, computes a coefficient rearranging buffer usage by multiplying the horizontal size (1280 pixels) of an input image, the unit size, and the relationship index (94.75).

On the basis of the above computation results, resource information, and the like, the encoding scheme selecting unit 516 performs an encoding scheme selecting process as in the flowchart shown in FIG. 43. Since the available capacity of the LS 451 is not sufficient as the intermediate calculation buffer unit 52 for two components but is sufficient as the intermediate calculation buffer unit 52 for one component, the number of available sub-CPU cores 442 is four, and the priority item is throughput, the encoding scheme selecting unit 516 selects the encoding scheme C that performs assignment as shown in FIG. 22.

Through such assignment, the encoding unit 14 can proceed with encoding processing as shown in FIG. 23. That is, through such assignment, the encoding unit 14 can perform encoding processing with higher throughput than in the encoding scheme D, and with lower delay than in the encoding scheme B.

Incidentally, in a case where the decoding unit 36 is assigned under this condition, the decoding scheme selecting unit 524 performs the decoding scheme selecting process as in the flowchart shown in FIG. 45. Since the available capacity of the LS 451 is sufficient as the coefficient buffer unit 62, the priority item is throughput, and furthermore, the available capacity of the LS 451 is not sufficient as the coefficient buffer unit 62 for two components, and the number of available sub-CPU cores 442 is four, the decoding scheme selecting unit 524 selects the decoding scheme B that performs assignment as shown in FIG. 28.

Through such assignment, the decoding unit 36 can proceed with decoding processing as shown in FIG. 29. That is, through such assignment, the decoding unit 36 can perform decoding processing with higher throughput than in the encoding scheme C, and with lower delay than in the encoding scheme A.

For example, there are cases where, as in systems that process image data with high-definition video, although it is required to perform encoding processing or decoding processing at high speed (high throughput), the data amount of image data is large. In such a case, if encoding processing and decoding processing are performed by one sub-CPU core 442 for throughput enhancement, there is a fear that the capacity of the LS 451 may become short, causing an increase in undesired delay. Accordingly, the encoding selection control unit 502 and the decoding selection control unit 503 can assign hardware resources appropriately in such a way that the encoding unit 14 and the decoding unit 36 does not undergo an undesired increase in delay time due to occurrence of a buffer overflow or the like, and that the throughput is enhanced as much as possible.

Figure 46:
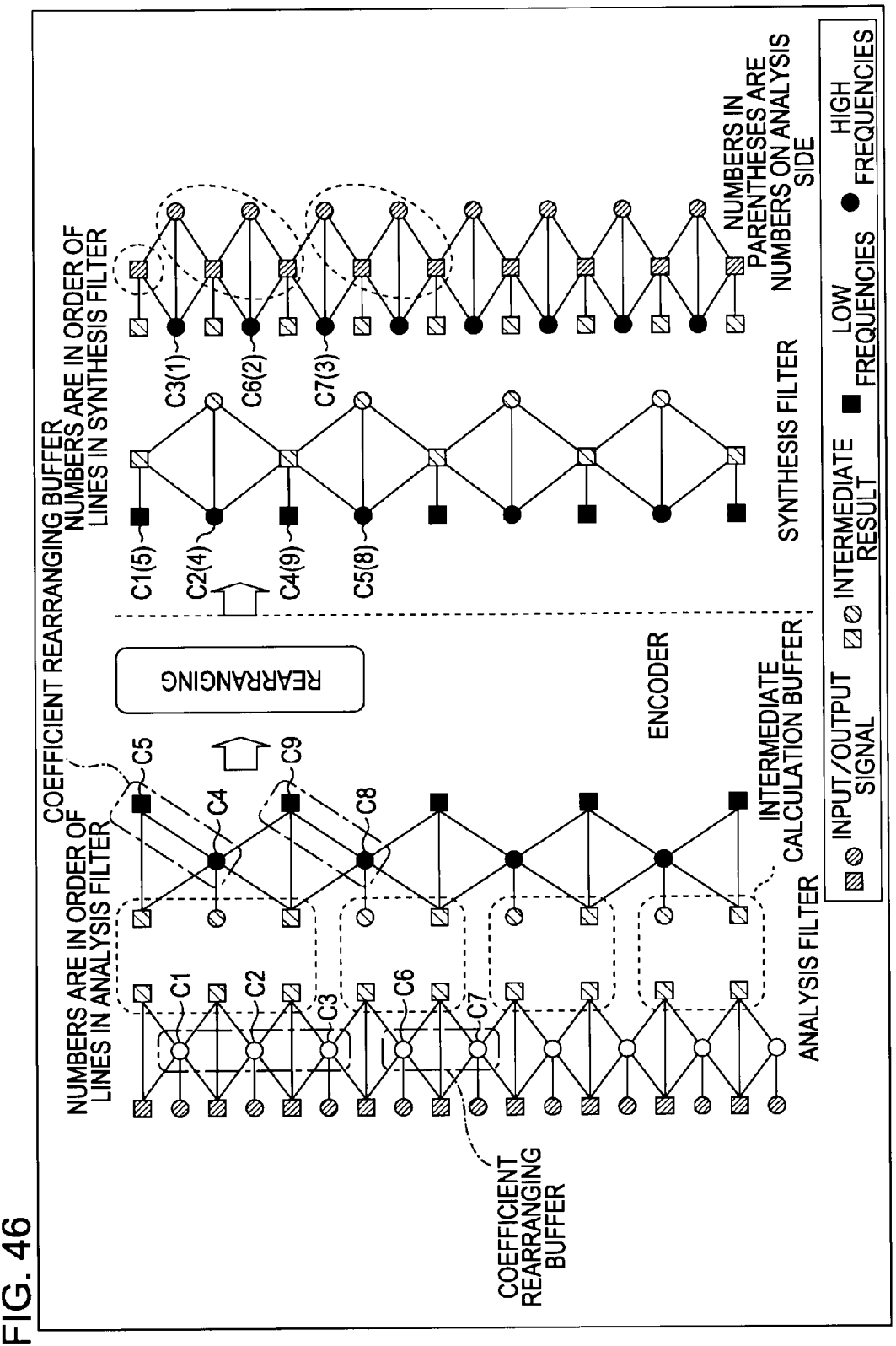
FIG. 46 is a simplified diagram showing an example in which filtering by lifting with a 5×3 filter is executed up to decomposition level=2.
Figure 47:
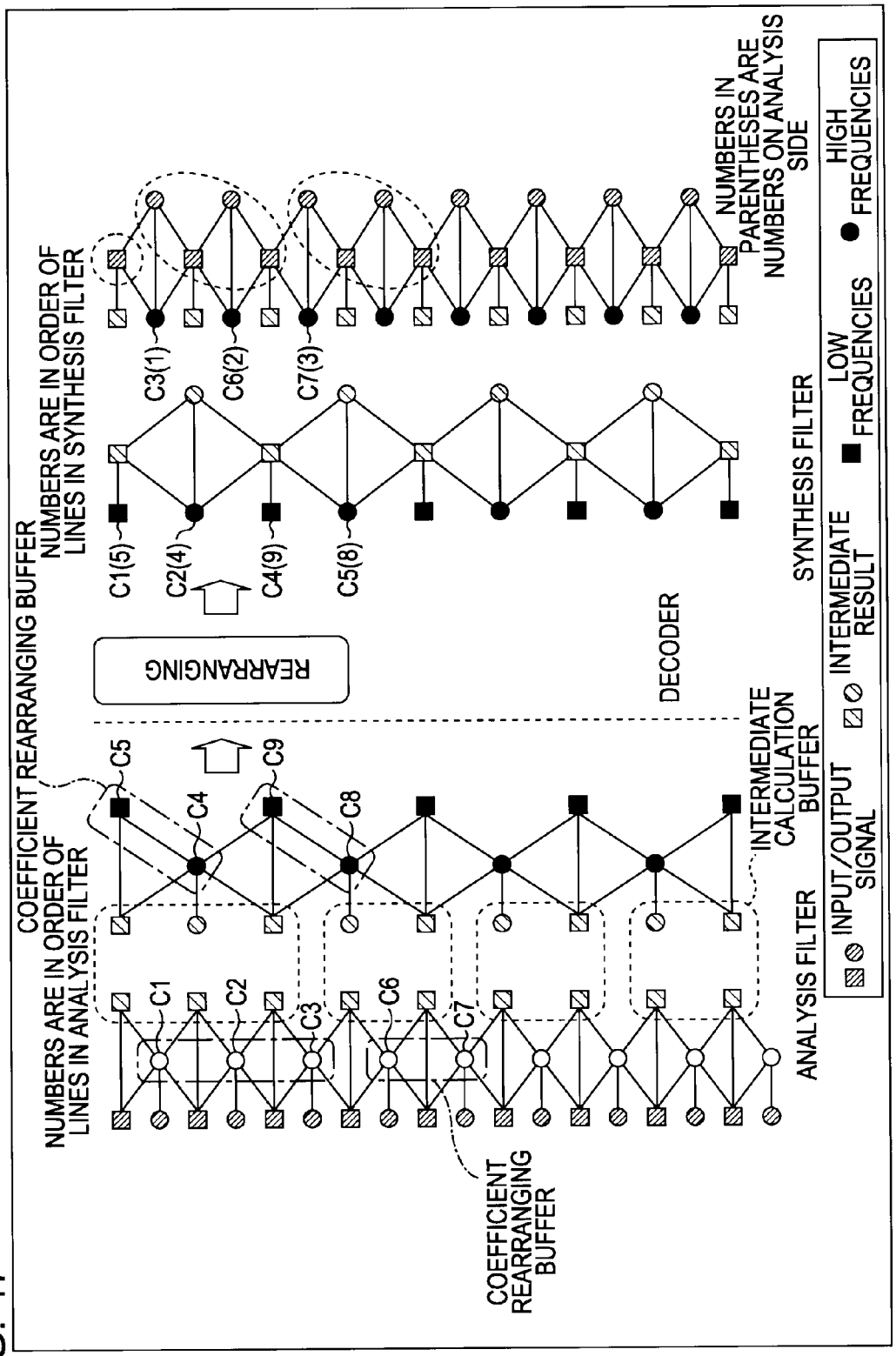
FIG. 47 is a simplified diagram showing an example in which filtering by lifting with a 5×3 filter is executed up to decomposition level=2.

Incidentally, in the encoding unit 14 in FIG. 3 and the decoding unit 36 in FIG. 12, as described above, encoded data is sent to the decoding unit 36 after the process of rearranging wavelet transform coefficients is performed in the encoding unit 14. However, the process of rearranging wavelet transform coefficients may be skipped in the encoding unit 14, and the process of rearranging wavelet transform coefficients may be performed in the decoding unit 36 after sending encoded data to the decoding unit 36. That is, as shown in FIG. 46, it is also possible to send encoded data to the decoding unit 36 after the process of rearranging wavelet transform coefficients is performed in the encoding unit 14 or, as shown in FIG. 47, to perform the process of rearranging wavelet transform coefficients in the decoding unit 36 after encoded data is sent to the decoding unit 36.

Figure 48:
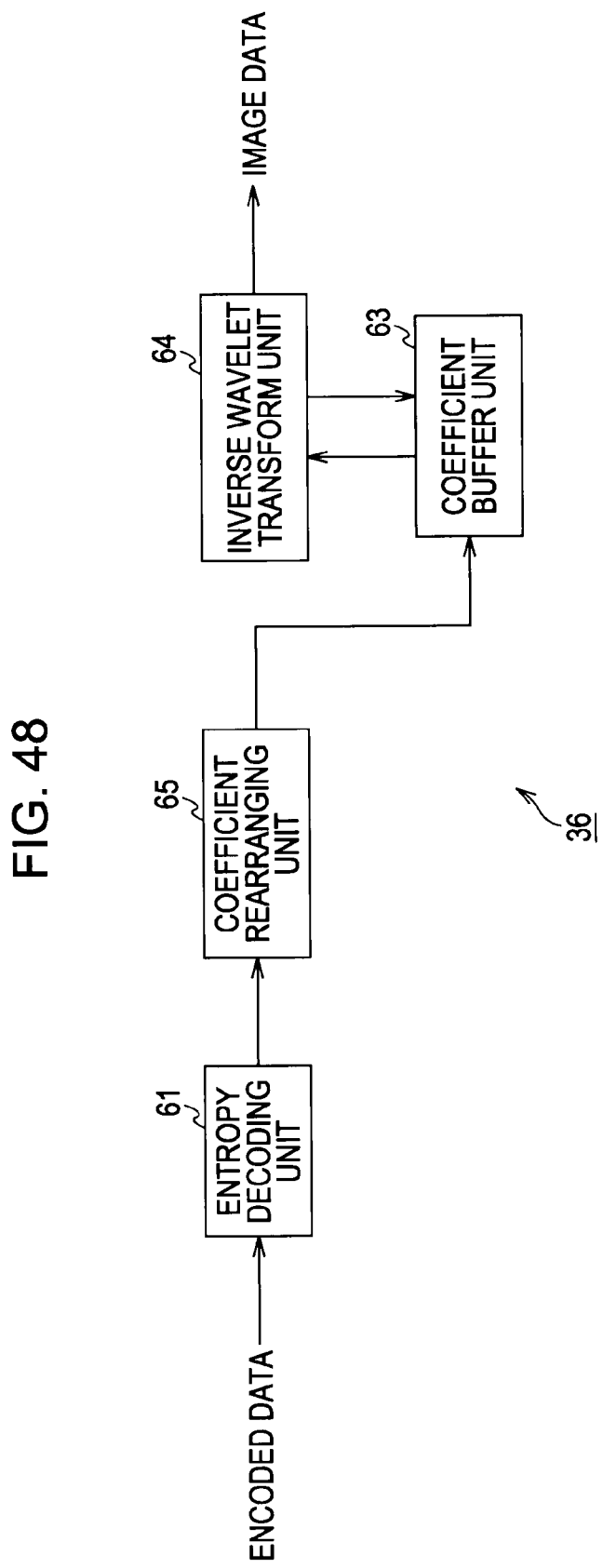
FIG. 48 is a block diagram showing another embodiment of the decoding unit 36.

In this case, as shown in FIG. 48, the decoding unit 36 needs to include the coefficient rearranging unit 65. FIG. 48 is a block diagram showing another embodiment of the decoding unit 36.

In FIG. 48, the decoding unit 36 includes, like the decoding unit 36 in FIG. 12, the entropy decoding unit 61, the coefficient buffer unit 62, and the inverse wavelet transform unit 63, and furthermore, includes the coefficient rearranging unit 65.

The coefficient rearranging unit 65 performs rearranging of wavelet transform coefficients obtained as a result of decoding by the entropy decoding unit 61, that is, the coefficient rearranging unit 65 performs rearranging of wavelet transform coefficients similarly to the coefficient rearranging unit 54 in FIG. 2, and supplies them to the inverse wavelet transform unit 63 to be stored therein.

Which one of the encoding unit 14 and the decoding unit 36 performs rearranging of wavelet transform coefficients can be determined as appropriate in accordance with the resources of the respective devices.

Further, in the encoding unit 14, quantization of wavelet transform coefficients is performed in the entropy encoding unit 55. However, for example, there may be provided a quantization unit that quantizes wavelet transform coefficients outputted by the wavelet transform unit 51, and stores them into the coefficient rearranging buffer unit 53.

Figure 49:
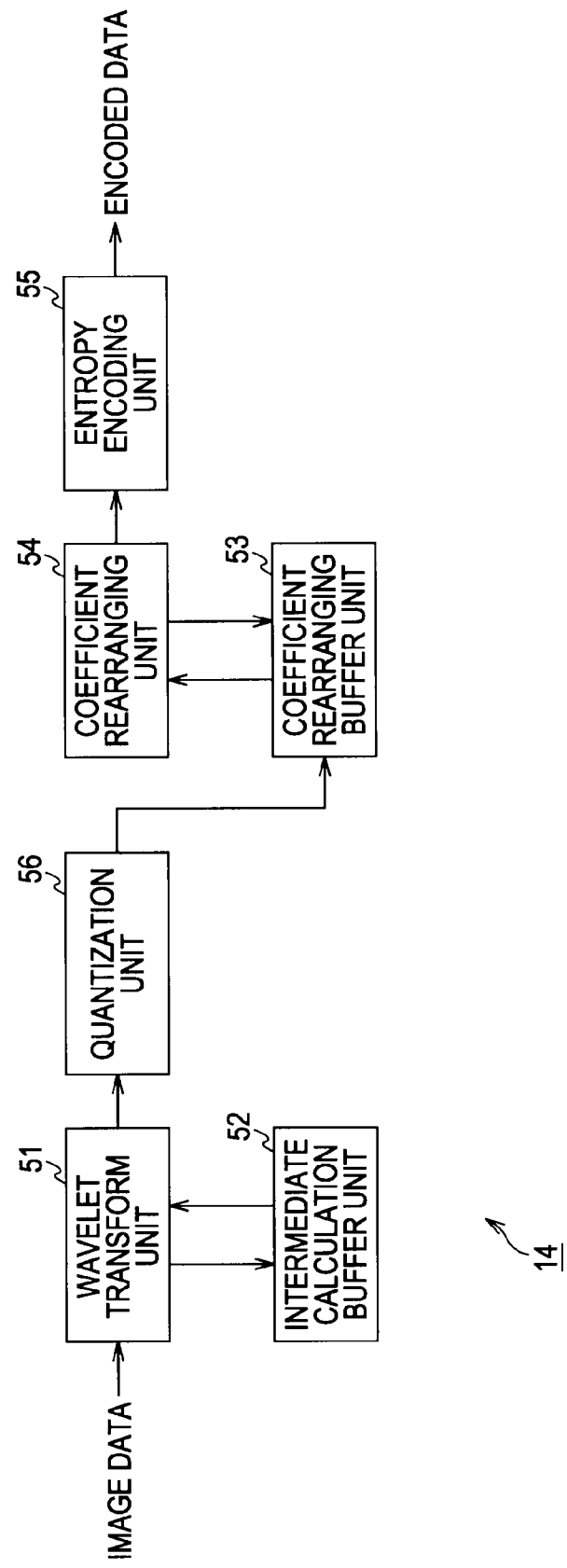
FIG. 49 is a block diagram showing still another embodiment of the encoding unit 14.

FIG. 49 is a block diagram showing still another embodiment of the encoding unit 14.

In FIG. 49, the encoding unit 14 includes a quantization unit 56, and the other blocks that constitute the encoding unit 14 are the same as those of the encoding unit 14 in FIG. 3.

The quantization unit 56 quantizes wavelet transform coefficients outputted by the wavelet transform unit 51, and stores them into the coefficient rearranging buffer unit 53. In this way, by providing the quantization unit 56 separately from the entropy encoding unit 55, assignment of predetermined CPUs or memories can be performed in such a way that various processes are performed more optimally, or the delay time becomes less.

Incidentally, the quantization unit 56 may be provided in the coefficient rearranging unit 54 and the entropy encoding unit 55. In this case, wavelet transform coefficients outputted by the coefficient rearranging unit 54 are quantized, and supplied to the entropy encoding unit 55.

Figure 50:
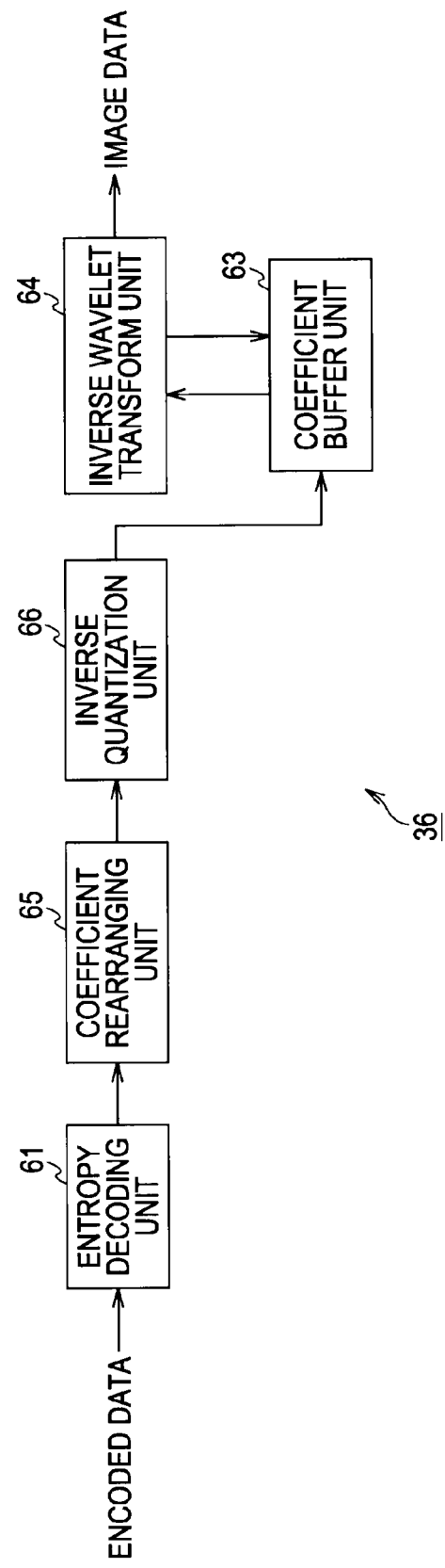
FIG. 50 is a block diagram showing still another embodiment of the decoding unit 36.

Next, FIG. 50 is a block diagram showing still another embodiment of the decoding unit 36.

In FIG. 50, the decoding unit 36 includes an inverse quantization unit 66, and the other blocks that constitute the decoding unit 36 are the same as those of the decoding unit 36 in FIG. 48.

The inverse quantization unit 66 quantizes wavelet transform coefficients outputted by the coefficient rearranging unit 65, and supplies them to the inverse wavelet transform unit 63. By providing the inverse quantization unit 66, as in the case where the quantization unit 56 is provided, assignment of predetermined CPUs or memories can be performed in such a way that various processes are performed more optimally, or the delay time becomes less.

Incidentally, the inverse quantization unit 66 may be provided between the entropy decoding unit 61 and the coefficient buffer unit 62. In this case, the inverse quantization unit 66 performs inverse quantization of coefficient data outputted by the entropy decoding unit 61, and stores it into the coefficient buffer unit 62.

The above-described series of processes can either be executed by hardware, or be executed by software.

For example, as shown in FIG. 19, the encoding unit 14 may be configured by one processing unit that performs the respective processes of the wavelet transform unit 51, coefficient rearranging unit 54, and entropy encoding unit 55, and one storage unit in which the intermediate calculation buffer unit 52 and the coefficient rearranging buffer unit 53 are formed.

Similarly, as shown in FIG. 21, the encoding unit 14 may be configured by one processing unit that performs the respective processes of the wavelet transform unit 51, coefficient rearranging unit 54, and entropy encoding unit 55, a first storage unit in which the intermediate calculation buffer unit 52 is formed and which allows reading and writing at high speed, and a second storage unit with a large capacity in which the coefficient rearranging buffer unit 53 is formed.

Further, similarly, as shown in FIG. 22, the encoding unit 14 may be configured by a first processing unit that performs the respective processes of the wavelet transform unit 51-1, coefficient rearranging unit 54-1, and entropy encoding unit 55-1, a first storage unit in which the intermediate calculation buffer unit 52-1 is formed and which allows reading and writing at high speed, a second processing unit that performs the respective processes of the wavelet transform unit 51-2, coefficient rearranging unit 54-2, and entropy encoding unit 55-2, a second storage unit in which the intermediate calculation buffer unit 52-2 is formed and which allows reading and writing at high speed, and a third storage unit with a large capacity in which the coefficient rearranging buffer unit 53-1 and the coefficient rearranging buffer unit 53-2 are formed.

Further, similarly, as shown in FIG. 24, the encoding unit 14 may be configured by a first processing unit that performs the process of the wavelet transform unit 51-1, a first storage unit in which the intermediate calculation buffer unit 52-1 is formed and which allows reading and writing at high speed, a second processing unit that performs the respective processes of the coefficient rearranging unit 54-1 and entropy encoding unit 55-1, a third processing unit that performs the process of the wavelet transform unit 51-2, a second storage unit in which the intermediate calculation buffer unit 52-2 is formed and which allows reading and writing at high speed, a fourth processing unit that performs the respective processes of the coefficient rearranging unit 54-2 and entropy encoding unit 55-2, and a third storage unit with a large capacity in which the coefficient rearranging buffer unit 53-1 and the coefficient rearranging buffer unit 53-2 are formed.

Similarly, as shown in FIG. 26, the decoding unit 36 may be configured by one processing unit that performs the respective processes of the entropy decoding unit 61 and inverse wavelet transform unit 63, and a storage unit in which the coefficient buffer unit 62 is formed.

Further, similarly, as shown in FIG. 28, the decoding unit 36 may be configured by a first processing unit that performs the respective processes of the entropy decoding unit 61-1 and inverse wavelet transform unit 63-1, a first storage unit in which the coefficient buffer unit 62-1 is formed, a second processing unit that performs the respective processes of the entropy decoding unit 61-2 and inverse wavelet transform unit 63-2, and a second storage unit in which the coefficient buffer unit 62-2 is formed.

Furthermore, similarly, as shown in FIG. 30, the decoding unit 36 may be configured by a first processing unit that performs the process of the entropy decoding unit 61-1, a second processing unit that performs the process of the inverse wavelet transform unit 63-1, a first storage unit in which the coefficient buffer unit 62-1 is formed, a third processing unit that performs the process of the entropy decoding unit 61-2, a fourth processing unit that performs the process of the inverse wavelet transform unit 63-2, and a second storage unit in which the coefficient buffer unit 62-2 is formed.

In a case where the encoding unit 14 or the decoding unit 36 is configured by hardware in this way, the same effect as that in a case where a software program is assigned to hardware as described above can be obtained.

In a case where the series of processes is to be executed by software, a program that constitutes the software is installed from a program recording medium into a computer embedded in dedicated harder, or, for example, a general-purpose computer that can execute various features when installed with various programs, or an information processing device of an information processing system made up of a plurality of devices, or the like.

As shown in, for example, FIG. 18 or FIG. 36, this recording medium is configured not only by the removable medium 131 or the removable medium 311 such as a magnetic disk (including a flexible disk), an optical disk (including a CD-ROM (Compact Disk-Read Only Memory) or a DVD (Digital Versatile Disk)), a magneto-optical disk (including an MD (Mini-Disk) (registered trademark)), or a semiconductor memory, in which a program is stored and which is delivered to distribute the program to the user, separately from the device main body, but also configured by the ROM 102, a hard disk included in the storage unit 123 or the storage device 303, or the HDD 405 or the like, in which a program is recorded and which is distributed to the user in a state embedded in the device main body in advance.

Incidentally, in this specification, steps describing a program recorded on a recording medium include, of course, processes that are performed time sequentially in the described order, but also processes that are not necessarily processed time sequentially but executed in a parallel fashion or independently.

Further, in this specification, a system represents the entire device configured by a plurality of devices.

Incidentally, a component described as one device in the above may be divided and configured as a plurality of devices. Conversely, components described as a plurality of devices in the above may be combined and configured as one device. Further, configurations other than those described above may of course be added to the configurations of individual devices. Furthermore, as long as the configuration or operation of the system as a whole is substantially the same, a part of the configuration of a given device may be included in the configuration of another device.

That is, embodiments of the present invention are not limited to the above-described embodiments, and various modifications are possible without departing from the scope of the present invention.

The invention claimed is:

1. An encoding device that performs encoding processing of image data to generate an encoded stream, comprising:
    identifying information generating means for generating shared-process identifying information that identifies by which of the encoding processing and decoding processing a process shared between the encoding processing of the image data and the decoding processing of the encoded stream is to be performed, or program identifying information that identifies which decoding program is to be selected from among a plurality of decoding programs that differ from each other in an assignment pattern in which a plurality of processes that constitute the decoding processing are assigned to a plurality of processing units or in an arrangement pattern of memories used by the plurality of processes;
    encoding means for performing the encoding processing of the image data to generate the encoded stream; and
    transmitting means for transmitting the shared-process identifying information or the program selection information generated by the identifying information generating means, together with the encoded stream generated by the encoding means.

2. The encoding device according to claim 1, wherein the transmitting means inserts the shared-process identifying information or the program selection information generated by the identifying information generating means, into the encoded stream.

3. The encoding device according to claim 2, wherein the transmitting means inserts the shared-process identifying information or the program selection information generated by the identifying information generating means, into a header of the encoded stream.

4. The encoding device according to claim 3, wherein the transmitting means inserts the shared-process identifying information or the program selection information generated by the identifying information generating means, into a sequence header or a picture header that is inserted into the header of the encoded stream.

5. The encoding device according to claim 1, wherein the transmitting means records the shared-process identifying information or the program selection information generated by the identifying information generating means, and the encoded stream onto a recording medium.

6. The encoding device according to claim 1, wherein a plurality of processes that constitute the encoding processing include:
    a filtering process of performing, with respect to the image data, a filtering process for each precinct including image data equivalent to a number of lines necessary for generating coefficient data equivalent to at least one line of a subband of lowest-frequency components, and generating a plurality of subbands made up of coefficient data decomposed for each frequency band;
    a storing process of storing for each precinct the coefficient data generated by the filtering process;
    a coefficient rearranging process of rearranging the coefficient data stored by the storing process, in an order of executing a synthesis process in which a plurality of subbands of coefficient data decomposed into frequency bands are synthesized to generate image data; and
    an encoding process of encoding the coefficient data rearranged by the coefficient rearranging process.

7. The encoding device according to claim 6, wherein:
    the identifying information generating means generates shared-process identifying information indicating that the coefficient rearranging process has been performed on an encoding device side; and
    the transmitting means transmits the shared-process identifying information generated by the identifying information generating means, together with the encoded stream.

8. The encoding device according to claim 6, wherein:
    the identifying information generating means generates control identifying information indicating which of a low-delay priority control that gives priority to performing encoding with low delay, and a throughput-priority control that gives priority to performing encoding with high throughput is selected as a control method for the encoding processing; and
    the transmitting means transmits the control identifying information generated by the identifying information generating means, together with the encoded stream.

9. The encoding device according to claim 6, wherein:
the identifying information generating means generates filter information that identifies a filter used in the filtering process means; and
the transmitting means transmits the filter information generated by the identifying information generating means, together with the encoded stream.

10. The encoding device according to claim 9, wherein:
the identifying information generating means generates filtering-process-precision information indicating whether a precision of the filtering process is a fixed-point precision, a floating-point precision, or an integer precision; and
the transmitting means transmits the filtering-process-precision information generated by the identifying information generating means, together with the encoded stream.

11. The encoding device according to claim 1,
wherein a plurality of processes that constitute the encoding processing include:
a filtering process of performing, with respect to the image data, a filtering process for each precinct including image data equivalent to a number of lines necessary for generating coefficient data equivalent to at least one line of a subband of lowest-frequency components, and generating a plurality of subbands made up of coefficient data decomposed for each frequency band;
a storing process of storing for each precinct the coefficient data generated by the filtering process; and
an encoding process of encoding the coefficient data stored by the storing means.

12. The encoding device according to claim 11,
wherein the identifying information generating means generates, as the shared-process identifying information, information indicating that a coefficient rearranging process of rearranging the coefficient data stored by the storing process, in an order of executing a synthesis process in which a plurality of subbands of coefficient data decomposed into frequency bands are synthesized to generate image data, has not been performed on an encoding device side.

13. An encoding method of performing encoding processing of image data to generate an encoded stream, comprising the steps of:
generating shared-process identifying information that identifies by which of the encoding processing and decoding processing a process shared between the encoding processing of the image data and the decoding processing of the encoded stream is to be performed, or program identifying information that identifies which decoding program is to be selected from among a plurality of decoding programs that differ from each other in an assignment pattern in which a plurality of processes that constitute the decoding processing are assigned to a plurality of processing units or in an arrangement pattern of memories used by the plurality of processes;
performing the encoding processing of the image data to generate the encoded stream; and
transmitting the shared-process identifying information or the program selection information, together with the encoded stream.

14. A decoding device that performs decoding processing of an encoded stream obtained by performing encoding processing of image data, comprising:
acquiring means for acquiring, together with the encoded stream, shared-process identifying information that identifies by which of the encoding processing and decoding processing a process shared between the encoding processing of the image data and the decoding processing of the encoded stream is to be performed, or program identifying information that identifies which decoding program is to be selected from among a plurality of decoding programs that differ from each other in an assignment pattern in which a plurality of processes that constitute the decoding processing are assigned to a plurality of processing units or in an arrangement pattern of memories used by the plurality of processes;
decoding means for performing decoding processing of the encoded stream acquired by the acquiring means; and
control means for controlling the decoding means so as to perform the decoding processing in accordance with a processing scheme indicated by the shared-process identifying information or the program identifying information acquired by the acquiring means.

15. A decoding method of performing decoding processing of an encoded stream obtained by performing encoding processing of image data, comprising the steps of:
acquiring, together with the encoded stream, shared-process identifying information that identifies by which of the encoding processing and decoding processing a process shared between the encoding processing of the image data and the decoding processing of the encoded stream is to be performed, or program identifying information that identifies which decoding program is to be selected from among a plurality of decoding programs that differ from each other in an assignment pattern in which a plurality of processes that constitute the decoding processing are assigned to a plurality of processing units or in an arrangement pattern of memories used by the plurality of processes;
performing decoding processing of the encoded stream; and
performing a control that causes the decoding processing to be performed in accordance with a processing scheme indicated by the shared-process identifying information or the program identifying information.

* * * * *